US011630376B2

(12) United States Patent
Thomas et al.

(10) Patent No.: US 11,630,376 B2
(45) Date of Patent: Apr. 18, 2023

(54) REMOVABLE LENS ACCESSORIES FOR IMAGE CAPTURE DEVICES

(71) Applicant: GoPro, Inc., San Mateo, CA (US)

(72) Inventors: Matthew David Thomas, Castro Valley, CA (US); Jordan Zook Todd, Piedmont, CA (US); Jesse Patterson, Pacifica, CA (US); Nicholas Vitale, Foster City, CA (US); Joseph Tucker, Foster City, CA (US); Ian Griggs, San Francisco, CA (US)

(73) Assignee: GoPro, Inc., San Mateo, CA (US)

( * ) Notice: Subject to any disclaimer, the term of this patent is extended or adjusted under 35 U.S.C. 154(b) by 227 days.

(21) Appl. No.: 17/006,281

(22) Filed: Aug. 28, 2020

(65) Prior Publication Data

US 2021/0397070 A1 Dec. 23, 2021

Related U.S. Application Data

(60) Provisional application No. 63/040,893, filed on Jun. 18, 2020.

(51) Int. Cl.
*H04N 5/335* (2011.01)
*G03B 17/14* (2021.01)
(Continued)

(52) U.S. Cl.
CPC ............. *G03B 17/14* (2013.01); *G02B 7/14* (2013.01); *H04N 5/2253* (2013.01); *H04N 5/2254* (2013.01)

(58) Field of Classification Search
CPC .................................................. G03B 17/14
See application file for complete search history.

(56) References Cited

U.S. PATENT DOCUMENTS

| 2,186,610 A | 1/1940 | Leavitt |
| 3,133,140 A | 5/1964 | Winchell |
| (Continued) | | |

FOREIGN PATENT DOCUMENTS

| EP | 1619882 A2 | 1/2006 |
| WO | 2020055511 A1 | 3/2020 |

OTHER PUBLICATIONS

International Search Report and Written Opinion for App. No. PCT/US2021/024462, dated Jul. 8, 2021, 10 pages.
(Continued)

*Primary Examiner* — Gary C Vieaux
(74) *Attorney, Agent, or Firm* — Young Basile Hanlon & MacFarlane, P.C.

(57) ABSTRACT

An image capture device is described that includes a body; a mounting structure that is connected to the body; an integrated sensor-lens assembly (ISLA) that defines an optical axis and extends through the body and the mounting structure; and an accessory that is releasably connectable to the mounting structure via rotation through a range of motion less than approximately 90 degrees. The mounting structure and the accessory include corresponding angled bearing surfaces that are configured for engagement such that rotation of the accessory relative to the mounting structure creates a bearing effect that displaces the accessory along the optical axis to thereby reduce any axial force required during connection and disconnection of the accessory.

20 Claims, 59 Drawing Sheets

(51) Int. Cl.
*G02B 7/14* (2021.01)
*H04N 5/225* (2006.01)

(56) References Cited

U.S. PATENT DOCUMENTS

| | | | |
|---|---|---|---|
| 4,451,130 | A | 5/1984 | Yan |
| 4,957,328 | A * | 9/1990 | Tsutsui ............... F16D 1/06 301/124.1 |
| 5,077,567 | A | 12/1991 | Haraguchi |
| 5,828,406 | A | 10/1998 | Parulski |
| 6,079,883 | A | 6/2000 | Mori |
| 7,161,749 | B2 | 1/2007 | Sakurai |
| 7,717,630 | B1 | 5/2010 | Wan |
| 8,294,988 | B2 | 10/2012 | Cook |
| D727,387 | S | 4/2015 | Hasegawa |
| D730,423 | S | 5/2015 | Vandenbussche |
| D745,589 | S | 12/2015 | Lee |
| D750,687 | S | 3/2016 | Samuels |
| D760,312 | S | 6/2016 | Lee |
| D773,547 | S | 12/2016 | Lee |
| D785,068 | S | 4/2017 | Patsis |
| D788,835 | S | 6/2017 | Wu |
| 9,743,001 | B1 | 8/2017 | Stec |
| D816,751 | S | 5/2018 | Harrison |
| 9,995,990 | B2 | 6/2018 | Lim |
| D848,500 | S | 5/2019 | Miyashita |
| D858,603 | S | 9/2019 | Ye |
| 10,401,705 | B2 | 9/2019 | Lim |
| 10,701,249 | B1 | 6/2020 | Guo |
| D893,576 | S | 8/2020 | Kyte |
| 10,845,675 | B2 | 11/2020 | Lim |
| D917,598 | S | 4/2021 | Ye |
| 2004/0240870 | A1 | 12/2004 | Stiehler |
| 2006/0007551 | A1 | 1/2006 | Sakurai |
| 2008/0094708 | A1 | 4/2008 | Huang |
| 2009/0002823 | A1 | 1/2009 | Law |
| 2009/0091827 | A1 | 4/2009 | Gauger |
| 2010/0149408 | A1 | 6/2010 | Ito |
| 2010/0302638 | A1 | 12/2010 | Cuadra |
| 2013/0028590 | A1 | 1/2013 | Hasuda |
| 2013/0071101 | A1 | 3/2013 | Idera |
| 2013/0129338 | A1 | 5/2013 | Dowell |
| 2013/0272010 | A1 * | 10/2013 | Kawamura ........... F21S 41/194 362/519 |
| 2014/0043733 | A1 | 2/2014 | Huang |
| 2015/0093104 | A1 | 4/2015 | Clyne |
| 2016/0066459 | A1 | 3/2016 | Rayner |
| 2016/0181722 | A1 | 6/2016 | Tsai |
| 2017/0102512 | A1 | 4/2017 | Yamaoda |
| 2017/0102513 | A1 | 4/2017 | Ogata |
| 2017/0168374 | A1 | 6/2017 | Lim |
| 2017/0223239 | A1 | 8/2017 | Petty |
| 2018/0017785 | A1 | 1/2018 | Bulgajewski |
| 2018/0091775 | A1 | 3/2018 | Jung |
| 2018/0107099 | A1 * | 4/2018 | Yasuda ................. G03B 17/55 |
| 2018/0143512 | A1 | 5/2018 | Campbell |
| 2018/0292731 | A1 | 10/2018 | Lim |
| 2019/0158709 | A1 * | 5/2019 | Petty .................... H04N 5/2257 |
| 2019/0208099 | A1 | 7/2019 | Cotoros |
| 2019/0342473 | A1 | 11/2019 | Clearman |
| 2020/0026023 | A1 | 1/2020 | Nagaoka |
| 2020/0033698 | A1 | 1/2020 | Lim |
| 2021/0141287 | A1 | 5/2021 | Lim |
| 2021/0274067 | A1 | 9/2021 | Crow |
| 2021/0306536 | A1 | 9/2021 | Vitale |

OTHER PUBLICATIONS

U.S. Appl. No. 16/803,139, filed Feb. 27, 2020, Crow et al., entitled Heatsink of an Image Capture Device.
International Search Report and Written Opinion for App. No. PCT/US2021/037757, dated Oct. 7, 2021, 6 pages.
Geometric Image Transformations, https://docs.opencv.org/2.4/modules/imgproc/doc/geometric_transformations.html?highlight=resize#cv2.resize, OpenCV2.4.13.7, retrieved on Aug. 4, 2020, 11 pages.
International Search Report and Written Opinion for App. No. PCT/US2020/042749, dated Apr. 15, 2021, 10 pages.
Miscellaneous Image Transformations, https://docs.opencv.org/2.4/modules/imgproc/doc/miscellaneous_transformations.html#cvtcolor, OpenCV2.4.13.7, retrieved on Aug. 4, 2020, 12 pages.
Scipy.optimize.minimize, https://docs.scipy.org/doc/scipy/reference/generated/scipy.optimize.minimize.html, retrieved on Aug. 4, 2020, 6 pages.
Structural Analysis and Shape Descriptors, https://docs.opencv.org/2.4/modules/imgproc/doc/structural_analysis_and_shape_descriptors.html?highlight=minenclosingcircle#minenclosingcircle, retrieved on Aug. 4, 2020, 27 pages.
Structural Analysis and Shape Descriptors, https://docs.opencv.org/3.4/d3/dc0/group_imgproc_shape.html#ga17ed9f5d79ae97bd4c7cf18403e1689a, OpenCV, retrieved on Aug. 4, 2020, 12 pages.
Wikipedia, Histogram, https://en.wikipedia.org/wiki/Histogram#Cumulative_histogram, retrieved on Aug. 4, 2020, 7 pages.
Wikipedia, Magic number (programming), https://en.wikipedia.org/wiki/Magic_number_%28programming%29, retrieved on Aug. 4, 2020, 8 pages.
Wikipedia, Median absolute deviation, https://en.wikipedia.org/wiki/Median_absolute_deviation, retrieved on Aug. 4, 2020, 3 pages.
Wikipedia, Random sample consensus, https://en.wikipedia.org/wiki/Random_sample_consensus, retrieved on Aug. 4, 2020, 5 pages.
Wikipedia, YUV, https://en.wikipedia.org/wiki/YUV, retrieved on Aug. 4, 2020, 9 pages.

* cited by examiner

FIG. 11A
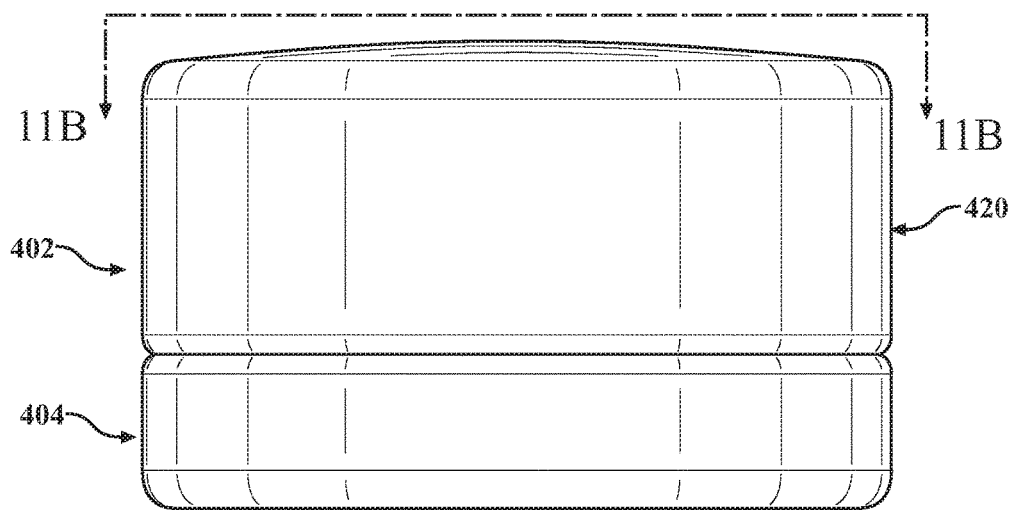
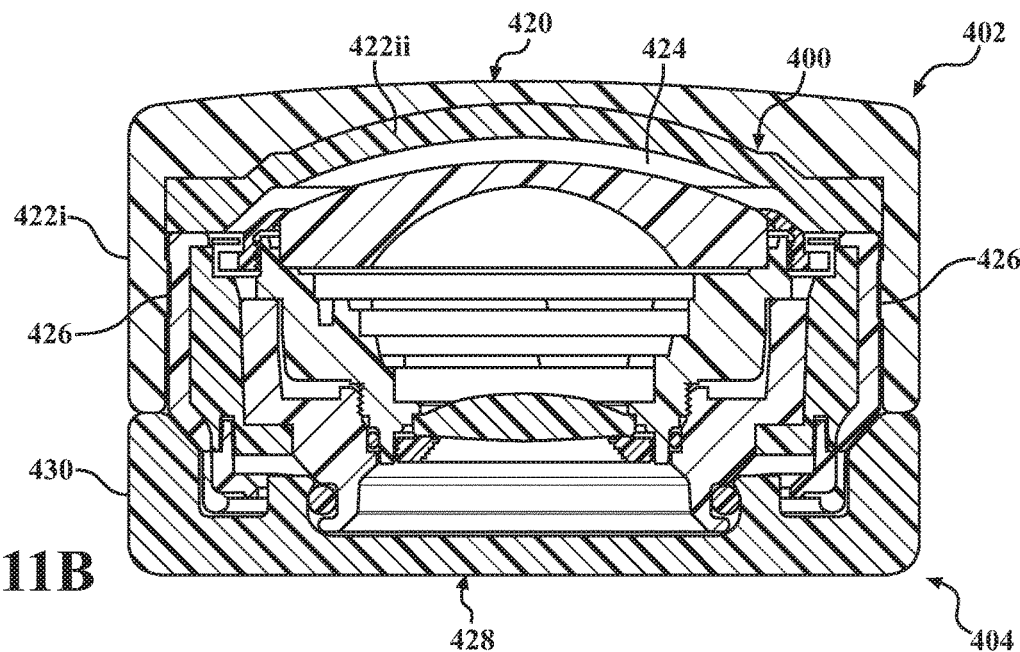
FIG. 11B
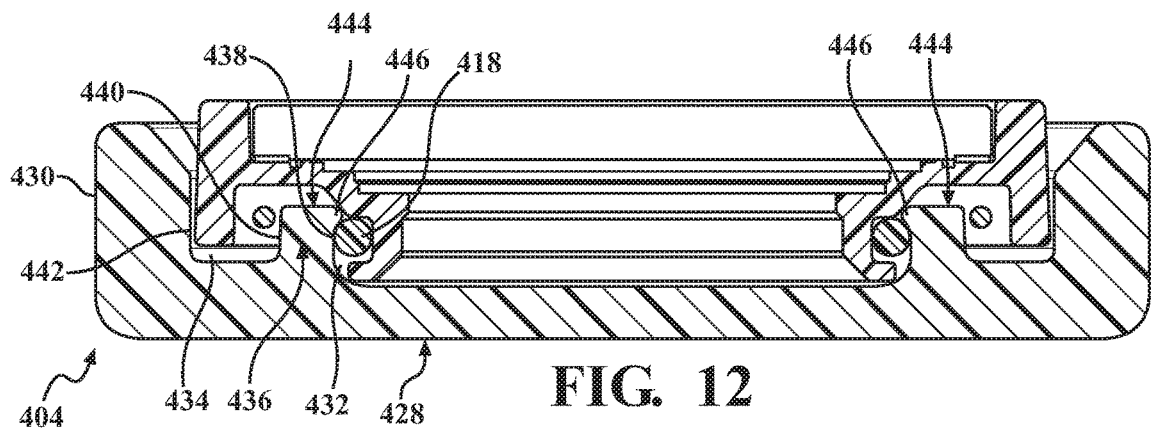
FIG. 12

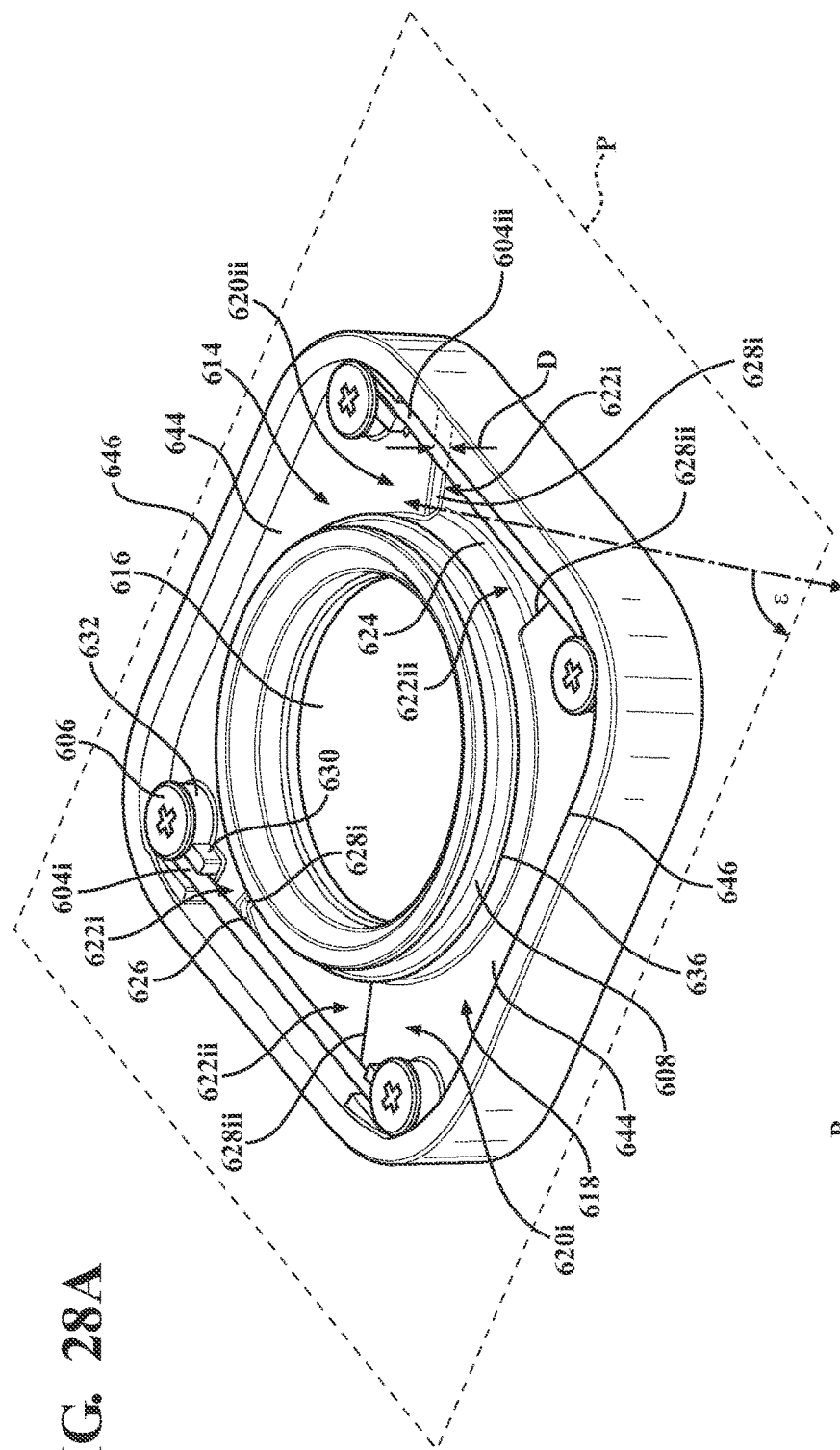
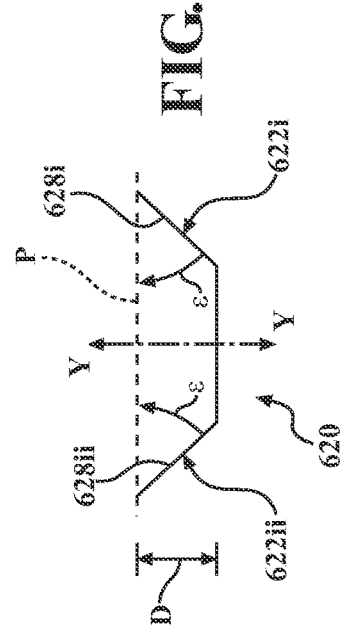
FIG. 28A
FIG. 28B

REMOVABLE LENS ACCESSORIES FOR IMAGE CAPTURE DEVICES

CROSS-REFERENCE TO RELATED APPLICATION(S)

This application claims priority to and the benefit of U.S. Provisional Patent Application No. 63/040,893, filed Jun. 18, 2020, the entire disclosure of which is hereby incorporated by reference.

TECHNICAL FIELD

The present disclosure relates generally to removable accessories for image capture devices and, more specifically, to removable accessories that are positionable adjacent to (about) an integrated sensor-lens assembly (ISLA) of the image capture device.

BACKGROUND

Image capture devices are used in various applications, including, for example, handheld cameras and video recorders, drones, and vehicles. In such devices, image data is typically captured and processed via one or more optical elements (e.g., lenses) and image sensors. More specifically, the optical element(s) capture content by receiving and focusing light, which is then converted into an electronic image signal by the image sensor(s) for processing by an image signal processor. In some image capture devices, the optical element(s) and the optical sensor(s) are integrated into a single unit known as an integrated sensor-lens assembly (ISLA).

The present disclosure provides various embodiments of removable accessories that are positionable adjacent to (about) the ISLA of an image capture device to not only protect the ISLA, but vary the optical characteristics and image (and video) capture capabilities of the image capture device.

SUMMARY

In one aspect of the present disclosure, an image capture device is described that includes a body; a mounting structure that is connected to the body; an integrated sensor-lens assembly (ISLA) that defines an optical axis and extends through the body and the mounting structure; and an accessory that is releasably connectable to the mounting structure via rotation through a range of motion that is less than approximately 90 degrees. The mounting structure and the accessory include corresponding angled bearing surfaces that are configured for engagement such that rotation of the accessory relative to the mounting structure creates a bearing effect that displaces the accessory along the optical axis to thereby reduce any axial force required during connection and disconnection of the accessory.

In certain embodiments, the corresponding angled bearing surfaces on the mounting structure and the accessory may each extend in non-parallel relation to the optical axis.

In certain embodiments, the mounting structure may include a pair of radial mounting members each including sidewalls that are connected by an inner wall and an outer wall.

In certain embodiments, the sidewalls of the radial mounting members may each have a generally linear configuration and may defined the first angled bearing surfaces.

In certain embodiments, the inner wall and the outer wall of the radial mounting members may each have an arcuate configuration.

In certain embodiments, the accessory may include a lens assembly that is configured to vary optics of the image capture device such that the image capture device is operable in a first optical mode prior to connection of the accessory and a second, different optical mode subsequent to connection of the accessory.

In certain embodiments, the first angled bearing surfaces may extend radially inward towards the optical axis.

In certain embodiments, the accessory may include a mounting plate with a pair of guide members each defining second angled bearing surfaces that correspond to the first angled bearing surfaces.

In certain embodiments, the guide members may be arcuate in configuration and may each define a thickness that extends in generally parallel relation to the optical axis.

In certain embodiments, each guide member may include a first end and an opposite second end.

In certain embodiments, the thickness of each guide member may increase from the first end towards the second end to facilitate engagement of the first angled bearing surfaces with the second angled bearing surfaces such that rotation of the accessory relative to the mounting structure displaces the accessory inwardly towards the body of the image capture device.

In certain embodiments, the accessory may include a pair of recesses that are configured to receive the pair of radial mounting members.

In certain embodiments, each recess may include sidewalls defining second angled bearing surfaces that correspond to the first angled bearing surfaces.

In certain embodiments, the sidewalls of each recess may have a generally linear configuration and may be connected by an inner wall and an outer wall that are each arcuate in configuration.

In certain embodiments, the first angled bearing surfaces may extend at a first angle in relation to a plane that is oriented in generally perpendicular (e.g., orthogonal) relation to the optical axis, and the second angled bearing surfaces may extend at a second angle in relation to the plane such that, during disconnection of the accessory, rotation of the accessory causes the first angled bearing surfaces to bear against the second angled bearing surfaces to thereby displace the accessory outwardly away from the body of the image capture device.

In certain embodiments, the first angle and the second angle may be substantially identical.

In certain embodiments, the accessory may further include a pair of retainers that are configured for engagement with the pair of radial mounting members.

In certain embodiments, each retainer may be configured for resilient deflection between a first position and a second position during connection and disconnection of the accessory to the mounting structure.

In certain embodiments, the pair of radial mounting members and the pair of retainers may be configured such that the pair of retainers are displaced radially outward in relation to the optical axis upon connection of the accessory to the mounting structure as the pair of retainers are deflected from the first position to the second position.

In another aspect of the present disclosure, an accessory is described that is configured for connection to an image capture device including an integrated sensor-lens assembly (ISLA). The accessory includes a housing; a lens assembly that is supported within the housing and configured to vary optics of the image capture device such that the image capture device is operable in a first optical mode prior to connection of the accessory and a second, different optical mode subsequent to connection of the accessory; and a mounting plate that is connected to the housing. The mounting plate has a pair of guide members that are configured for engagement with a mounting structure of the image capture device. Each guide member defines a thickness that varies along an arc length thereof such that rotation of the accessory in a first direction causes inward axial displacement of the accessory to facilitate connection of the accessory to the mounting structure and rotation of the accessory in a second, opposite direction causes outward axial displacement of the accessory to facilitate disconnection of the accessory from the mounting structure.

In certain embodiments, each guide member may include a first segment having a tapered configuration such that the first segment defines a first thickness that varies between first and second ends thereof and a second segment that is positioned adjacent to the first segment.

In certain embodiments, the second segment may have a non-tapered configuration and may define a second thickness that is generally uniform.

In certain embodiments, the guide member may further include a third segment that is positioned adjacent to the second segment.

In certain embodiments, the third segment may have a non-tapered configuration and may define a third thickness that is generally uniform and greater than the second thickness.

In certain embodiments, the mounting plate may further include a resilient spacer that is configured for compression between the housing of the accessory and a body of the image capture device to facilitate proper orientation of the lens assembly relative to the ISLA.

In another aspect of the present disclosure, an accessory is described that is configured for connection to an image capture device including an integrated sensor-lens assembly (ISLA). The accessory includes a housing defining recesses that are configured for engagement with a mounting structure of the image capture device. Each recess includes sidewalls that extend at an angle to a plane oriented in generally perpendicular (e.g., orthogonal) relation to an optical axis of the ISLA such that rotation of the accessory causes the sidewalls of the recesses to bear against the mounting structure and thereby displace the accessory axially outward to facilitate disconnection of the accessory from the mounting structure.

In certain embodiments, the recesses may be configured such that the angle to the plane lies substantially within a range of approximately 30° to approximately 60°.

In certain embodiments, the accessory may further include retainers that are secured to the housing and configured for engagement with the mounting structure.

In certain embodiments, the retainers may be configured for resilient deflection between an initial configuration and a subsequent configuration during connection and disconnection of the accessory to the mounting structure.

In certain embodiments, the retainers may be generally linear in the initial configuration and the retainers may be generally non-linear in the subsequent configuration.

BRIEF DESCRIPTION OF THE DRAWINGS

The disclosure is best understood from the following detailed description when read in conjunction with the accompanying drawings. It is emphasized that, according to common practice, the various features of the drawings are not to scale. On the contrary, the dimensions of the various features are arbitrarily expanded or reduced for clarity.

FIG. 11A is a side, plan view of the accessory seen in FIG. 4 shown covered by a front cap and a rear cap.

FIG. 11B is a cross-sectional view taken through the accessory, the front cap, and the rear cap along line 11B-11B in FIG. 11A.

FIG. 12 is a partial, cross-sectional view of the accessory and the rear cap seen in FIG. 11A showing connection of the rear cap to the accessory.

FIG. 28A is a rear, perspective view of the accessory seen in FIG. 27.

FIG. 28B provides a partial, schematic view of the accessory seen in FIG. 27;

DETAILED DESCRIPTION

Figure 1A:
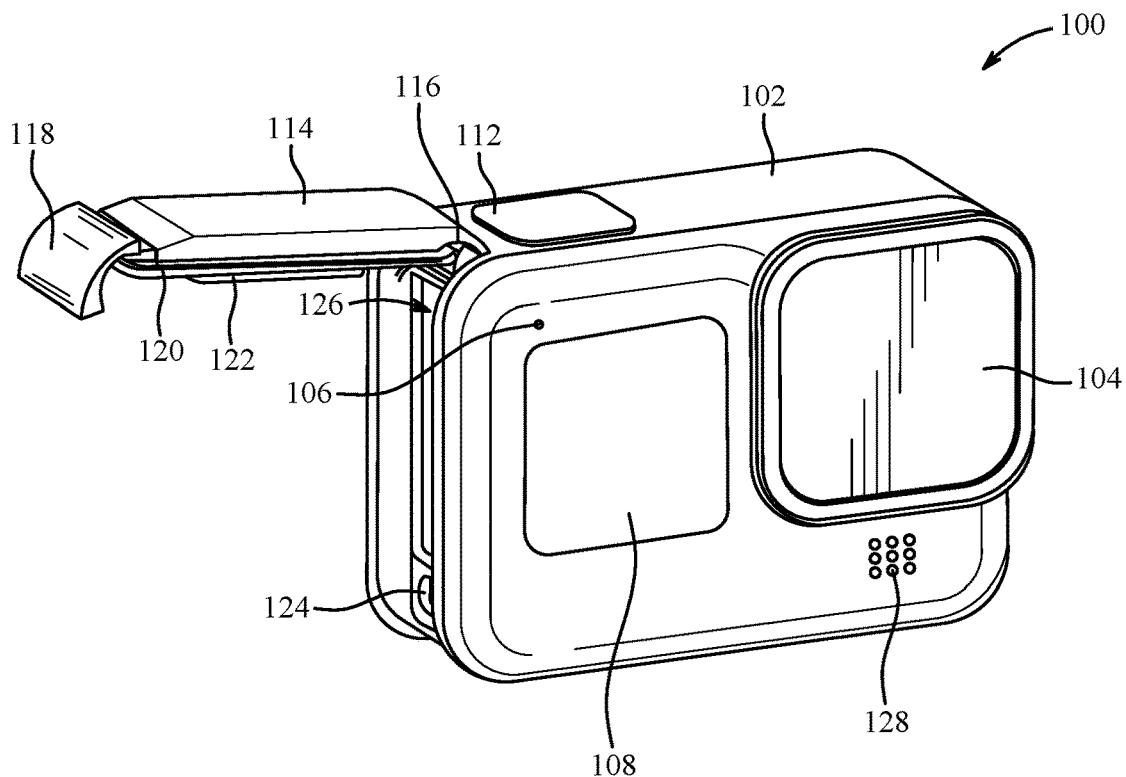
FIGS. 1A-B are isometric views of an example of an image capture device.

The present disclosure relates generally to accessories for image capture devices. The various accessories described herein are configured for connection and disconnection to a mounting structure (e.g., a bayonet) on a body of the image capture device via rotation through a range of motion that is less than (approximately) 90 degrees such that the accessory is positioned adjacent to (about) the ISLA of the image capture device. To facilitate connection and disconnection, the mounting structure and the accessory include corresponding angled bearing surfaces that are configured for engagement such that a bearing effect is created between the mounting structure and the accessory as the accessory is rotated. The bearing effect causes axial displacement of the accessory (e.g., along an optical axis of the image capture device) to not only facilitate (improve) connection and disconnection of the accessory, but reduce (if not entirely eliminate) the need to apply an axial (pushing, pulling) force to the accessory during connection to and removal from the image capture device.

In one aspect of the disclosure, the accessory includes a housing, a lens assembly that is supported within the housing, and a mounting plate that is connected to the housing.

The lens assembly is configured to vary optics of the image capture device such that the image capture device is operable in a first optical mode prior to connection of the accessory and a second, different optical mode subsequent to connection of the accessory. For example, it is envisioned that the lens assembly may be configured to support image capture through narrow or extra-wide fields-of-view (e.g., such that the lens assembly 414 acts as a macro (shorter focus) lens or a zoom lens) and/or capture stabilized footage in rugged use cases. It is also envisioned that the lens assembly may be configured to alter functionality of the image capture device such that the image capture device is capable of capturing spherical (or semi-spherical) images upon connection of the accessory and/or that the lens assembly may be configured to support telescopic image capture.

The mounting plate includes guide members that are configured for engagement with the mounting structure on the image capture device. The guide members each define a thickness that varies along an arc length thereof, whereby rotation of the accessory in a first direction (e.g., clockwise) causes inward axial displacement of the accessory (e.g., towards the mounting structure) to facilitate connection of the accessory to the image capture device, and rotation of the accessory in a second, opposite direction (e.g., counterclockwise) causes outward axial displacement of the accessory (e.g., away from the mounting structure) to facilitate disconnection of the accessory from the image capture device, thereby obviating any need to apply an axial (pulling) force to the accessory.

In another aspect of the disclosure, the accessory is configured as removable cover lens for the image capture device (e.g., to protect the ISLA) and includes a housing defining receptacles as well as a plurality of retainers (e.g., wireforms) that are configured for engagement with the mounting structure on the image capture device.

During connection of the accessory to the mounting structure, the retainers engage the mounting structure, whereby rotation of the accessory causes corresponding inward displacement thereof (e.g., towards the mounting structure) to facilitate connection of the accessory to the image capture device. As rotation of the accessory continues, recesses on the accessory align with the radial mounting members and the retainers are deflected into positions beneath the radial mounting members to thereby secure the accessory to the mounting structure.

Each receptacle includes inner walls that extend at an angle to a plane that is oriented in generally perpendicular (e.g., orthogonal) relation to the optical axis of the ISLA so as to define angled bearing surfaces that correspond to, and are configured for engagement with, angled bearing surfaces on the radial mounting members. To disconnect the accessory, the accessory is rotated (in either direction), whereby the angled bearing surfaces defined by the inner walls of the receptacles engage the angled bearing surfaces on the radial mounting members. Engagement between the corresponding angled bearing surfaces creates a bearing effect that displaces the accessory axially outward (e.g., away from the mounting structure) to thereby separate the accessory from the mounting structure, again obviating any need to apply an axial (pulling) force to the accessory.

In another aspect of the disclosure, an accessory is disclosed that combines features of each of the preceding embodiments. More specifically, the accessory includes the aforedescribed lens assembly, but, rather than the mounting plate, the accessory facilitates connection and disconnection via inclusion of the receptacles and the retainers.

In another aspect of the disclosure, the accessory includes threaded inner and outer collars that are configured for relative rotation. This embodiment of the accessory includes the guide members discussed in connection with the aforementioned mounting plate, which are provided on the inner collar. During connection of the accessory, the inner and outer collars are rotated in a first direction such that the angled bearing surfaces on the mounting plate engage the corresponding angled bearing surfaces on the radial mounting members in the manner described above such that the accessory is drawn inwardly towards the image capture device. During disconnection, the collars are rotated in a second, opposite direction, thereby facilitating outward movement of the accessory in relation to the image capture device in a manner that again reduces (if not entirely eliminates) any need to apply an axial (pulling) force to the accessory during disconnection.

Figure 1B:
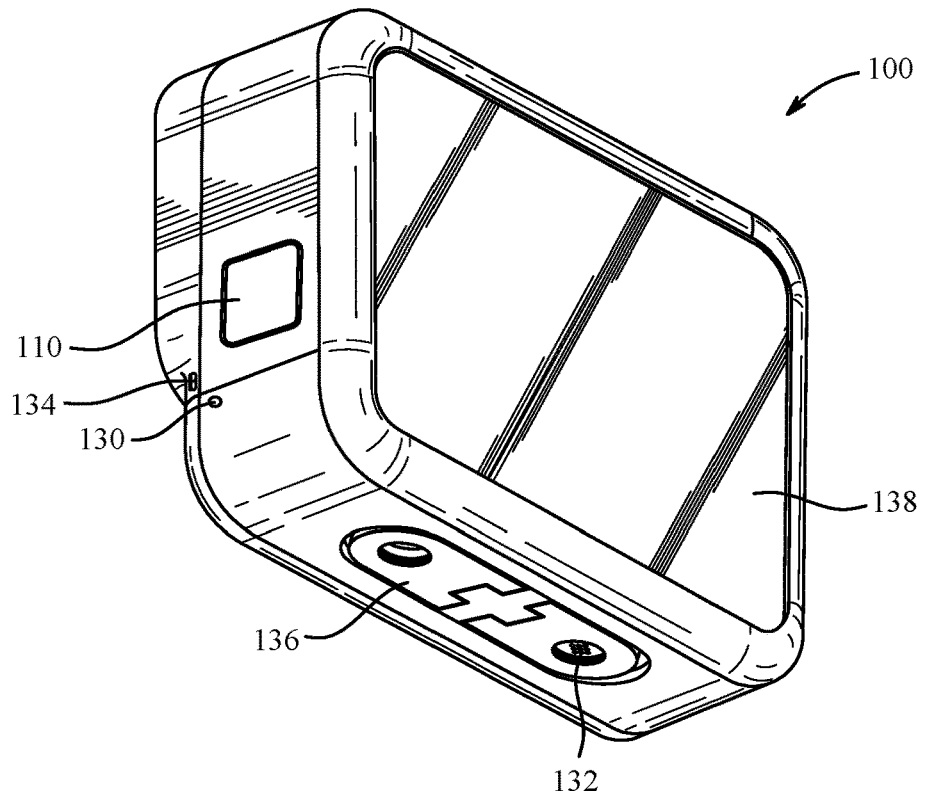

FIGS. 1A-B are isometric views of an example of an image capture device 100. The image capture device 100 may include a body 102, a lens 104 structured on a front surface of the body 102, various indicators on the front surface of the body 102 (such as light-emitting diodes (LEDs), displays, and the like), various input mechanisms (such as buttons, switches, and/or touch-screens), and electronics (such as imaging electronics, power electronics, etc.) internal to the body 102 for capturing images via the lens 104 and/or performing other functions. The lens 104 is configured to receive light incident upon the lens 104 and to direct received light onto an image sensor internal to the body 102. The image capture device 100 may be configured to capture images and video and to store captured images and video for subsequent display or playback. In certain embodiments, it is envisioned that the lens 104 and the image sensor may be combined into a single unit referred to herein as an integrated sensor-lens assembly (ISLA).

The image capture device 100 may include an LED or another form of indicator 106 to indicate a status of the image capture device 100 and a liquid-crystal display (LCD) or other form of a display 108 to show status information such as battery life, camera mode, elapsed time, and the like. The image capture device 100 may also include a mode button 110 and a shutter button 112 that are configured to allow a user of the image capture device 100 to interact with the image capture device 100. For example, the mode button 110 and the shutter button 112 may be used to turn the image capture device 100 on and off, scroll through modes and settings, and select modes and change settings. The image capture device 100 may include additional buttons or interfaces (not shown) to support and/or control additional functionality.

The image capture device 100 may include a door 114 coupled to the body 102, for example, using a hinge mechanism 116. The door 114 may be secured to the body 102 using a latch mechanism 118 that releasably engages the body 102 at a position generally opposite the hinge mechanism 116. The door 114 may also include a seal 120 and a battery interface 122. When the door 114 is an open position, access is provided to an input-output (I/O) interface 124 for connecting to or communicating with external devices as described below and to a battery receptacle 126 for placement and replacement of a battery (not shown). The battery receptacle 126 includes operative connections (not shown) for power transfer between the battery and the image capture device 100. When the door 114 is in a closed position, the seal 120 engages a flange (not shown) or other interface to provide an environmental seal, and the battery interface 122 engages the battery to secure the battery in the battery receptacle 126. The door 114 can also have a removed position (not shown) where the entire door 114 is separated from the image capture device 100, that is, where both the hinge mechanism 116 and the latch mechanism 118 are decoupled from the body 102 to allow the door 114 to be removed from the image capture device 100.

The image capture device 100 may include a microphone 128 on a front surface and another microphone 130 on a side surface. The image capture device 100 may include other microphones on other surfaces (not shown). The microphones 128, 130 may be configured to receive and record audio signals in conjunction with recording video or separate from recording of video. The image capture device 100 may include a speaker 132 on a bottom surface of the image capture device 100. The image capture device 100 may include other speakers on other surfaces (not shown). The speaker 132 may be configured to play back recorded audio or emit sounds associated with notifications.

A front surface of the image capture device 100 may include a drainage channel 134. A bottom surface of the image capture device 100 may include an interconnect mechanism 136 for connecting the image capture device 100 to a handle grip or other securing device. In the example shown in FIG. 1B, the interconnect mechanism 136 includes folding protrusions configured to move between a nested or collapsed position as shown and an extended or open position (not shown) that facilitates coupling of the protrusions to mating protrusions of other devices such as handle grips, mounts, clips, or like devices.

The image capture device 100 may include an interactive display 138 that allows for interaction with the image capture device 100 while simultaneously displaying information on a surface of the image capture device 100.

The image capture device 100 of FIGS. 1A-B includes an exterior that encompasses and protects internal electronics. In the present example, the exterior includes six surfaces (i.e. a front face, a left face, a right face, a back face, a top face, and a bottom face) that form a rectangular cuboid. Furthermore, both the front and rear surfaces of the image capture device 100 are rectangular. In other embodiments, the exterior may have a different shape. The image capture device 100 may be made of a rigid material such as plastic, aluminum, steel, or fiberglass. The image capture device 100 may include features other than those described here. For example, the image capture device 100 may include additional buttons or different interface features, such as interchangeable lenses, cold shoes, and hot shoes that can add functional features to the image capture device 100.

The image capture device 100 may include various types of image sensors, such as charge-coupled device (CCD) sensors, active pixel sensors (APS), complementary metal-oxide-semiconductor (CMOS) sensors, N-type metal-oxide-semiconductor (NMOS) sensors, and/or any other image sensor or combination of image sensors.

Although not illustrated, in various embodiments, the image capture device 100 may include other additional electrical components (e.g., an image processor, camera system-on-chip (SoC), etc.), which may be included on one or more circuit boards within the body 102 of the image capture device 100.

The image capture device 100 may interface with or communicate with an external device, such as an external user interface device (not shown), via a wired or wireless computing communication link (e.g., the I/O interface 124). Any number of computing communication links may be used. The computing communication link may be a direct computing communication link or an indirect computing communication link, such as a link including another device or a network, such as the internet, may be used.

In some implementations, the computing communication link may be a Wi-Fi link, an infrared link, a Bluetooth (BT) link, a cellular link, a ZigBee link, a near field communications (NFC) link, such as an ISO/IEC 20643 protocol link, an Advanced Network Technology interoperability (ANT+) link, and/or any other wireless communications link or combination of links.

In some implementations, the computing communication link may be an HDMI link, a USB link, a digital video interface link, a display port interface link, such as a Video Electronics Standards Association (VESA) digital display interface link, an Ethernet link, a Thunderbolt link, and/or other wired computing communication link.

The image capture device 100 may transmit images, such as panoramic images, or portions thereof, to the external user interface device via the computing communication link, and the external user interface device may store, process, display, or a combination thereof the panoramic images.

The external user interface device may be a computing device, such as a smartphone, a tablet computer, a phablet, a smart watch, a portable computer, personal computing device, and/or another device or combination of devices configured to receive user input, communicate information with the image capture device 100 via the computing communication link, or receive user input and communicate information with the image capture device 100 via the computing communication link.

The external user interface device may display, or otherwise present, content, such as images or video, acquired by the image capture device 100. For example, a display of the external user interface device may be a viewport into the three-dimensional space represented by the panoramic images or video captured or created by the image capture device 100.

The external user interface device may communicate information, such as metadata, to the image capture device 100. For example, the external user interface device may send orientation information of the external user interface device with respect to a defined coordinate system to the image capture device 100, such that the image capture device 100 may determine an orientation of the external user interface device relative to the image capture device 100.

Based on the determined orientation, the image capture device 100 may identify a portion of the panoramic images or video captured by the image capture device 100 for the image capture device 100 to send to the external user interface device for presentation as the viewport. In some implementations, based on the determined orientation, the image capture device 100 may determine the location of the external user interface device and/or the dimensions for viewing of a portion of the panoramic images or video.

The external user interface device may implement or execute one or more applications to manage or control the image capture device 100. For example, the external user interface device may include an application for controlling camera configuration, video acquisition, video display, or any other configurable or controllable aspect of the image capture device 100.

The user interface device, such as via an application, may generate and share, such as via a cloud-based or social media service, one or more images, or short video clips, such as in response to user input. In some implementations, the external user interface device, such as via an application, may remotely control the image capture device 100 such as in response to user input.

The external user interface device, such as via an application, may display unprocessed or minimally processed images or video captured by the image capture device 100 contemporaneously with capturing the images or video by the image capture device 100, such as for shot framing or live preview, and which may be performed in response to user input. In some implementations, the external user interface device, such as via an application, may mark one or more key moments contemporaneously with capturing the images or video by the image capture device 100, such as with a tag or highlight in response to a user input or user gesture.

The external user interface device, such as via an application, may display or otherwise present marks or tags associated with images or video, such as in response to user input. For example, marks may be presented in a camera roll application for location review and/or playback of video highlights.

The external user interface device, such as via an application, may wirelessly control camera software, hardware, or both. For example, the external user interface device may include a web-based graphical interface accessible by a user for selecting a live or previously recorded video stream from the image capture device 100 for display on the external user interface device.

The external user interface device may receive information indicating a user setting, such as an image resolution setting (e.g., 3840 pixels by 2160 pixels), a frame rate setting (e.g., 60 frames per second (fps)), a location setting, and/or a context setting, which may indicate an activity, such as mountain biking, in response to user input, and may communicate the settings, or related information, to the image capture device 100.

Figure 2A:
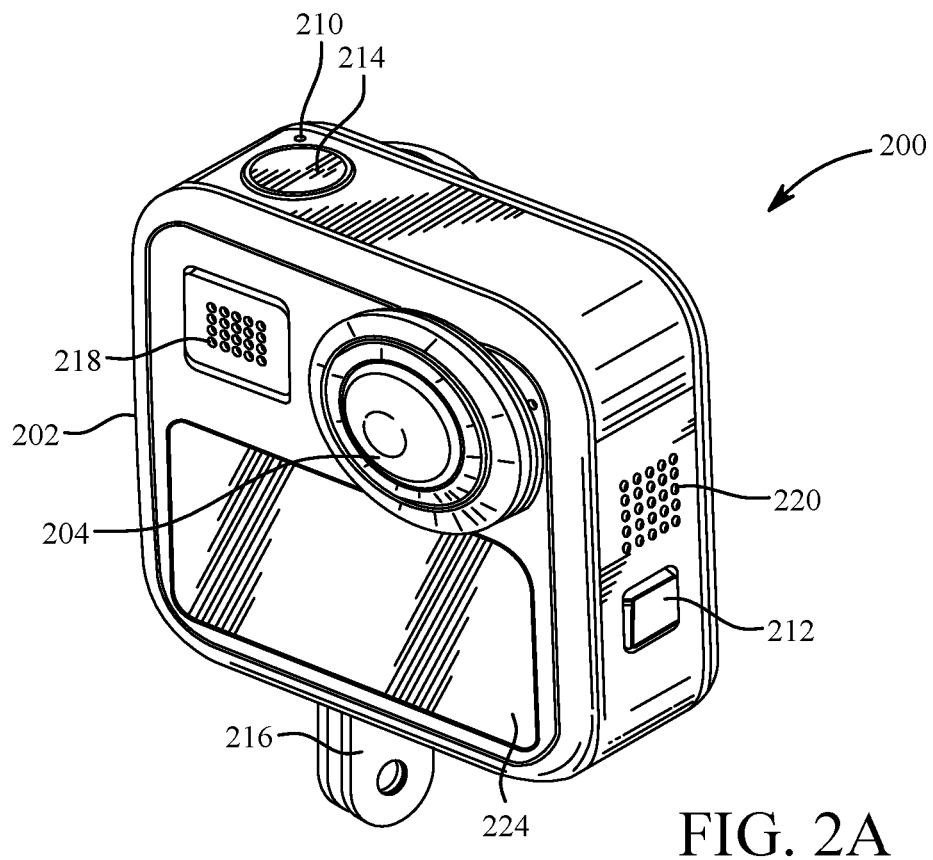
FIGS. 2A-B are isometric views of another example of an image capture device.
Figure 2B:
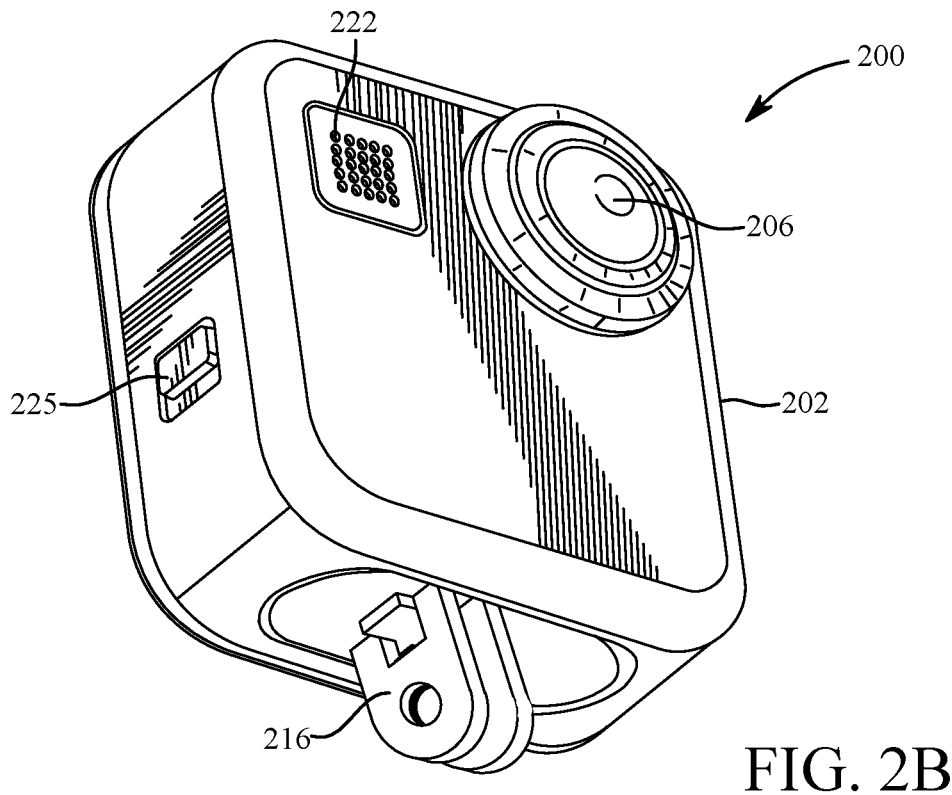

FIGS. 2A-B illustrate another example of an image capture device 200. The image capture device 200 includes a body 202 and two camera lenses 204 and 206 disposed on opposing surfaces of the body 202, for example, in a back-to-back configuration, Janus configuration, or offset Janus configuration. The body 202 of the image capture device 200 may be made of a rigid material such as plastic, aluminum, steel, or fiberglass.

The image capture device 200 includes various indicators on the front of the surface of the body 202 (such as LEDs, displays, and the like), various input mechanisms (such as buttons, switches, and touch-screen mechanisms), and electronics (e.g., imaging electronics, power electronics, etc.) internal to the body 202 that are configured to support image capture via the two camera lenses 204 and 206 and/or perform other imaging functions.

The image capture device 200 includes various indicators, for example, LEDs 208, 210 to indicate a status of the image capture device 100. The image capture device 200 may include a mode button 212 and a shutter button 214 configured to allow a user of the image capture device 200 to interact with the image capture device 200, to turn the image capture device 200 on, and to otherwise configure the operating mode of the image capture device 200. It should be appreciated, however, that, in alternate embodiments, the image capture device 200 may include additional buttons or inputs to support and/or control additional functionality.

The image capture device 200 may include an interconnect mechanism 216 for connecting the image capture device 200 to a handle grip or other securing device. In the example shown in FIGS. 2A and 2B, the interconnect mechanism 216 includes folding protrusions configured to move between a nested or collapsed position (not shown) and an extended or open position as shown that facilitates coupling of the protrusions to mating protrusions of other devices such as handle grips, mounts, clips, or like devices.

The image capture device 200 may include audio components 218, 220, 222 such as microphones configured to receive and record audio signals (e.g., voice or other audio commands) in conjunction with recording video. The audio component 218, 220, 222 can also be configured to play back audio signals or provide notifications or alerts, for example, using speakers. Placement of the audio components 218, 220, 222 may be on one or more of several surfaces of the image capture device 200. In the example of FIGS. 2A and 2B, the image capture device 200 includes three audio components 218, 220, 222, with the audio component 218 on a front surface, the audio component 220 on a side surface, and the audio component 222 on a back surface of the image capture device 200. Other numbers and configurations for the audio components are also possible.

The image capture device 200 may include an interactive display 224 that allows for interaction with the image capture device 200 while simultaneously displaying information on a surface of the image capture device 200. The interactive display 224 may include an I/O interface, receive touch inputs, display image information during video capture, and/or provide status information to a user. The status information provided by the interactive display 224 may include battery power level, memory card capacity, time elapsed for a recorded video, etc.

The image capture device 200 may include a release mechanism 225 that receives a user input to in order to change a position of a door (not shown) of the image capture device 200. The release mechanism 225 may be used to open the door (not shown) in order to access a battery, a battery receptacle, an I/O interface, a memory card interface, etc. (not shown) that are similar to components described in respect to the image capture device 100 of FIGS. 1A and 1B.

In some embodiments, the image capture device 200 described herein includes features other than those described. For example, instead of the I/O interface and the interactive display 224, the image capture device 200 may include additional interfaces or different interface features. For example, the image capture device 200 may include additional buttons or different interface features, such as interchangeable lenses, cold shoes, and hot shoes that can add functional features to the image capture device 200.

Figure 3:
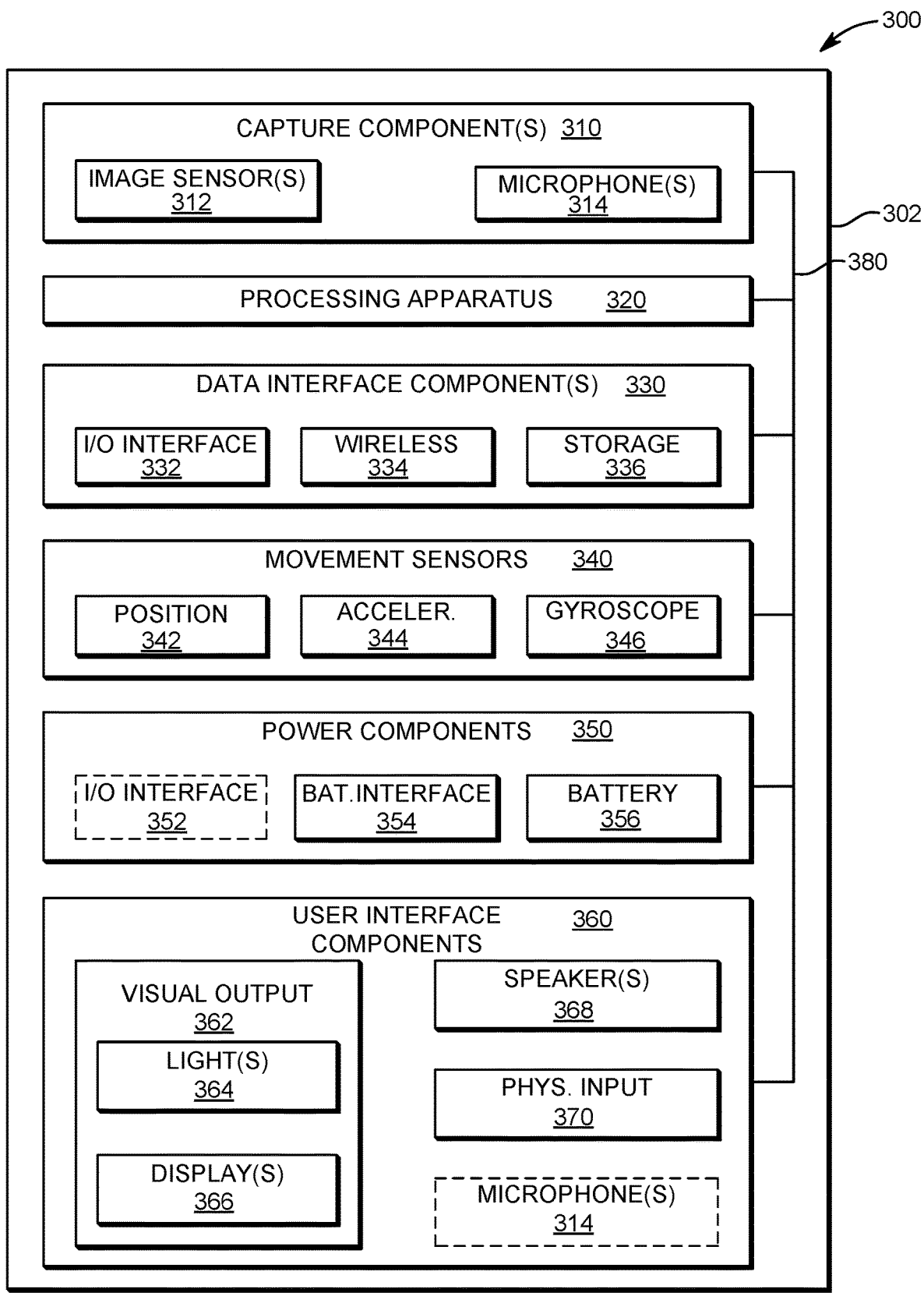
FIG. 3 is a block diagram of electronic components of an image capture device.

FIG. 3 is a block diagram of electronic components in an image capture device 300. The image capture device 300 may be a single-lens image capture device, a multi-lens image capture device, or variations thereof, including an image capture device with multiple capabilities such as use of interchangeable integrated sensor lens assemblies. The description of the image capture device 300 is also applicable to the image capture devices 100, 200 of FIGS. 1A-B and 2A-B.

The image capture device 300 includes a body 302 which includes electronic components such as capture components 310, a processing apparatus 320, data interface components 330, movement sensors 340, power components 350, and/or user interface components 360.

The capture components 310 include one or more image sensors 312 for capturing images and one or more microphones 314 for capturing audio.

The image sensor(s) 312 is configured to detect light of a certain spectrum (e.g., the visible spectrum or the infrared spectrum) and convey information constituting an image as electrical signals (e.g., analog or digital signals). The image sensor(s) 312 detects light incident through a lens coupled or connected to the body 302. The image sensor(s) 312 may be any suitable type of image sensor, such as a charge-coupled device (CCD) sensor, active pixel sensor (APS), complementary metal-oxide-semiconductor (CMOS) sensor, N-type metal-oxide-semiconductor (NMOS) sensor, and/or any other image sensor or combination of image sensors. Image signals from the image sensor(s) 312 may be passed to other electronic components of the image capture device 300 via a bus 380, such as to the processing apparatus 320. In some implementations, the image sensor(s) 312 includes a digital-to-analog converter. A multi-lens variation of the image capture device 300 can include multiple image sensors 312.

The microphone(s) 314 is configured to detect sound, which may be recorded in conjunction with capturing images to form a video. The microphone(s) 314 may also detect sound in order to receive audible commands to control the image capture device 300.

The processing apparatus 320 may be configured to perform image signal processing (e.g., filtering, tone mapping, stitching, and/or encoding) to generate output images based on image data from the image sensor(s) 312. The processing apparatus 320 may include one or more processors having single or multiple processing cores. In some implementations, the processing apparatus 320 may include an application specific integrated circuit (ASIC). For example, the processing apparatus 320 may include a custom image signal processor. The processing apparatus 320 may exchange data (e.g., image data) with other components of the image capture device 300, such as the image sensor(s) 312, via the bus 380.

The processing apparatus 320 may include memory, such as a random-access memory (RAM) device, flash memory, or another suitable type of storage device, such as a non-transitory computer-readable memory. The memory of the processing apparatus 320 may include executable instructions and data that can be accessed by one or more processors of the processing apparatus 320. For example, the processing apparatus 320 may include one or more dynamic random-access memory (DRAM) modules, such as double data rate synchronous dynamic random-access memory (DDR SDRAM). In some implementations, the processing apparatus 320 may include a digital signal processor (DSP). More than one processing apparatus may also be present or associated with the image capture device 300.

The data interface components 330 enable communication between the image capture device 300 and other electronic devices, such as a remote control, a smartphone, a tablet computer, a laptop computer, a desktop computer, or a storage device. For example, the data interface components 330 may be used to receive commands to operate the image capture device 300, transfer image data to other electronic devices, and/or transfer other signals or information to and from the image capture device 300. The data interface components 330 may be configured for wired and/or wireless communication. For example, the data interface components 330 may include an I/O interface 332 that provides wired communication for the image capture device, which may be a USB interface (e.g., USB type-C), a high-definition multimedia interface (HDMI), or a FireWire interface. The data interface components 330 may include a wireless data interface 334 that provides wireless communication for the image capture device 300, such as a Bluetooth interface, a ZigBee interface, and/or a Wi-Fi interface. The data interface components 330 may include a storage interface 336, such as a memory card slot configured to receive and operatively couple to a storage device (e.g., a memory card) for data transfer with the image capture device 300 (e.g., for storing captured images and/or recorded audio and video).

The movement sensors 340 may detect the position and movement of the image capture device 300. The movement sensors 340 may include a position sensor 342, an accelerometer 344, or a gyroscope 346. The position sensor 342, such as a global positioning system (GPS) sensor, is used to determine a position of the image capture device 300. The accelerometer 344, such as a three-axis accelerometer, measures linear motion (e.g., linear acceleration) of the image capture device 300. The gyroscope 346, such as a three-axis gyroscope, measures rotational motion (e.g., rate of rotation) of the image capture device 300. Other types of movement sensors 340 may also be present or associated with the image capture device 300.

The power components 350 may receive, store, and/or provide power for operating the image capture device 300. The power components 350 may include a battery interface 352 and a battery 354. The battery interface 352 operatively couples to the battery 354, for example, with conductive contacts to transfer power from the battery 354 to the other electronic components of the image capture device 300. The power components 350 may also include the I/O interface 332, as indicated in dotted line, and the power components 350 may receive power from an external source, such as a wall plug or external battery, for operating the image capture device 300 and/or charging the battery 354 of the image capture device 300.

The user interface components 360 may allow the user to interact with the image capture device 300, for example, providing outputs to the user and receiving inputs from the user. The user interface components 360 may include visual output components 362 to visually communicate information and/or present captured images to the user. The visual output components 362 may include one or more lights 364 and/or more displays 366. The display(s) 366 may be configured as a touch screen that receives inputs from the user. The user interface components 360 may also include one or more speakers 368. The speaker(s) 368 can function as an audio output component that audibly communicates information and/or presents recorded audio to the user. The user interface components 360 may also include one or more physical input interfaces 370 that are physically manipulated by the user to provide input to the image capture device 300. The physical input interfaces 370 may, for example, be configured as buttons, toggles, or switches. The user interface components 360 may also be considered to include the microphone(s) 314, as indicated in dotted line, and the microphone(s) 314 may function to receive audio inputs from the user, such as voice commands.

Figure 4:
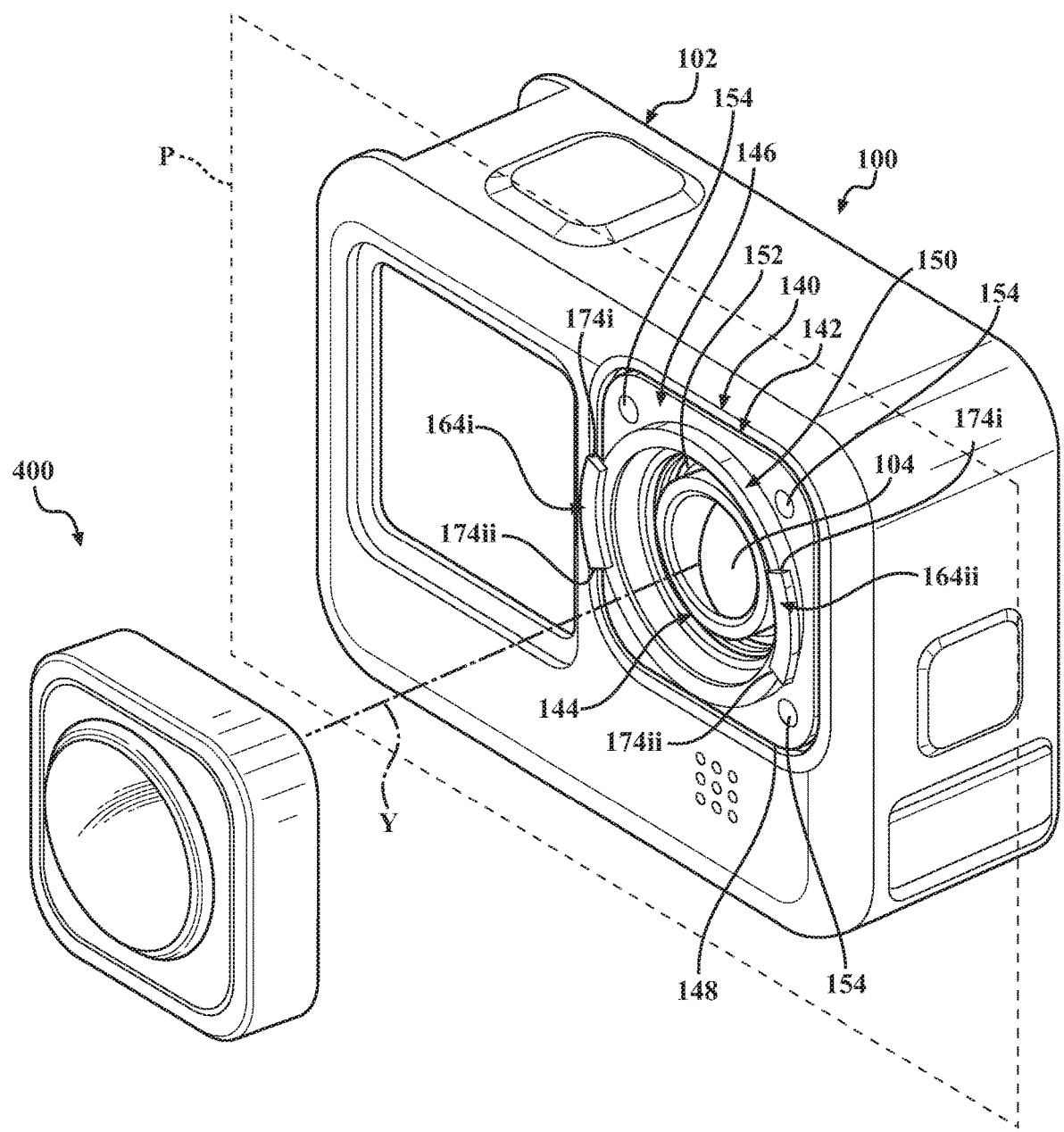
FIG. 4 is a front, perspective view of an image capture device including a removable accessory according to one aspect of the present disclosure.
Figure 5:
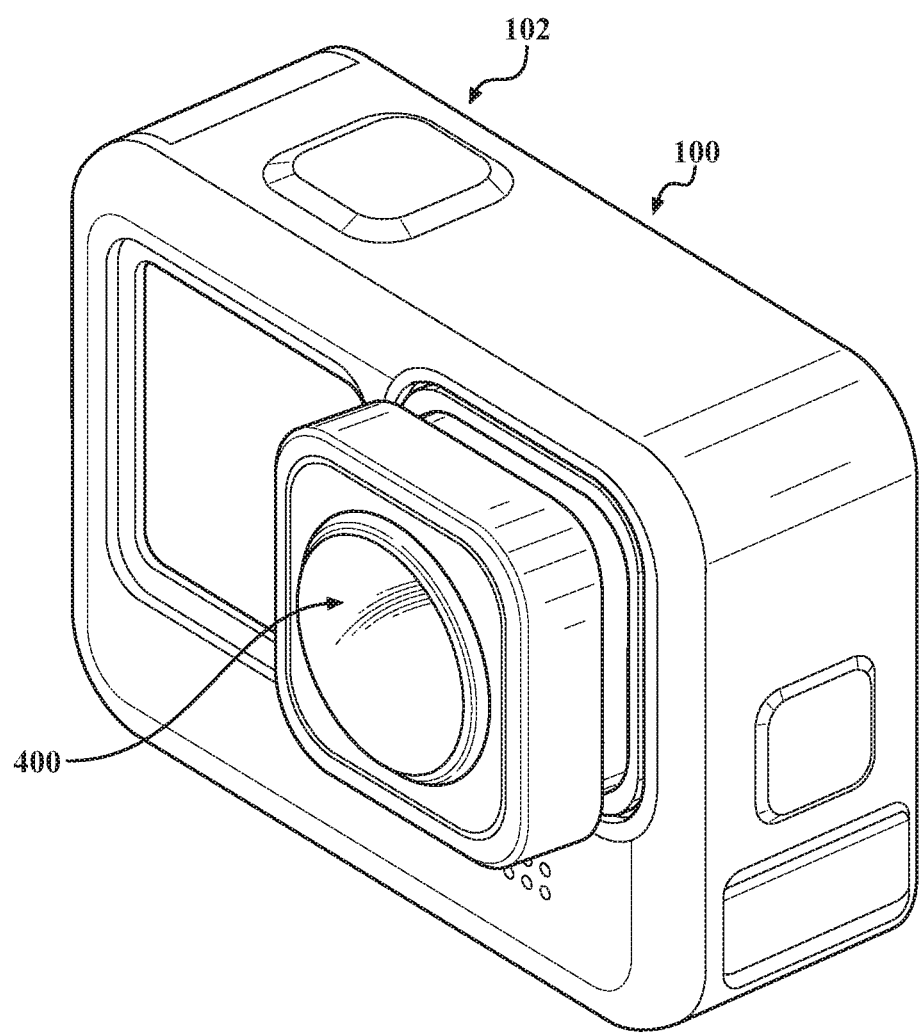
FIG. 5 is a front, perspective view of the image capture device with the accessory seen in FIG. 4 shown connected.
Figure 6:
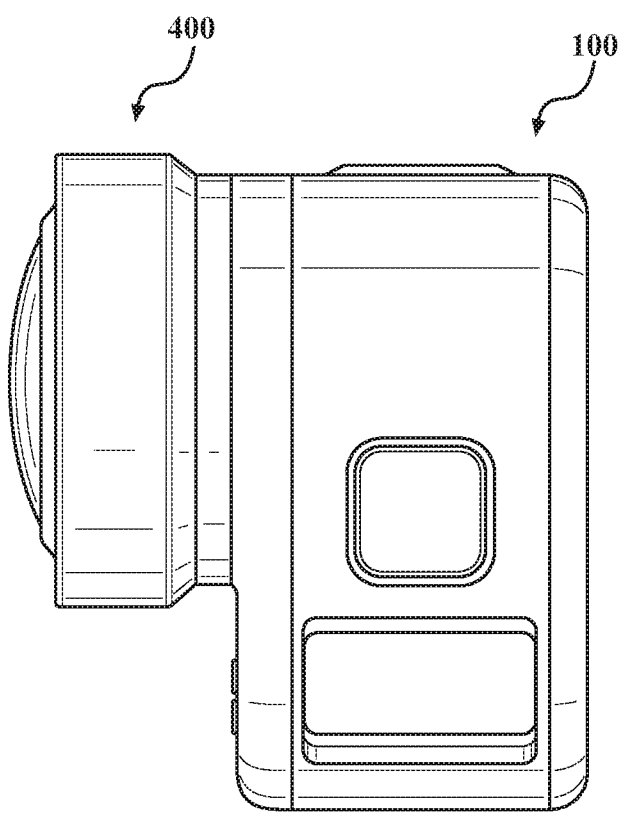
FIG. 6 is a side, plan view of the image capture device with the accessory seen in FIG. 4 shown connected.
Figure 7:
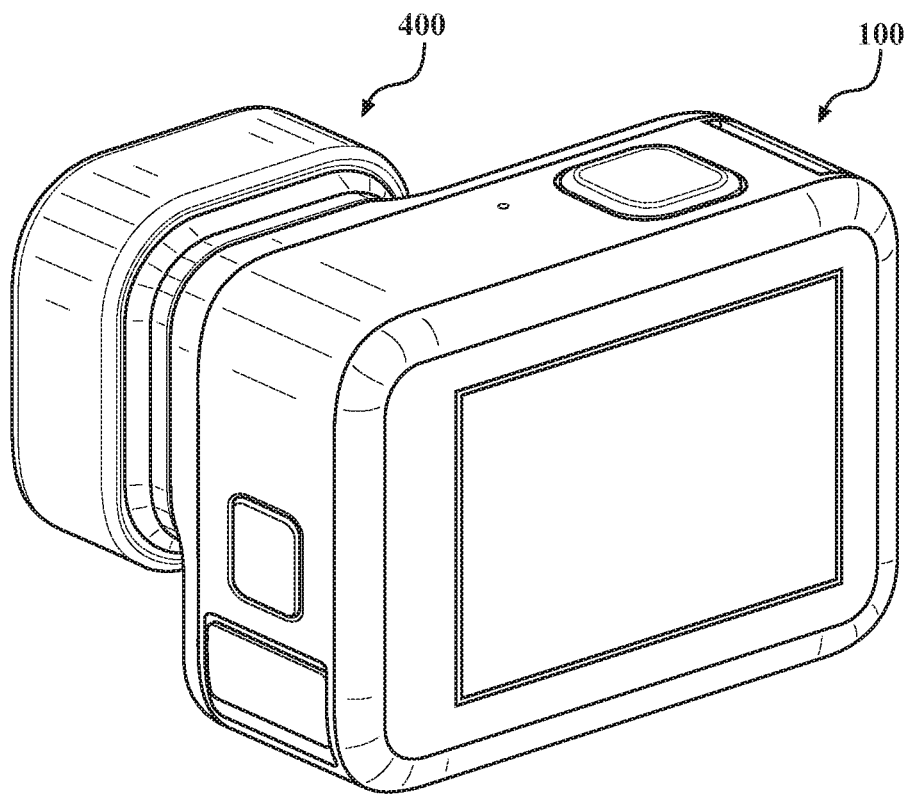
FIG. 7 is a rear, perspective view of the image capture device with the accessory seen in FIG. 4 shown connected.
Figure 8A:
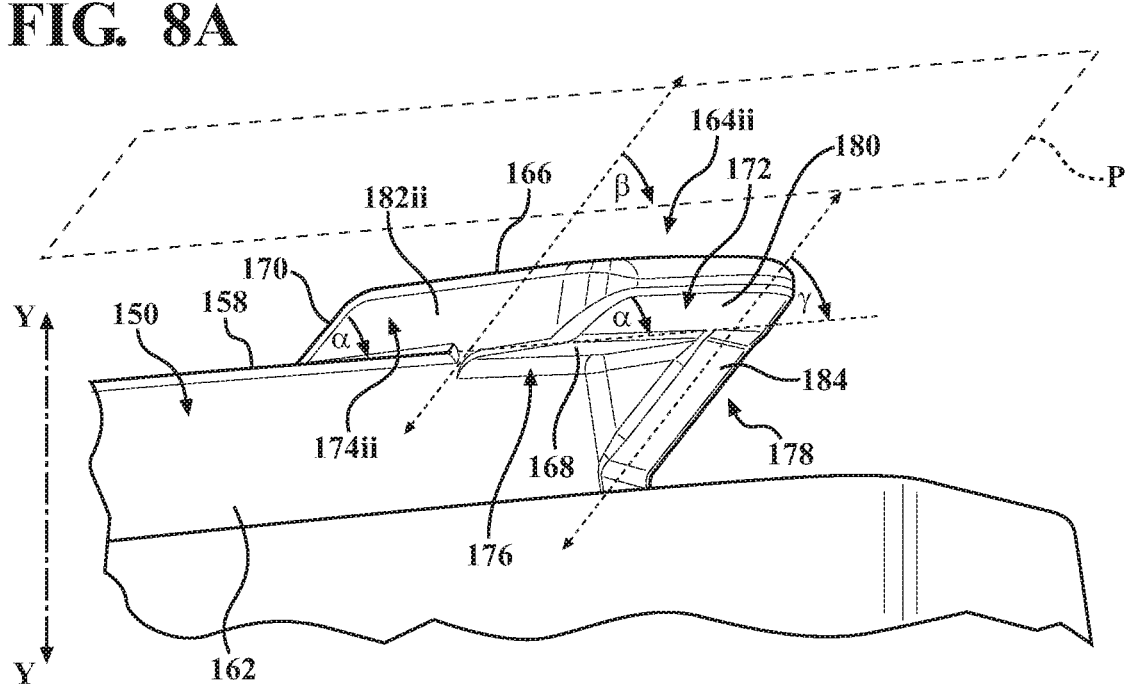
FIG. 8A is a partial, perspective view of the image capture device illustrating a mounting structure (bayonet) that supports the accessory seen in FIG. 4.
Figure 8B:
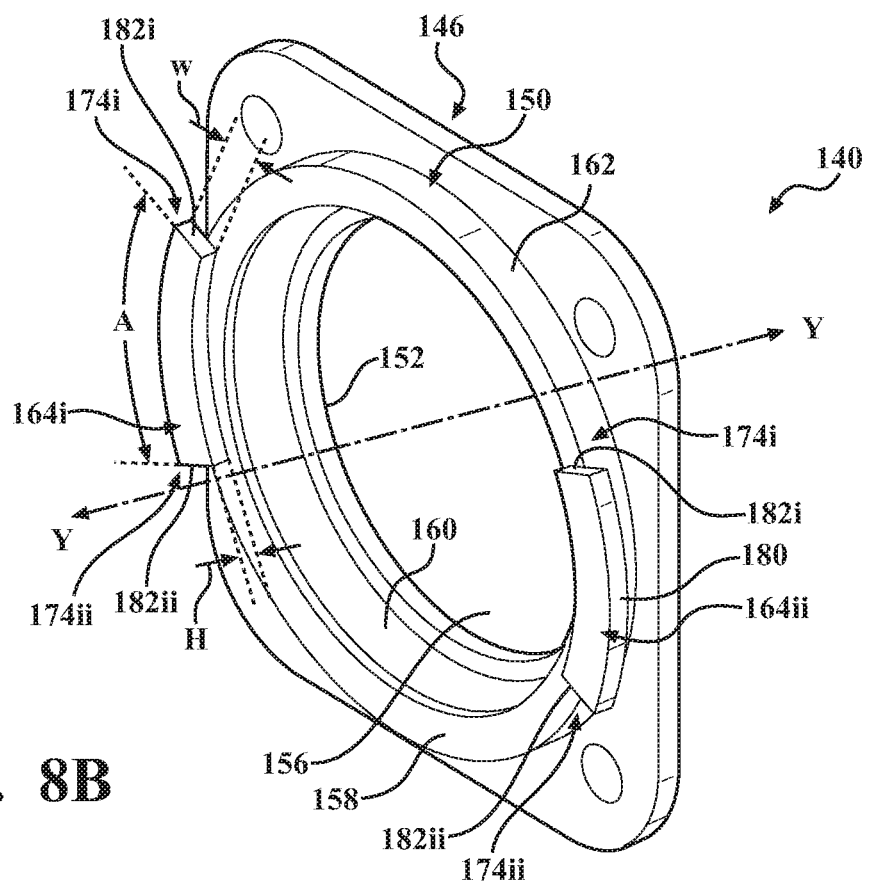
FIG. 8B is a front, perspective view of the mounting structure seen in FIGS. 4 and 8A.
Figure 9:
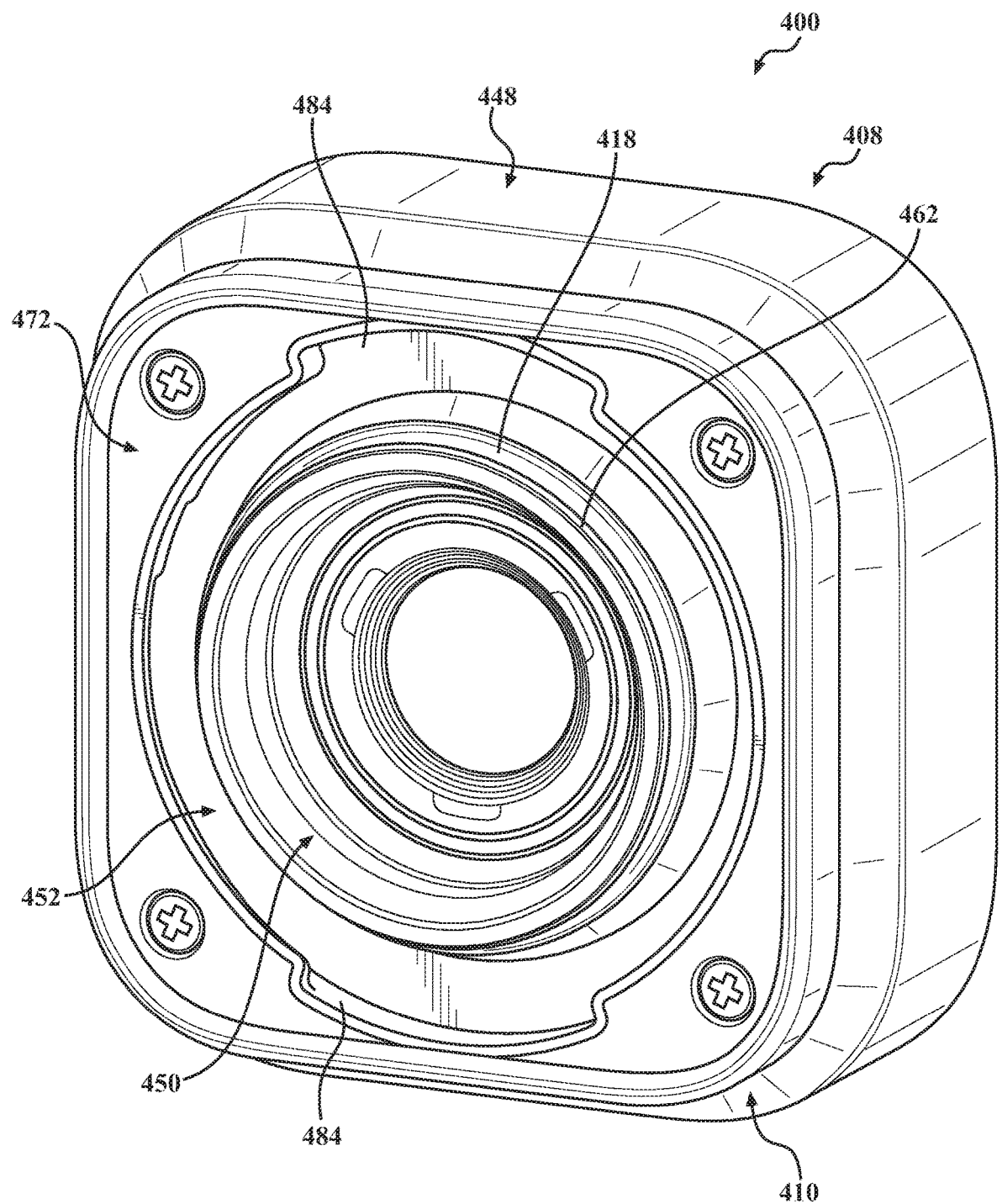
FIG. 9 is a rear, perspective view of the accessory seen in FIG. 4.
Figure 10:
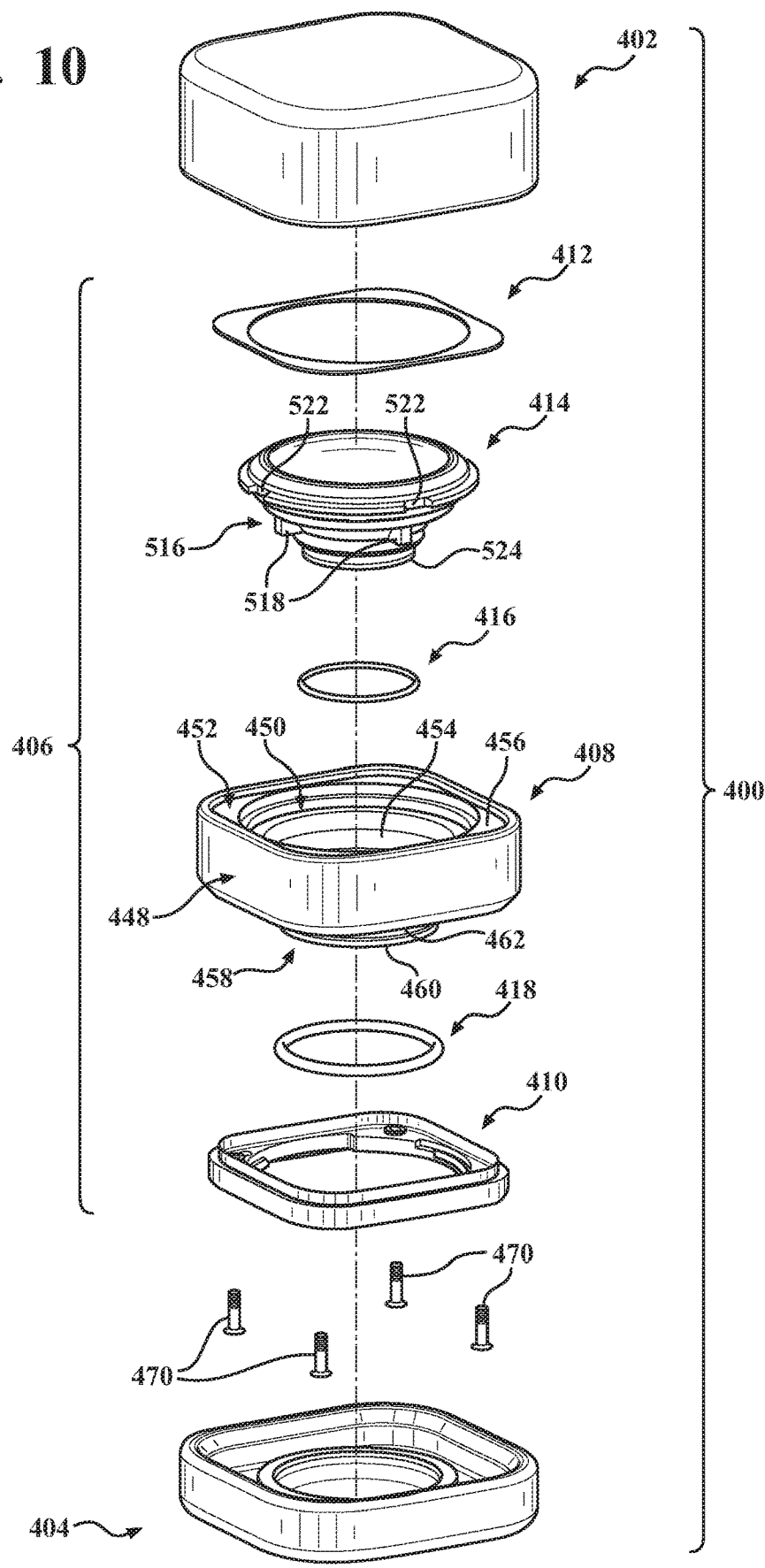
FIG. 10 is an exploded view of the accessory seen in FIG. 4 shown with parts separated.

Referring now to FIGS. 4-10, one embodiment of the accessory will be discussed, which is referred to by the reference character 400. Although generally discussed in connection with the image capture device 100 herein below, it should be appreciated that the accessory 400 may be configured for use with any image capture device, such as the various embodiments described herein (e.g., the aforedescribed image capture devices 200, 300). More specifically, FIG. 4 provides a front, perspective view of the accessory 400 shown separated from a mounting structure 140 (e.g., a bayonet 142) of the image capture device 100; FIG. 5 provides a front, perspective view of the accessory 400 shown connected to the image capture device 100 via the mounting structure 140; FIG. 6 provides a side, plan view of the image capture device 100 with the accessory 400 connected; FIG. 7 provides a rear, perspective view of the image capture device 100 with the accessory 400 connected; FIG. 8A provides a partial, perspective view of the image capture device 100 and the mounting structure 140; FIG. 8B provides a front, perspective view of the mounting structure 140; FIG. 9 provides a rear, perspective view of the accessory 400; and FIG. 10 is an exploded view of the accessory 400 shown with parts separated.

The mounting structure 140 (FIGS. 4, 8A, 8B) is connected (secured) to both the body 102 of the image capture device 100 and an ISLA 144 of the image capture device 100, which includes the lens 104 and the aforementioned image sensor, and is formed as a separate, individual structure that is discrete from both the body 102 and the ISLA 144. To reduce (if not entirely prevent) water entry into the image capture device 100 upon removal of the accessory 400, one or more sealing members (e.g., O-rings, gaskets, or the like) may be utilized to form a watertight seal between the mounting structure 140, the body 102 of the image capture device 100, and/or the ISLA 144. While it is envisioned that the mounting structure 140 may include any suitable material or combination of materials, in the particular embodiment of the disclosure illustrated throughout the figures, the mounting structure 140 includes (e.g., is formed partially or entirely from) stainless steel, which not only reduces wear on the mounting structure 140 that may otherwise result from repeated connection and disconnection of the accessory 400, but improves user feel.

The mounting structure 140 includes a (generally planar) base 146, which is configured for receipt within a corresponding receptacle 148 (e.g., an opening, or a recess) defined by the body 102 of the image capture device 100, as well as a front collar 150 that extends from the base 146 in a forward direction (e.g., towards the accessory 400). The base 146 of the mounting structure 140 is configured in correspondence with the receptacle 148 such that the base 146 seats within the receptacle 148. The base 146 includes (defines) a (central) opening 152 (FIG. 4) that is configured to receive the ISLA 144 and is connected to the body 102 of the image capture device 100 via a series of mechanical fasteners 154 (e.g., screws, pins, rivets, etc.) in either a fixed or removable fashion such that the ISLA 144 extends through the body 102 of the image capture device 100 and the mounting structure 140. Although shown as including four mechanical fasteners 154 in the illustrated embodiment, it should be appreciated that the particular number of mechanical fasteners 154 may be varied without departing from the scope of the present disclosure.

To enhance the fit and finish of the image capture device 100 and/or improve sealing between the mounting structure 140 and the body 102 of the image capture device 100, in certain embodiments, such as that illustrated throughout the figures, it is envisioned that the receptacle 148 and the base 146 of the mounting structure 140 may include corresponding radiused corner portions.

The front collar 150 of the mounting structure 140 is generally annular in configuration and defines a central opening 156 (FIG. 8B). The front collar 150 includes a front wall 158; respective inner and outer sidewalls 160, 162; and a pair of radial mounting members 164 (e.g., ears). The radial mounting members 164 are formed integrally with the front collar 150 and are configured for releasable engagement with the accessory 400 such that the accessory 400 is connectable to and disconnectable from the image capture device 100 via the mounting structure 140, as described in further detail below. While the front collar 150 is illustrated as including a pair of diametrically opposed radial mounting members 164*i*, 164*ii* in the illustrated embodiment, it should be appreciated that the particular number, location, and/or configuration of radial mounting members 164 may be varied in alternate embodiments without departing from the scope of the present disclosure (e.g., depending upon the particular configuration of the accessory 400).

The radial mounting members 164 are identical in configuration and each extend forwardly and radially outward from the front collar 150 such that each radial mounting member 164 defines an arc length A (FIG. 8B), a radial width W, and an axial dimension (e.g., a height or thickness) H. In the illustrated embodiment, for example, each radial mounting member 164 is configured such that the arc length A lies substantially within the range of approximately 8 mm to approximately 12 mm, whereby each radial mounting member 164 extends approximately 30° to approximately 60° (e.g., approximately 45°) about a periphery of the front collar 150, such that the radial width W lies substantially within the range of approximately 2 mm to approximately 4 mm, and such that the an axial dimension H lies substantially within the range of approximately 0.6 mm to approximately 0.8 mm (e.g., approximately 0.7 mm). It should be appreciated, however, that dimensions for the arc length A, the radial width W, and/or the axial dimension H outside these ranges would not be beyond the scope of the present disclosure (e.g., depending upon the particular configuration and/or intended use of the accessory 400).

Each radial mounting member 164 includes a front wall 166; a rear wall 168; an inner wall 170; an outer wall 172; a (first) sidewall 174*i*; and a (second) sidewall 174*ii*. The respective front and rear walls 166, 168 are each generally planar in configuration and extend in (generally) perpendicular (e.g., orthogonal) relation to an optical axis Y defined by the ISLA 144 so as to define a plane P. The respective front and rear walls 166, 168 extend radially beyond the outer sidewall 162 of the front collar 150 so as to define an overhang 176 (FIG. 8A) that is supported by an angled retention block (brace) 178 that is formed integrally with the front collar 150 and the corresponding radial mounting member 164.

The inner and outer walls 170, 172 of the radial mounting members 164 are arcuate in configuration and define profiles (contours) corresponding to those of the inner and outer sidewalls 160, 162 of the front collar 150 of the mounting structure 140, respectively, whereby the outer wall 172 defines a greater arc length than the inner wall 170. The inner and outer walls 170, 172 extend in concentric relation to each other and at an angle α in relation to the front wall 158 of the front collar 150. In the particular embodiment of the disclosure illustrated, for example, the radial mounting members 164 are configured such that the angle α lies substantially within the range of approximately 30° to 60° (e.g., 45°), whereby the outer wall 172 of each radial mounting member 164 defines a chamfered (angled) bearing surface 180 that extends in non-parallel relation to the optical axis Y of the ISLA 144 and radially inward towards the optical axis Y. It should be appreciated, however, that values for the angle α outside this range would not be beyond the scope of the present disclosure (e.g., to vary the interaction between the mounting structure 140 and the accessory 400 during connection and disconnection, user feel, etc.).

The sidewalls 174*i*, 174*ii* extend in non-parallel (intersecting) relation to the optical axis Y and in non-parallel (intersecting) relation to each other. More specifically, the sidewalls 174*i*, 174*ii* have a (generally) linear configuration and define chamfered (angled) bearing surfaces 182*i*, 182*ii* (FIGS. 8A, 8B), respectively, that extend in non-parallel relation to the optical axis Y so as to each form an angle β (FIG. 8A) with the plane P. In the particular embodiment of the disclosure illustrated, for example, the radial mounting members 164 are configured such that the angle β defined by each sidewall 174*i*, 174*ii* lies substantially within the range of approximately 30°-60° (e.g., 45°). It should be appreciated, however, that values for the angle β outside this range would not be beyond the scope of the present disclosure. For example, in certain embodiments of the accessory 400, which are discussed in detail below, varying the angle β may vary the force required during disconnection, thus altering user feel.

As mentioned above, the retention blocks 178 support the corresponding radial mounting members 164 and are positioned beneath the overhangs 176. More specifically, each retention block 178 includes an outer wall 184 that extends at an angle γ (FIG. 8A) in relation to the front wall 158 of the front collar 150. In the particular embodiment of the disclosure illustrated, for example, each retention block 178 is configured such that the angle γ lies substantially within the range of approximately 30°-60° (e.g., 45°), whereby the outer walls 184 of the retention blocks 178 and the outer walls 172 of the corresponding radial mounting members 164 extend in (generally) parallel (e.g., coplanar) relation. It should be appreciated, however, that values for the angle γ outside this range would not be beyond the scope of the present disclosure.

Figure 13:
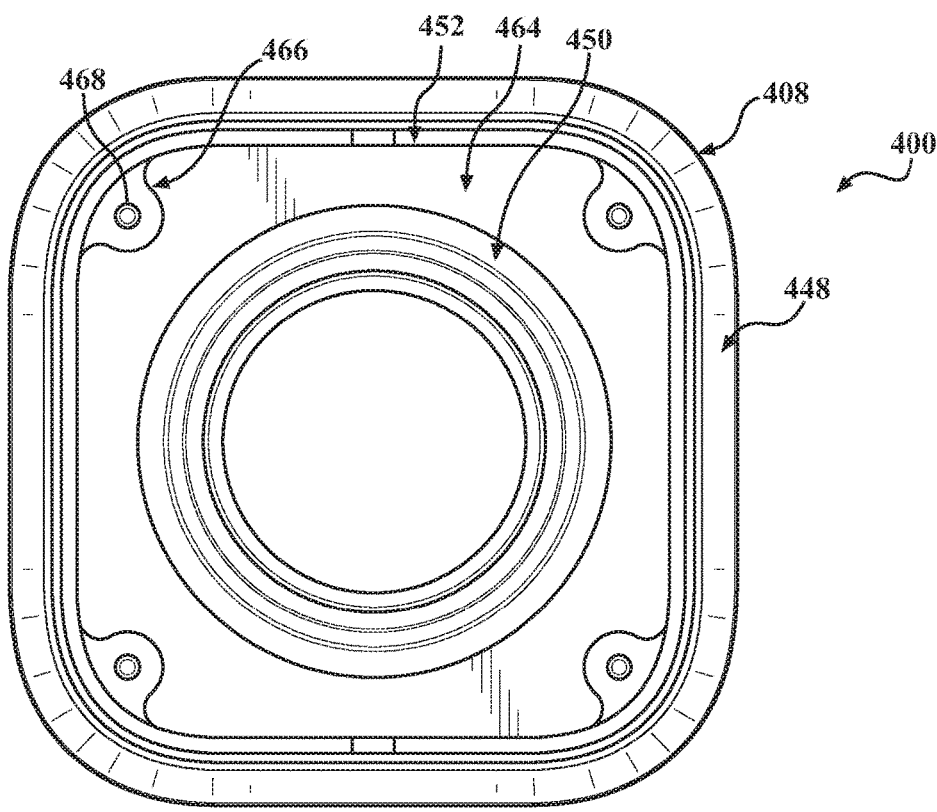
FIG. 13 is a rear, plan view of a housing of the accessory seen in FIG. 4.
Figure 14:
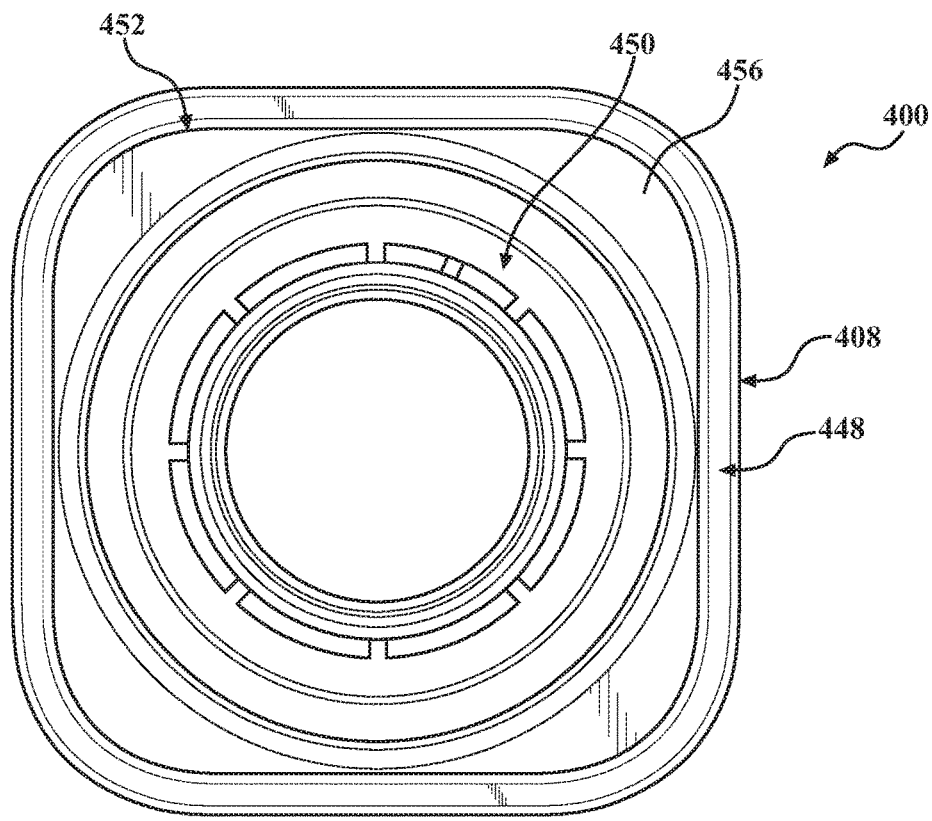
FIG. 14 is a front, plan view of the housing seen in FIG. 13.
Figure 15:
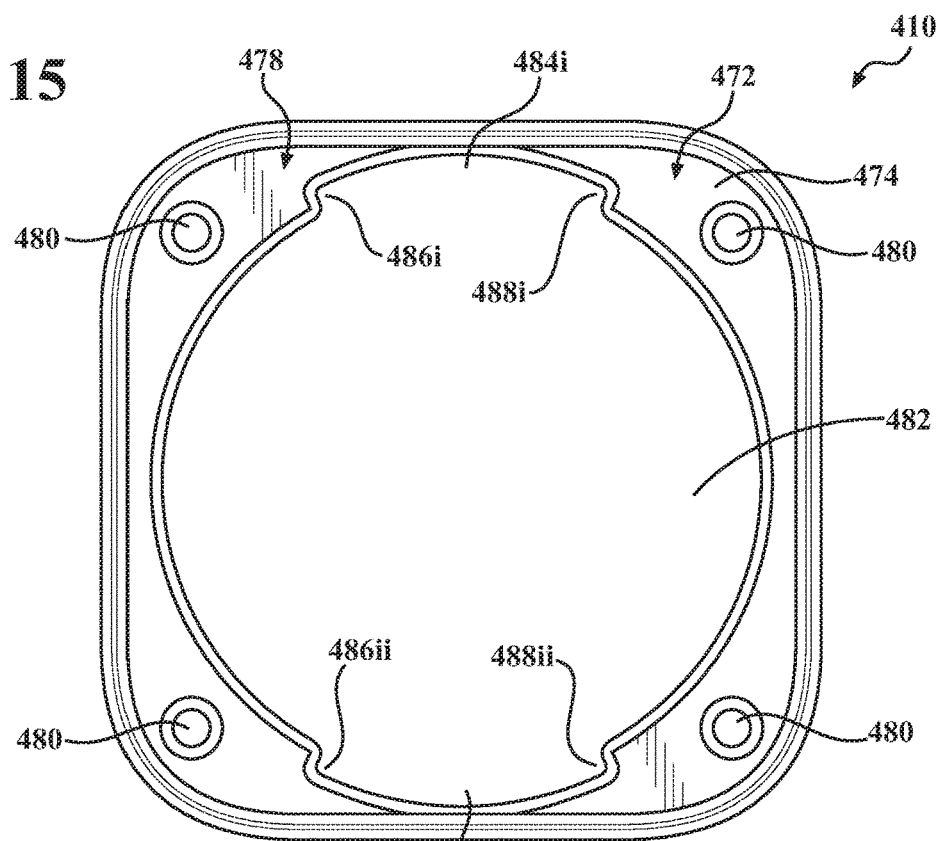
FIG. 15 is a rear, plan view of a mounting plate of the accessory seen in FIG. 4.
Figure 16:
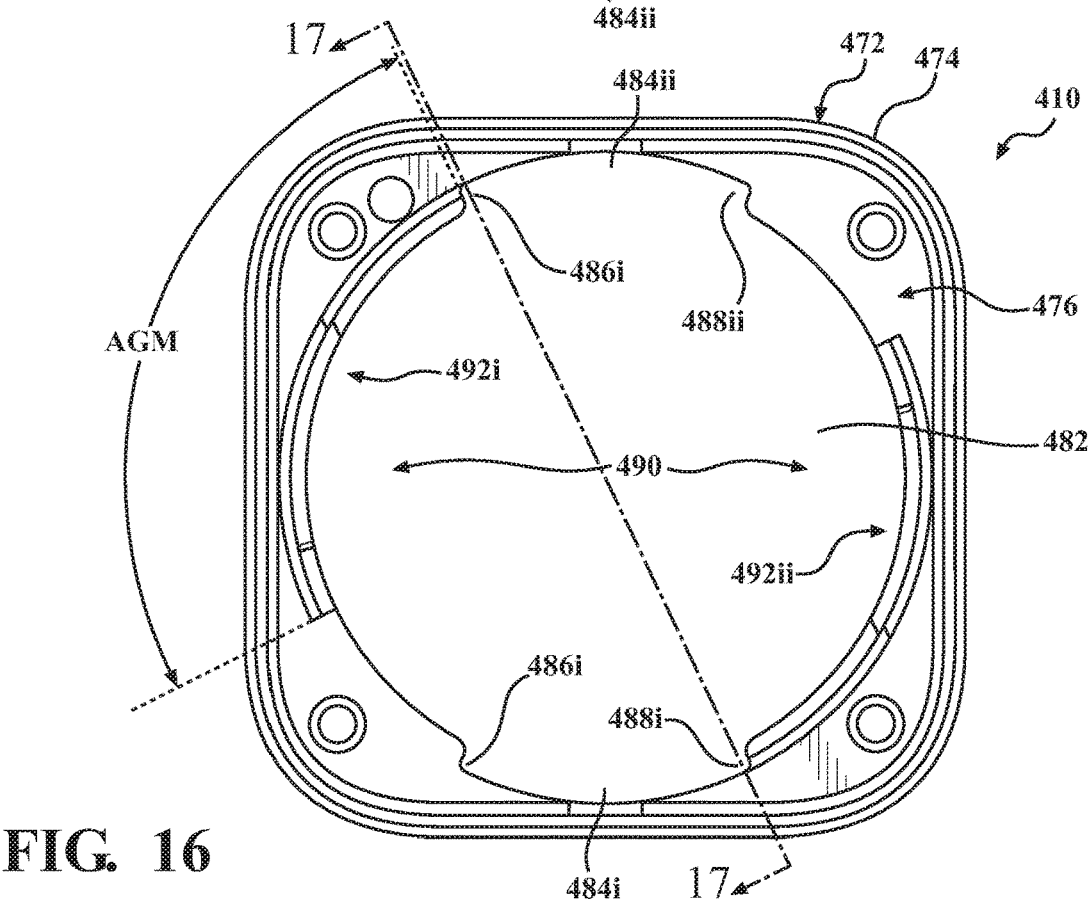
FIG. 16 is a front, plan view of the mounting plate seen in FIG. 15.
Figure 17:
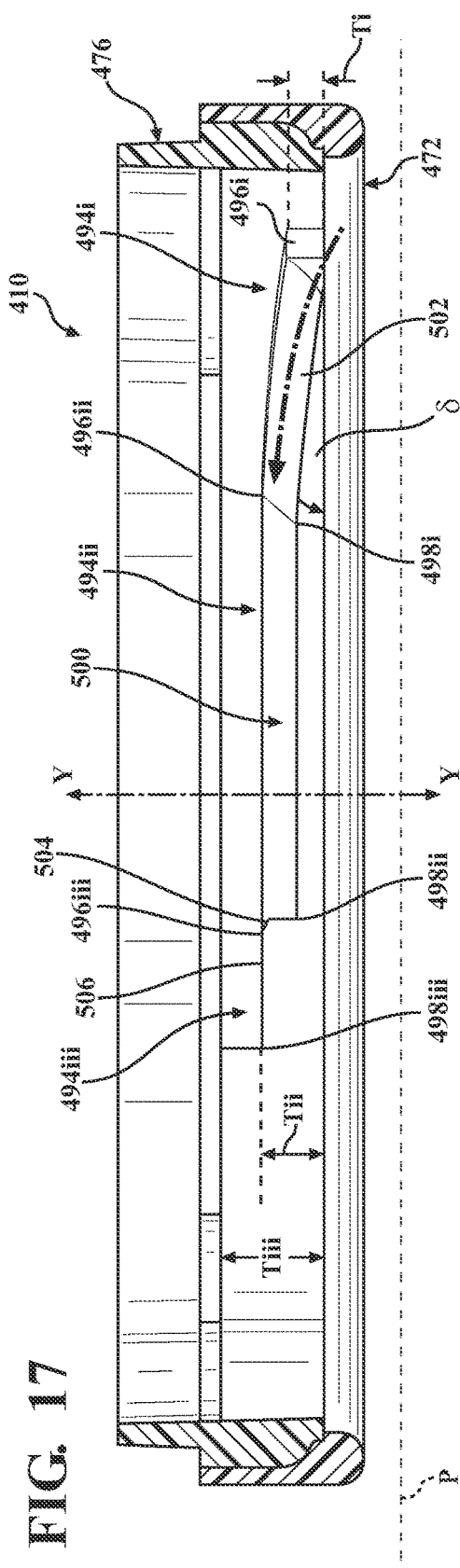
FIG. 17 is a cross-sectional view of the mounting plate taken through line 17-17 in FIG. 16.
Figure 18:
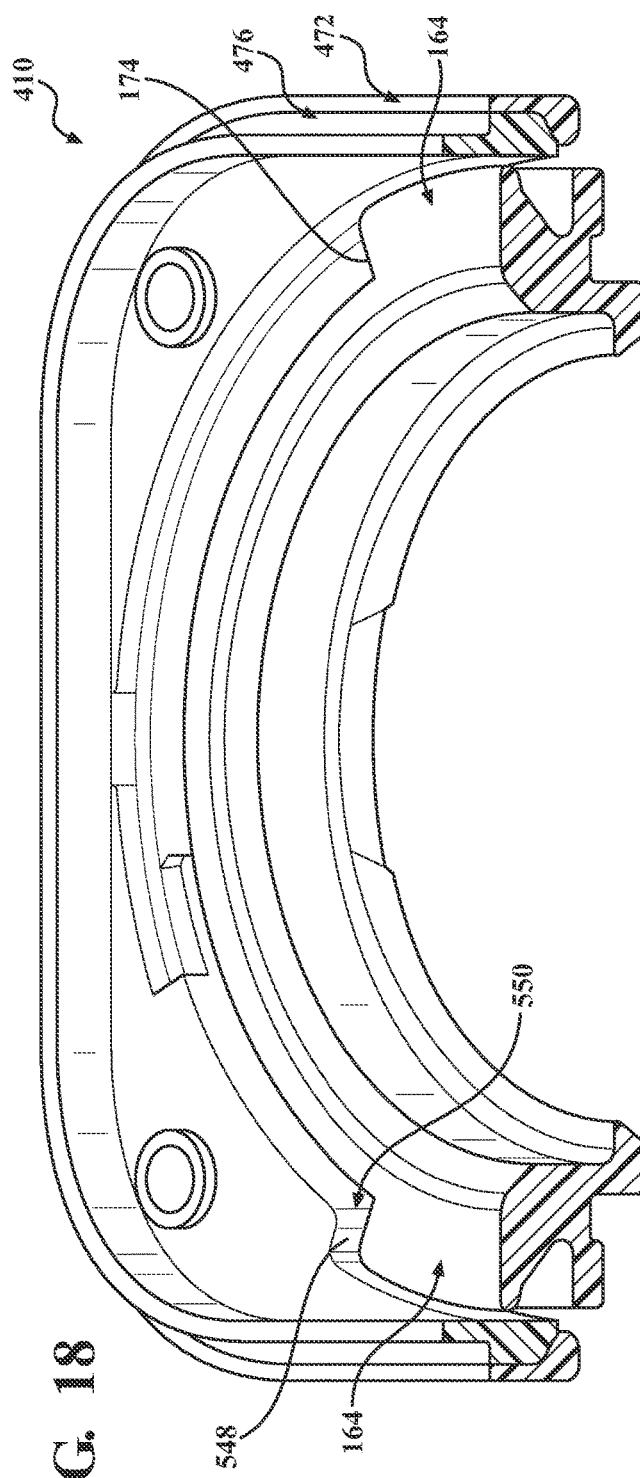
FIG. 18 is a partial, rear, perspective, cross-sectional view of the mounting plate prior to connection of the accessory seen in FIG. 4 to the mounting structure.
Figure 19:
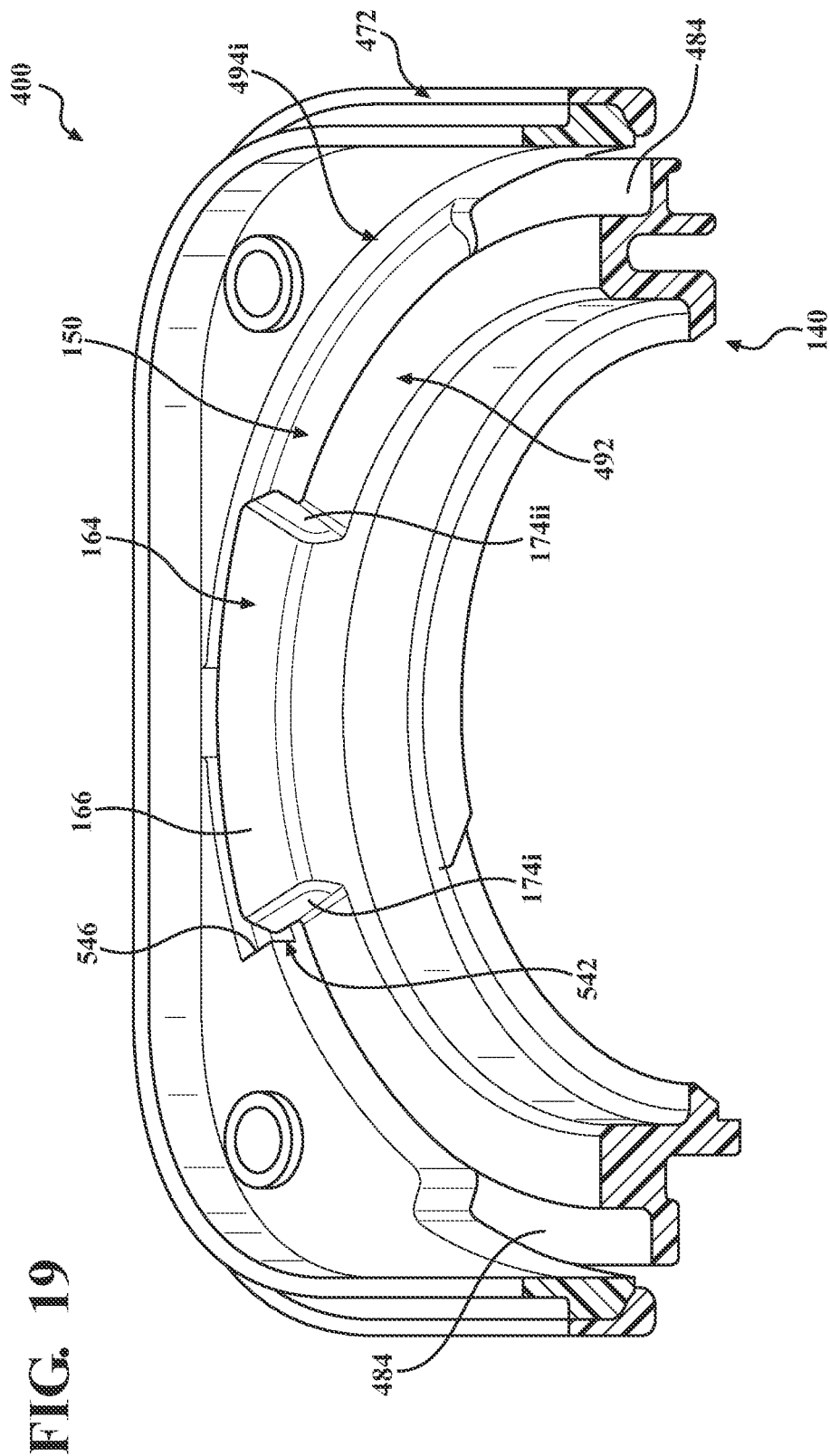
FIG. 19 is a partial, rear, perspective, cross-sectional view of the mounting plate subsequent to connection of the accessory seen in FIG. 4 to the mounting structure.

With reference now to FIGS. 11A-19 as well, the accessory 400 will be discussed. The accessory 400 is (generally) square-shaped in cross-sectional configuration and includes: a front cap (cover) 402; a rear cap (cover) 404; and a body 406 that itself includes: a main housing 408; a mounting plate 410; a finishing plate 412; a lens assembly 414; and sealing members 416, 418 (e.g., O-rings). More specifically, FIG. 11A provides a side, plan view of the accessory 400 assembled together with the caps 402, 404; FIG. 11B provides a cross-sectional view of the accessory 400 and the caps 402, 404 taken along line 11B-11B in FIG. 11A; FIG. 12 provides a partial, cross-sectional view of the accessory 400 showing connection of the rear cap 404; FIG. 13 provides a rear, plan view of the main housing 408; FIG. 14 provides a front, plan view of the main housing 408; FIG. 15 provides a rear, plan view of the mounting plate 410; FIG. 16 provides a front, plan view of the mounting plate 410; FIG. 17 provides a cross-sectional view of the mounting plate taken through line 17-17 in FIG. 16; FIG. 18 provides a partial, rear, perspective, cross-sectional view of the mounting plate 410 prior to connection of the accessory 400 to the mounting structure 140; and FIG. 19 provides a partial, rear, perspective, cross-sectional view of the mounting plate 410 subsequent to connection of the accessory 400 to the mounting structure 140.

The respective front and rear caps 402, 404 (FIGS. 11A, 11B, 12) are configured to protect the accessory 400 when connected to and disconnected from the image capture device 100 so as to inhibit (if not entirely prevent) damage that may otherwise occur (e.g., scratching of the lens assembly 414, the accumulation of dirt, dust, debris, etc.) during transport, storage, and use. The caps 402, 404, are independently removable, which allows the rear cap 404 to be removed to facilitate connection of the accessory 400 to the image capture device 100 while the front cap 402 remains in place (e.g., until use of the image capture device 100) to further guard against damage to the lens assembly 414, for example.

The front cap 402 includes a body portion 420 defining an outer surface 422*i* and a core 422*ii* that is embedded within (or otherwise supported by or connected to) the body portion 420. In the particular embodiment of the disclosure illustrated, the body portion 420 and the core 422*ii* include (e.g., are formed partially or entirely from) different materials of construction. More specifically, the body portion 420 includes (e.g., is formed partially or entirely from) a first (flexible, resilient) material (e.g., silicone) and the core 422*ii* includes (e.g., is formed partially or entirely from) a second material (e.g., polycarbonate) that is more rigid than the first material, which adds strength and/or rigidity to the front cap 402 (e.g., to protect the accessory 400 in the event that the accessory 400 is dropped). It should be appreciated, however, that the front cap 402 may include any suitable material or combinations of materials and that embodiments of the front cap 402 including one or more alternate materials of construction (e.g., rubberized materials, metallic materials, plastic materials, carbon fiber, etc.) would not be beyond the scope of the present disclosure.

The body portion 420 of the front cap 402 defines an inner cavity 424 that is configured to receive (a front portion of) the body 406 of the accessory 400 and the lens assembly 414. As seen in FIG. 11B, for example, in certain embodiments, the body portion 420 may include one or more engagement members 426 (e.g., detents, projections, etc.) that are configured to engage (contact) the body 406 (e.g., the main housing 408) in an interference (press) fit. While not shown in the particular embodiment illustrated, it is also envisioned that the body 406 of the accessory 400 may include one or more recesses, depressions, or the like that are configured to receive the engagement member(s) 426 to further enhance the fit and connection between the front cap 402 and the body 406 of the accessory 400. Alternatively, it is envisioned that the engagement member(s) 426 may be omitted and that the respective inner and outer surfaces of the front cap 402 and the body 406 of the accessory 400 may be uniform (smooth) at the interface thereof.

In the illustrated embodiment, the rear cap 404 is devoid of any internal stiffening member(s), such as the aforedescribed core 422*ii*, and includes (e.g., is formed partially or entirely from) the same material as the body portion 420 of the front cap 402 (i.e., the first material mentioned above). Embodiments including such internal stiffening member(s), however, are also contemplated herein, as are embodiments in which the material(s) of construction utilized in the rear cap 404 differ from those of the front cap 402.

As seen in FIGS. 11B and 12, the rear cap 404 includes a body portion 428 defining an outer surface 430 that is generally aligned with the outer surface 422*i* defined by the body portion 420 of the front cap 402 upon connection of the caps 402, 404 to the accessory 400. The body portion 428 of the rear cap 404 defines an inner cavity 432 and an outer cavity 434 that extends concentrically about the inner cavity 432, wherein the cavities 432, 434 are configured to receive (or otherwise accommodate) the body 406 of the accessory 400. The cavities 432, 434 are separated by a septum 436, whereby the inner cavity 432 is defined by an inner wall 438 of the septum 436 and the outer cavity 434 is defined by an outer wall 440 of the septum 436 and an inner wall 442 defined by the body portion 428 of the rear cap 404.

To facilitate connection (engagement) of the rear cap 404 and the body 406 of the accessory 400, the rear cap 404 (e.g., the septum 436) includes one or more engagement members 444. In the specific embodiment illustrated, for example, the engagement member(s) 444 include a pair of tabs (hooks) 446 that extend radially inward and are configured to engage (contact) the sealing member 418 in an interference (press) fit or a snap-fit. Due to the resilient nature of the material used in construction of the rear cap 404, when removal of the rear cap 404 is necessary or desired, during separation of the rear cap 404 from the body 406 of the accessory 400, the tabs 446 are allowed to deflect (e.g., bend) so as to permit disengagement of the tabs 446 from the sealing member 418.

The main housing 408 includes an outer frame 448; an insert 450; and inner frame 452. The main housing 408 acts as, and provides a chassis (framework) for, the remaining components of the accessory 400 and may include any material or combination of materials suitable for the intended purpose. In the particular embodiment of the accessory 400 shown throughout the figures, for example, the outer frame 448 includes (e.g., is formed partially or entirely from) one or more thermoplastic elastomers, and the insert 450 and the inner frame 452 include (e.g., are formed partially or entirely from) glass-filled polycarbonate. It should be appreciated, however, that alternate materials of construction may be utilized for any of the outer frame 448, the insert 450, and the inner frame 452 without departing from the scope of the present disclosure. To improve shock absorption and/or vibration performance, in certain embodiments, it is envisioned that main housing 408 may include a resilient overmold (e.g., formed partially or entirely from rubber, plastic, silicone, etc.).

The main housing 408 defines a chamber 454 (FIG. 10) that is configured to receive (accommodate) the lens assembly 414 as well as a recess 456 that is configured to receive (accommodate) the finishing plate 412. More specifically, the chamber 454 is collectively defined by the outer frame 448, the insert 450, and the inner frame 452, and the recess 456 is collectively defined by the respective outer and inner frames 448, 452. The insert 450 includes an extension 458 (e.g., a collar 460) that extends rearwardly (e.g., toward the body 102 of the image capture device) and is configured to support the sealing member 418. More specifically, the sealing member 418 is received within (supported by) a circumferential channel 462 defined by the extension 458. The extension 458 is configured to extend through the mounting plate 410 and into the mounting structure 140 (FIG. 4) such that the sealing member 418 is positionable between the main housing 408 and the front collar 150 on mounting structure 140 (see FIG. 20) to thereby form a watertight seal between the accessory 400 and the mounting structure 140. The configurations of the extension 458, the sealing member 418, and the mounting structure 140 are such that the main housing 408 and, thus, the lens assembly 414, are arranged in a pre-determined orientation upon connection of the accessory 400 to the image capture device 100 so as to achieve precise alignment between the ISLA 144 and the lens assembly 414 (e.g., such that the lens assembly 414 is centered along the optical axis Y of the ISLA 144).

As seen in FIG. 13, the outer frame 448 includes a rear side 464 with a series of mounts 466 (e.g., eyelets 468). The mounts 466 are configured to receive a series of mechanical fasteners 470 (FIG. 10) (e.g., screws, pins, rivets, etc.) such that the mechanical fasteners 470 extend through the mounting plate 410 and into the outer frame 448 so as to connect the mounting plate 410 to the main housing 408.

With reference now to FIGS. 15-19 in particular, the mounting plate 410 will be discussed. The mounting plate 410 includes a resilient, compressible spacer 472 (e.g., a gasket 474) and a body 476 that supports the spacer 472. As described in further detail below, the mounting plate 410 creates frictional engagement between the accessory 400 and the mounting structure 140 of the image capture device 100 to thereby fully connect (secure) the accessory 400 to the mounting structure 140 upon rotation of accessory 400 through a range of motion.

In order to facilitate compression of the mounting plate 410 while offering sufficient structural integrity, the mounting plate 410 includes multiple materials of construction. More specifically, the spacer 472 includes (e.g., is formed partially or entirely from) a first (flexible, compliant) material (e.g., silicone) and the body 476 of the mounting plate 410 includes (e.g., is formed partially or entirely from) a second (rigid) material (e.g., stainless steel), which imparts both strength and rigidity to the mounting plate 410. It should be appreciated, however, that the particular materials of construction utilized in fabrication of the mounting plate 410 may be altered in various embodiments without departing from the scope of the present disclosure and that the mounting plate 410 may include any suitable material or combinations of materials suitable.

On a rear side 478 thereof, the body 476 of the mounting plate 410 includes a series of apertures 480 that are configured to receive the mechanical fasteners 470 (FIG. 10) such that the mechanical fasteners 470 extend through the mounting plate 410 and into the outer frame 448 to connect the mounting plate 410 to the main housing 408. Additionally, the body 476 of the mounting plate 410 includes an irregular (non-circular) central opening 482 that defines a slot 484i having opposing ends 486i, 488i and a slot 484ii having opposing ends 486ii, 488ii. As described in further detail below, the slots 484 are configured in correspondence with the radial mounting members 164 on the mounting structure 140 such that the radial mounting members 164 extend through the slots 484 upon connection of the accessory 400 to the image capture device 100. While the body 476 of the mounting plate 410 is illustrated as including a pair of diametrically opposed slots 484i, 484ii in the illustrated embodiment (e.g., such that the configuration of the body 476 is symmetrical and corresponds to that of the mounting structure 140), it should be appreciated that the particular number, location, and/or configuration of slots 484 may be varied in alternate embodiments without departing from the scope of the present disclosure (e.g., depending upon the particular configuration of the mounting structure 140).

The mounting plate 410 further includes an approximation structure 490 that is configured as a pair of opposing guide members 492i, 492ii. In the illustrated embodiment, the guide members 492i, 492ii are (generally) identical and each includes an arcuate configuration. More specifically, the guide member 492i extends from a location adjacent to the end 486ii of the slot 484ii towards the guide member 492ii (and away from the end 488ii of the slot 484ii) and the guide member 492ii extends from a location adjacent to the end 488i of the slot 484i towards the guide member 492i (and away from the second end 486i of the slot 484i). The guide members 492i, 492ii each extend about a periphery of the central opening 482 in the body 476 of the mounting plate 410 between the slots 484i, 484ii so as to define equivalent arc lengths AGM. In the illustrated embodiment, the mounting plate 410 is configured such that the arc lengths AGM of the guide members 492i, 492ii and, thus, the range of motion of the accessory 400, are (approximately) 90°. It should be appreciated, however, that dimensions for the arch lengths AGM outside this range would not be beyond the scope of the present disclosure (e.g., depending upon the desired range of motion of the accessory 400 during connection and disconnection to the mounting structure 140).

As seen in FIG. 17, each guide member 492 includes a first segment 494i having opposing ends 496i, 498i; a second segment 494ii having opposing ends 496ii, 496ii; and a third segment 494iii having opposing ends 496iii, 496iii. As discussed below, the segments 494 of the guide members 492 collectively define an (interrupted) bearing surfaces 500 that extend in non-parallel relation to the optical axis Y of the ISLA 144 and that are configured for engagement with the radial mounting members 164 of the mounting structure 140.

The first segment 494i of each guide member 492 defines a thickness (height) Ti that extends in (generally) parallel relation to the optical axis Y defined by the ISLA 144 and varies between the ends 496i, 498i thereof (e.g., along the arc length AGM of the guide member 492), whereby the first segments 494i provide tapered ramps 502 that are configured for engagement with the radial mounting members 164 of the mounting structure 140. More specifically, the thicknesses Ti of the first segments 494i increases gradually (e.g., uniformly) from the first end 496i towards the second end 498i, whereby the first segments 494i each define an angle δ (FIG. 17) with the plane P (FIGS. 4, 8A, 8B). Upon engagement of the guide members 492 with the radial mounting members 164, as the accessory 400 is rotated relative to the mounting structure 140, the radial mounting members 164 traverse the ramps 502, whereby the accessory 400 is displaced inwardly towards the body 102 of the image capture device 100 by virtue of the varying thicknesses Ti of the first segments 494i, as described in further detail below. By altering the severity of the angle δ, the axial displacement resulting from rotation of the accessory 400 can also be varied.

The second segment 494ii of each guide member 492 defines a thickness Tii that is (generally) uniform between the ends 496ii, 498ii thereof. More specifically, the thicknesses Tii of the second segments 494ii are (generally) equivalent to the thicknesses Ti defined by the first segments 494i at the second ends 498i thereof, whereby the second segments 494ii each include a non-tapered configuration.

The third segment 494iii of each guide member 492 defines a thickness Tiii that is also (generally) uniform between the ends 496iii, 496iii thereof, whereby, like the second segment 494ii, the third segments 494iii each include a non-tapered configuration. The thicknesses Tiii of the third segments 494iii is greater than the thicknesses Tii defined by the second segments 494ii. The first end 496iii of each of the third segments 494iii defines a chamfer 504 that is configured to engage the radial mounting member 164 (e.g., the sidewall 174) on the mounting structure 140. Due to the angled configuration of the chamfers 504, continued rotation of the accessory 400 causes the radial mounting members 164 to traverse the chamfers 504 such that the radial mounting members 164 are positionable on platforms 506 defined by the third segments 494iii, whereby the accessory 400 is displaced further inwardly towards the body 102 of the image capture device 100.

During rotation of the accessory 400, as the accessory 400 is displaced (pulled, forced) inwardly towards the body 102 of the image capture device 100, the spacer 472 is compressed between the body 476 of the mounting plate 410 and the body 102 of the image capture device 100, which is facilitated by the flexible (compliant) material of construction used in fabrication of the spacer 472. Compression of the spacer 472 biases the body 476 of the mounting plate 410 into secured, frictional engagement with the radial mounting members 164 such that the third segments 494iii of the guide members 492 are positioned rearwardly of the corresponding radial mounting members 164 (e.g., beneath the overhangs 176 (FIG. 8A). Compression of the spacer 472 and the frictional engagement established between the radial mounting members 164 and the guide members 492 of the mounting plate 410 not only inhibits (if not entirely prevents) undesirable (rotational) movement of the accessory 400, but facilitates proper axial positioning of the lens assembly 414 relative to the lens 104 of the ISLA 144 in the intended manner to improve the quality of the content captured by the image capture device 100 through the accessory 400.

The finishing plate 412 (FIG. 10) overlays the lens assembly 414 and nests within the recess 456 formed in the main housing 408. It is envisioned that the finishing plate 412 may be secured within the recess 456 in any suitable manner, such as, for example, via the use of an adhesive, one or more mechanical fasteners (e.g., screws, pins, rivets, clips, etc.), or the like. The finishing plate 412 not only enhances the overall aesthetic of the accessory 400, but further secures the lens assembly 414 within the main housing 408, and may include any material or combination of materials suitable for those purposes. In the particular embodiment of the accessory 400 shown throughout the figures, for example, the finishing plate 412 includes (e.g., is formed partially or entirely from) stainless steel. It should be appreciated, however, that alternate materials of construction may be utilized without departing from the scope of the present disclosure.

Figure 20:
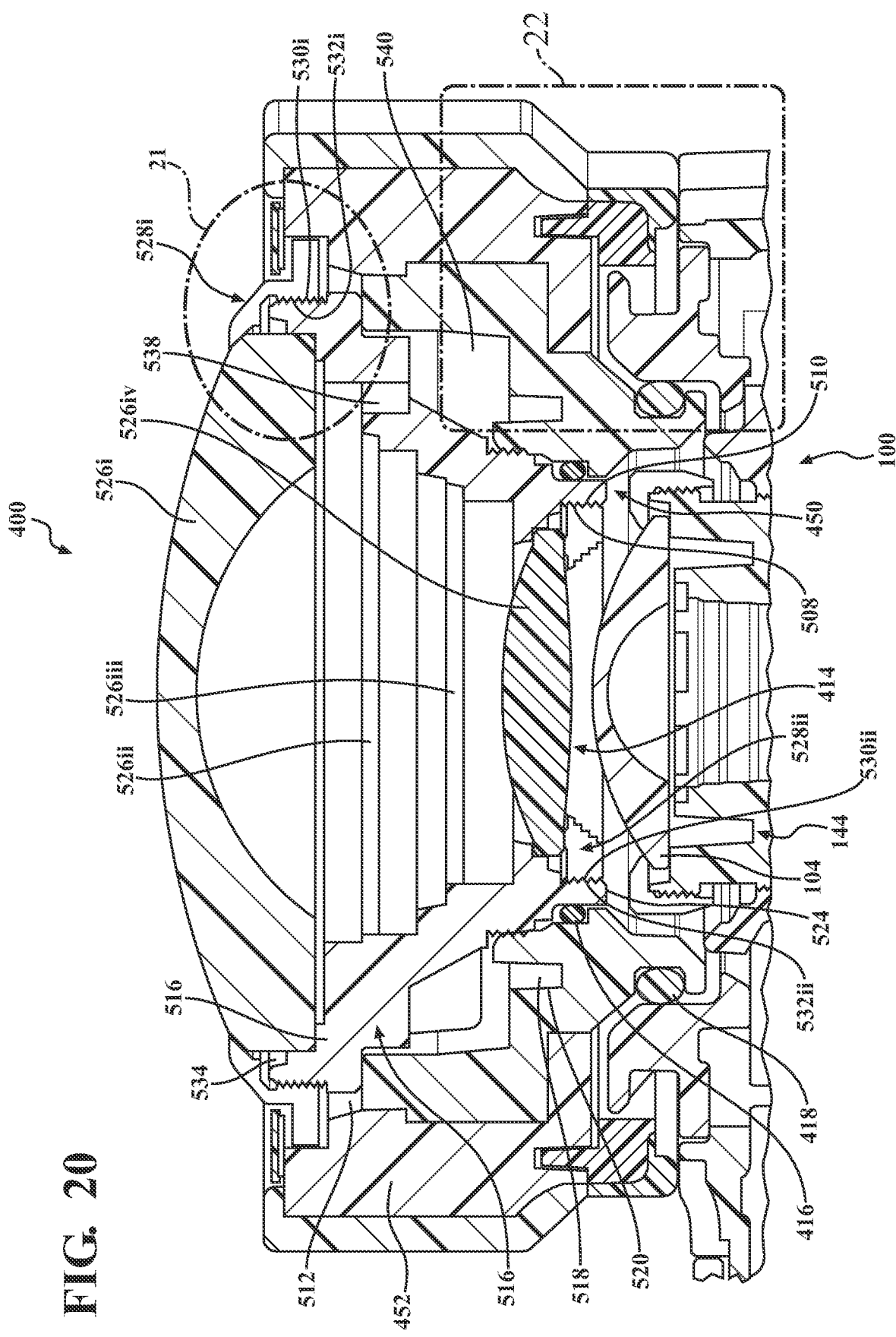
FIG. 20 is a top, cross-sectional view of the image capture device prior to connection of the accessory seen in FIG. 4 to the mounting structure.

As indicated above, the lens assembly 414 is received by (accommodated within) the chamber 454 defined by the main housing 408 such that the lens assembly 414 nests within the insert 450. To restrict (if not entirely prevent) relative movement between the lens assembly 414 and the main housing 408 upon assembly of the accessory 400, it is envisioned that the lens assembly 414 and the insert 450 may be connected in any suitable manner. For example, with reference to FIG. 20, which provides a cross-sectional view of the accessory 400 and the image capture device 100 (prior to connection), it is envisioned that the lens assembly 414 and the insert 450 may include corresponding threaded sections 508, 510, respectively, such that the lens assembly 414 and the insert 450 are threadably engageable. It is also envisioned, however, that the lens assembly 414 and the insert 450 may be press-fit together. To further enhance the connection between the lens assembly 414 and the insert 450, regardless of the method of connection, it is envisioned that an adhesive may be utilized. For example, as seen in FIG. 20, adhesive 512 may be utilized to secure an upper section 514 of a lens barrel 516 of the lens assembly 414 to the insert 450 and/or the inner frame 452.

To facilitate proper alignment of the lens assembly 414 within the main housing 408, it is envisioned that the lens assembly 414 and the main housing 408 (e.g., the insert 450) may include corresponding alignment features 518, 520 (FIGS. 10, 20), respectively. For example, it is envisioned that the lens assembly 414 and the main housing 408 may include corresponding ribs and slots, detents and recesses, etc., to prevent incorrect positioning of the lens assembly 414 and the main housing 408 during assembly of the accessory 400. Additionally, as seen in FIG. 10, the lens assembly 414 may include one or more notches 522 (or other such recesses or openings) that are configured to receive a tool (not shown) to facilitate securement of the lens assembly 414 to the main housing 408.

The lens barrel 516 includes a base portion 524 (FIG. 10) that extends rearwardly (e.g., toward the body 102 of the image capture device 100) and is configured to support the sealing member 416. More specifically, the sealing member 416 is positioned about the base portion 524 such that the sealing member 416 is located between the insert 450 and the lens barrel 516 to thereby form a seal between the lens assembly 414 and the main housing 408 upon assembly of the accessory 400 to inhibit (if not entirely prevent) the entry and/or accumulation of water, dirt, dust, debris, etc.

The lens assembly 414 is configured to vary optics of the image capture device 100 such that the image capture device 100 is operable in a first optical mode prior to connection of the accessory 400 and a second, different optical mode subsequent to connection of the accessory 400. For example, it is envisioned that the lens assembly 414 may be configured to support image capture through narrow or extra-wide fields-of-view (e.g., such that the lens assembly 414 acts as a macro (shorter focus) lens or a zoom lens), that the lens assembly 414 may be configured to facilitate the capture of spherical (or semi-spherical) images, and/or that the lens assembly 414 may be configured to support telescopic image capture. To support such functionality, the lens assembly 414 includes a series of lenses 526 that are supported by the lens barrel 516. In the illustrated embodiment, for example, with reference to FIG. 20, the lens assembly 414 includes a (first) lens 526i, a (second) lens 526ii, a (third) lens 526iii, and a (fourth) lens 526iv. The lenses 526i, 526iv are secured to the lens barrel 516 via respective (first and second) retainers 528i, 528ii. More specifically, the retainer 528i includes an (inner) threaded section 530i that is configured for engagement with a corresponding (outer) threaded section 532i on the lens barrel 516, and the retainer 528ii includes an (outer) threaded section 530ii that is configured for engagement with a corresponding (inner) threaded section 532ii on the base portion 524 of the lens barrel 516. The retainers 528i, 528ii provide a mechanical mechanism by which the relative positions of the lenses 526 are maintained to thereby maintain consistent focal lengths. To further secure the lenses 526i, 526iv within the lens barrel 516, it is envisioned that perimeter adhesive 534 may be utilized to thereby fully seal the lenses 526 again water ingress.

Figure 21:
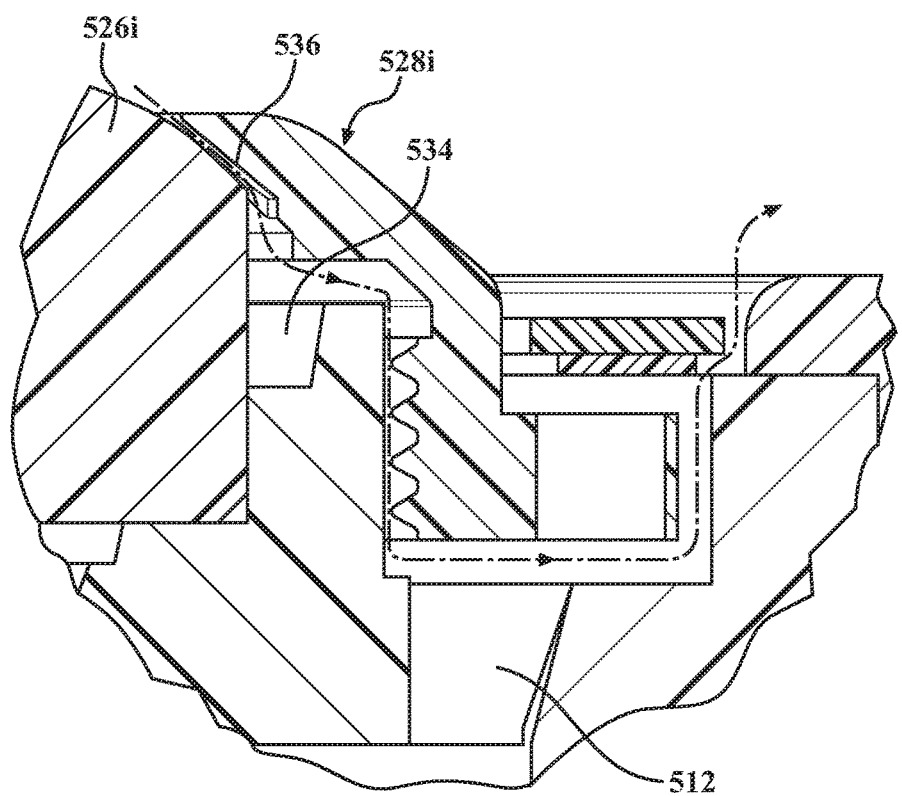
FIGS. 21 and 22 are enlargements of the areas of detail identified in FIG. 20.

With reference to FIG. 21, which provides an enlargement of the corresponding area of detail identified in FIG. 20, the accessory 400 may define one or more channels 536 to facilitate proper water drainage. In the particular embodiment illustrated, for example, the channel(s) 536 extends between the lens 526i, the retainer 528i, the lens barrel 516, the inner frame 452, and the outer frame 448. The channel(s) 536 are configured to communicate (wick) water and/or moisture away from the lens 526i to a location external of the accessory 400 to inhibit accumulation within the accessory 400, which improves the overall quality of the content captured through the accessory 400 when the accessory 400 is used in a moist or wet environment.

To allow for proper pressure adjustment and/or mitigate thermal expansion, in certain embodiments, such as that seen in FIG. 20, for example, the lens assembly 414 may include a vent 538. The vent 538 is in communication with a (sealed) vent cavity 540 that is defined between the lens barrel 516 and the insert 450 (upon assembly of the accessory 400), which allows excess air and/or pressure to enter the vent cavity 540 through the vent 538 to reduce internal pressure and inhibit (if not entirely prevent) shifting in the positions of the lenses 526 that might otherwise occur.

Figure 22:
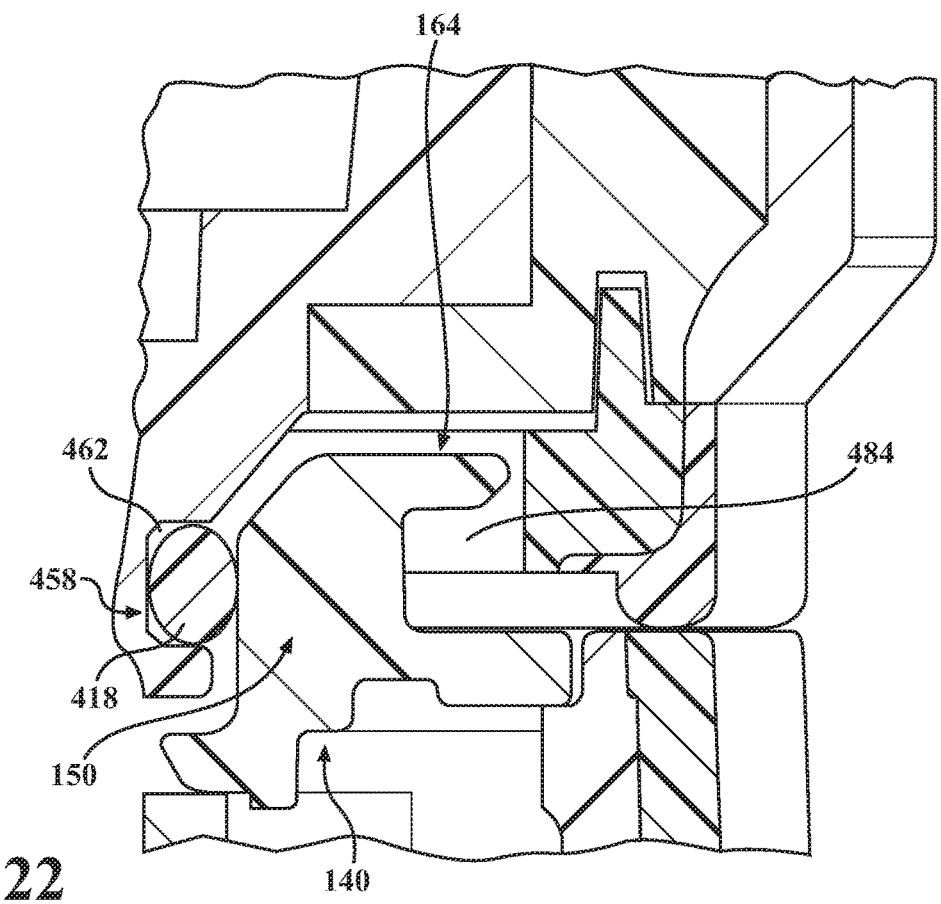
Figure 23:
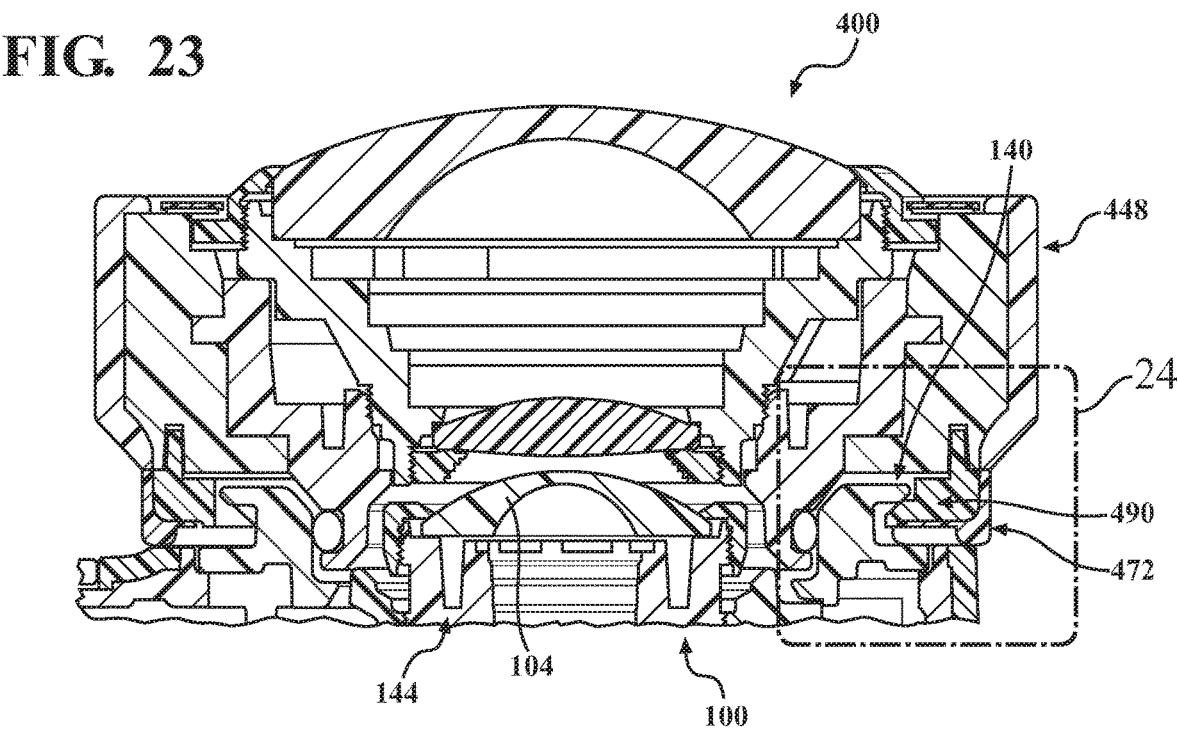
FIG. 23 is a top, cross-sectional view of the image capture device during connection of the accessory seen in FIG. 4 to the mounting structure.
Figure 24:
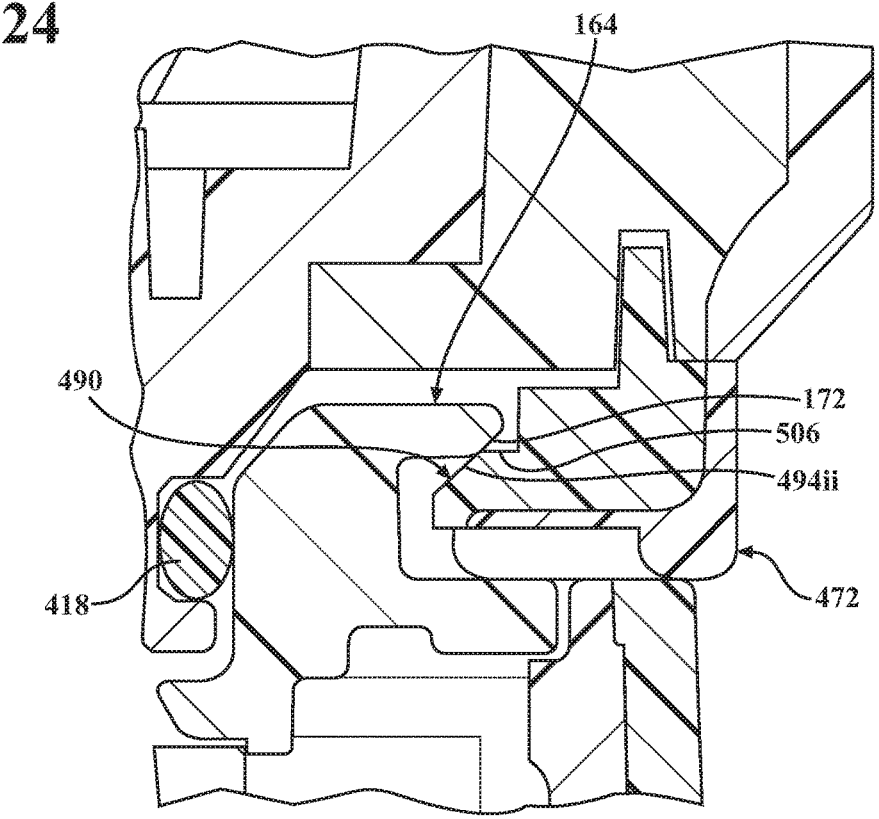
FIG. 24 is an enlargement of the area of detail identified in FIG. 23.
Figure 25:
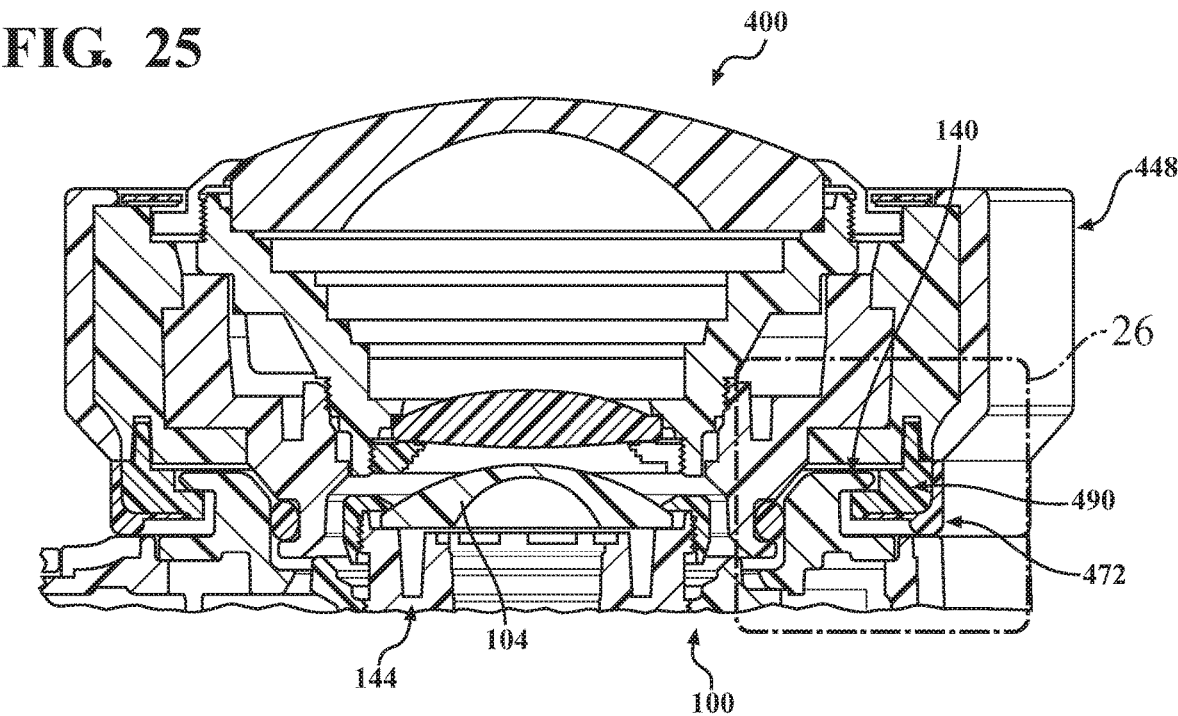
FIG. 25 is a top, cross-sectional view of the image capture device subsequent to connection of the accessory seen in FIG. 4 to the mounting structure.
Figure 26:
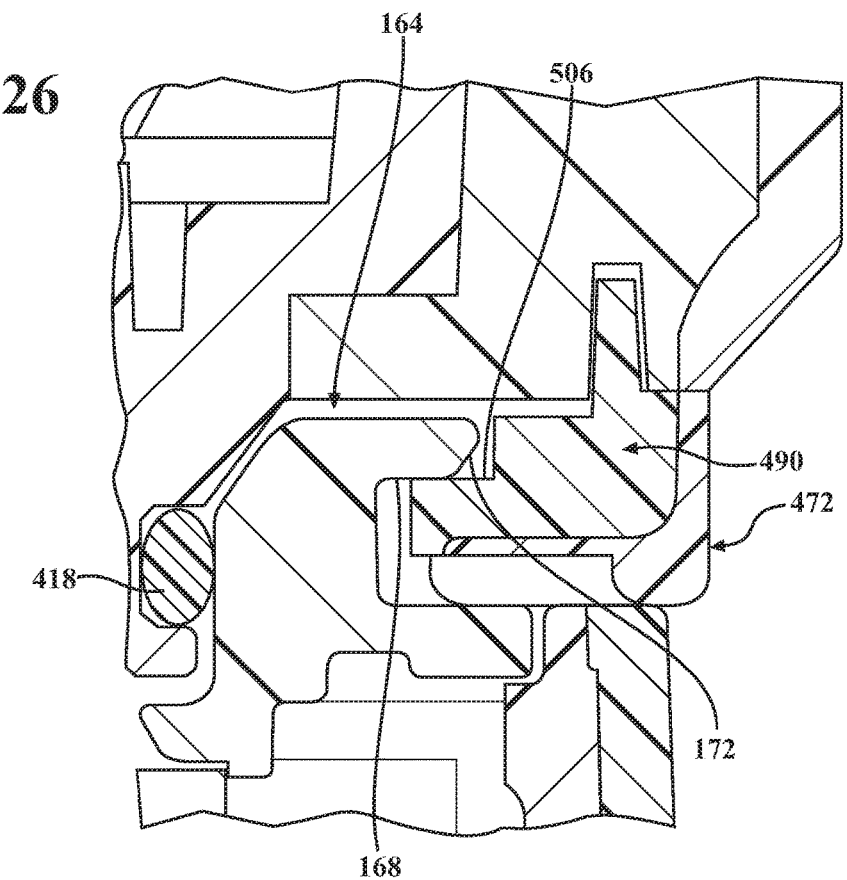
FIG. 26 is an enlargement of the area of detail identified in FIG. 25.

Referring now to FIGS. 22-26 as well, connection and assembly of the accessory 400 to the image capture device 100 will be discussed. More specifically, FIG. 22 provides an enlargement of the corresponding area of detail identified in FIG. 20; FIG. 23 provides a top, cross-sectional view of the image capture device 100 during connection of the accessory 600; FIG. 24 provides an enlargement of the corresponding area of detail identified in FIG. 23; FIG. 25 provides a top, cross-sectional view of the image capture device 100 subsequent to connection of the accessory 400; and FIG. 26 provides an enlargement of the corresponding area of detail identified in FIG. 25.

Initially, the accessory 400 is oriented in a first (connection) position (FIG. 4) in which an outer profile (contour) of the accessory 400 corresponds to that of the body 102 of the image capture device 100, whereby the outer surfaces of the accessory 400 are oriented in (generally) parallel relation to corresponding outer surfaces of the body 102 of the image capture device 100. When so oriented, the slots 484 (FIGS. 9, 15, 16) defined in the mounting plate 410 are aligned with the radial mounting members 164 on the mounting structure 140 such that, as the accessory 400 is advanced towards the body 102 of the image capture device 100, the radial mounting members 164 pass through the slots 484. As the radial mounting members 164 pass through the slots 484, the radial mounting members 164 are positioned adjacent to the ends 496i (FIG. 17) of the first segments 494i of each guide member 492 and the insert 450 extends into the mounting structure 140. Upon insertion of the insert 450 into the mounting structure 140, the sealing member 418 engages the front collar 150, as seen in FIG. 22, for example, to thereby form a watertight seal between the accessory 400 and the mounting structure 140.

Following alignment of the radial mounting members 164 and the slots 484, the accessory 400 is rotated in a first direction (e.g., clockwise), whereby the outer wall 172 (FIG. 8A) of each radial mounting member 164 is caused to engage and traverse the first segments 494i (FIG. 17) of the guide members 492. Due to the increasing thickness Ti of the first segments 494i, as the accessory 400 is rotated relative to the mounting structure 140, a bearing effect is created via engagement (contact) between the bearing surface 180 defined by the outer wall 172 of each radial mounting member 164 and the bearing surface 500 defined by each guide member 492. The bearing effect causes inward displacement of the accessory 400 (e.g., towards the body 102 of the image capture device 100), which results in initial compression of the spacer 472 of the mounting plate 410 and reception of the ISLA 144 (e.g., the lens 104) within the central opening 482 (FIGS. 15, 16) defined by the body 476 of the mounting plate 410. The inward displacement of the accessory 400 resulting from the bearing effect created via engagement (contact) between the radial mounting members 164 and the guide members 492 obviates any need to apply an axial (pushing) force to the accessory 400 during connection. Depending upon the particular configuration of the mounting plate 410 (e.g., the material(s) of construction used in the spacer 472, the particular pitch of the first segments 494i, etc.), it is envisioned that the user may be provided with a tactile indication that the accessory 400 is being properly connected in the form of increased rotational resistance.

As rotation of the accessory 400 continues, the radial mounting members 164 engage and traverse the second segments 494ii of the guide members 492 until the radial mounting members 164 are brought into engagement (contact) with the chamfers 504 defined by the first end 496iii of the third segments 494iii. Upon engagement (contact) between the radial mounting members 164 and the chamfers 504, continued rotation of the accessory 400 causes the radial mounting members 164 to bear against and traverse the chamfers 504 until the radial mounting members 164 are drawn onto the platforms 506 defined by the third segments 494iii, which results in additional compression of the spacer 472 and additional inward displacement of the accessory 400. Depending upon the difference in the relative thicknesses Tii, Tiii of the segments 494ii, 494iii and the extent to which the spacer 472 is compressed, it is envisioned that the user may be provided with an additional tactile indication that the accessory 400 is being properly connected via increased rotational resistance as the radial mounting members 164 traverse the chamfers 504.

As can be appreciated through reference to FIG. 19, upon complete connection of the accessory 400 to the mounting structure 140, the accessory 400 is moved into a second (installed) position (FIG. 5). In the second position, the radial mounting members 164 are positioned adjacent to inner walls 542 defined by the third segments 494*iii* (FIG. 17) of the guide members 492. The inner walls 542 thus provide stops 546 that prevent continued rotation of the accessory 400 relative to the mounting structure 140, thereby defining an upper limit for the rotational range of motion for the accessory 400. It is envisioned that, in addition to a tactile indication that the accessory 400 has been fully connected (secured) to the mounting structure 140, engagement (contact) between the radial mounting members 164 and the inner walls 542 may provide the user with an audible indication that the accessory 400 has being properly and completely connected.

Together with the (generally) square-shaped cross-sectional configuration of the accessory 400, the (approximately) 90° range of motion defined by the guide members 492 provides the user with visual indications as to not only the proper initial orientation of the accessory 400 required to facilitate insertion of the radial mounting members 164 into the slots 484 defined in the mounting plate 410, but proper and complete connection of the accessory 400. More specifically, as the accessory 400 is moved from the first position (FIG. 4) through its (approximately) 90° range of motion, upon proper and complete connection of the accessory 400, the objective appearance of the accessory 400 in the second position (FIG. 5) is (generally) identical to that of the accessory 400 in the first position, whereby any angular offset between the profiles (contours) of the accessory 400 and the body 102 of the image capture device 100 will signal to the user that the accessory 400 has either been improperly or incompletely connected.

To disconnect the accessory 400 from the mounting structure 140, the accessory 400 is rotated in a second direction (e.g., counterclockwise) that is opposite to the first direction, whereby the radial mounting members 164 are caused to traverse the third segments 494*iii* (FIG. 17) of the guide members 492. As rotation continues, the radial mounting members 164 traverse the chamfers 504 defined by the first ends 496*iii* of the third segments 494. As the radial mounting members 164 clear the chamfers 504, the bias created in the spacer 472 during compression urges the accessory 400 outwardly (e.g., away from the body 102 of the image capture device 100 and along the optical axis Y of the ISLA 144). Continued rotation of the accessory 400 causes the radial mounting members 164 to traverse the second segments 494*ii* of the guide members 492 until the radial mounting members 164 are again brought into engagement (contact) with the first segments 494*i*. As the radial mounting members 164 traverse the first segments 494*i*, the remaining bias created in the spacer 472 created during compression urges the accessory 400 further outwardly, which is also facilitated by the reduction in the thickness Ti of the first segments 494*i* towards the end 496*i* thereof. Together with the angled configurations of the outer walls 172 of the radial mounting member 164 and the guide members 492, the bias created in the spacer 472 during compression results in sufficient outward displacement of the accessory 400, thereby reducing (if not entirely obviating) any need to apply an axial (pulling) force to the accessory 400 during disconnection.

Upon return of the accessory 400 to the first position, the radial mounting members 164 on the mounting structure 140 are positioned adjacent to inner walls 548 (FIG. 18) defined by the slots 484. The inner walls 548 thus provide stops 550 that prevent continued rotation of the accessory 400 relative to the mounting structure 140 in the second direction, thereby providing the user with a (tactile and/or audible) indication that the radial mounting members 164 and the slots 484 are aligned and, thus, that the accessory 400 can be separated from the mounting structure 140.

Following disconnection of the accessory 400 from the image capture device 100, the front cap 402 and the rear cap 404 can be connected to the accessory 400 (FIG. 11A) to protect the accessory 400 during non-use (e.g., transport, storage, etc.).

Figure 27:
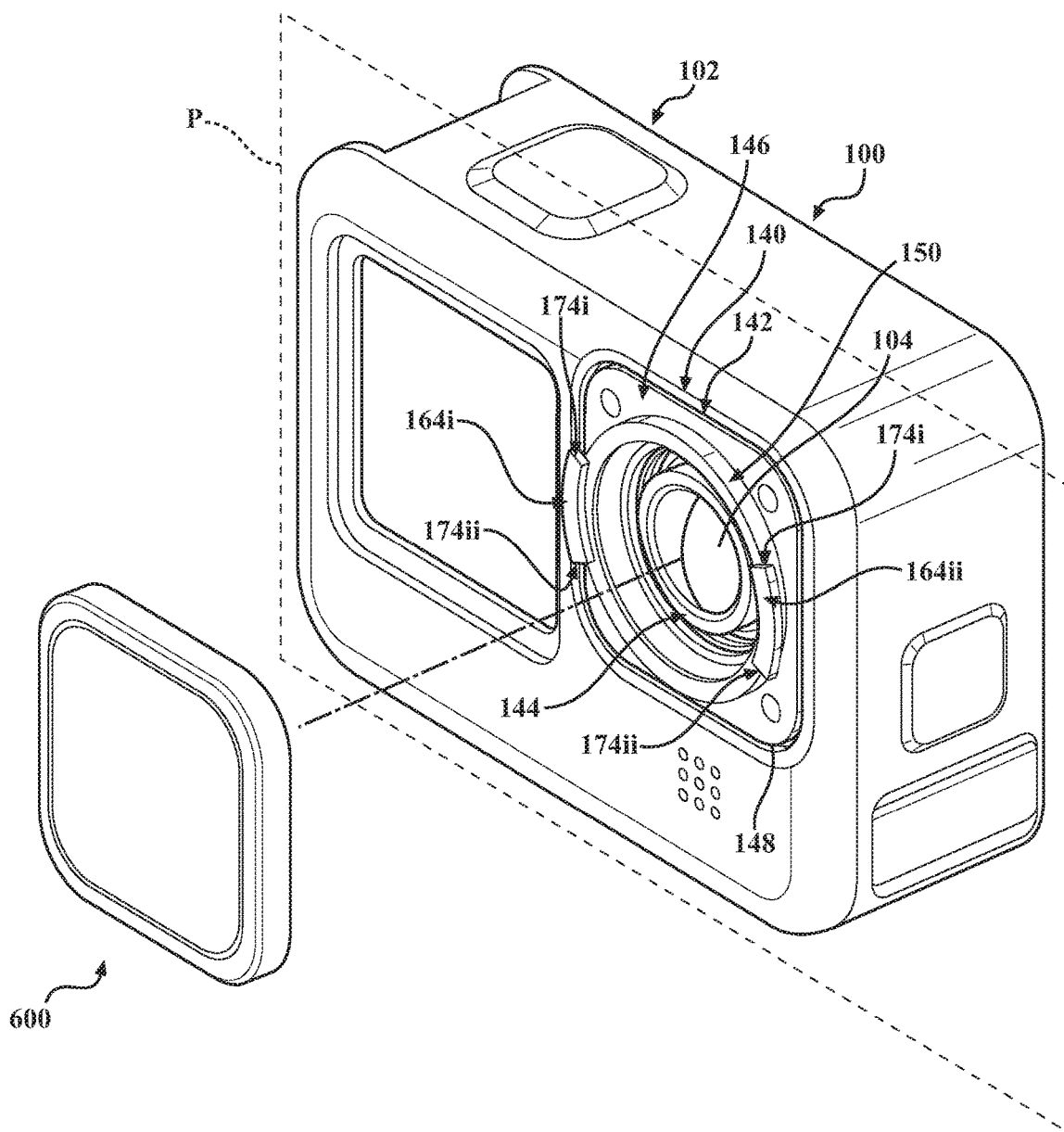
FIG. 27 is a front, perspective view of the image capture device seen in FIG. 4 shown with an alternate embodiment of the accessory according to another aspect of the present disclosure.
Figure 29:
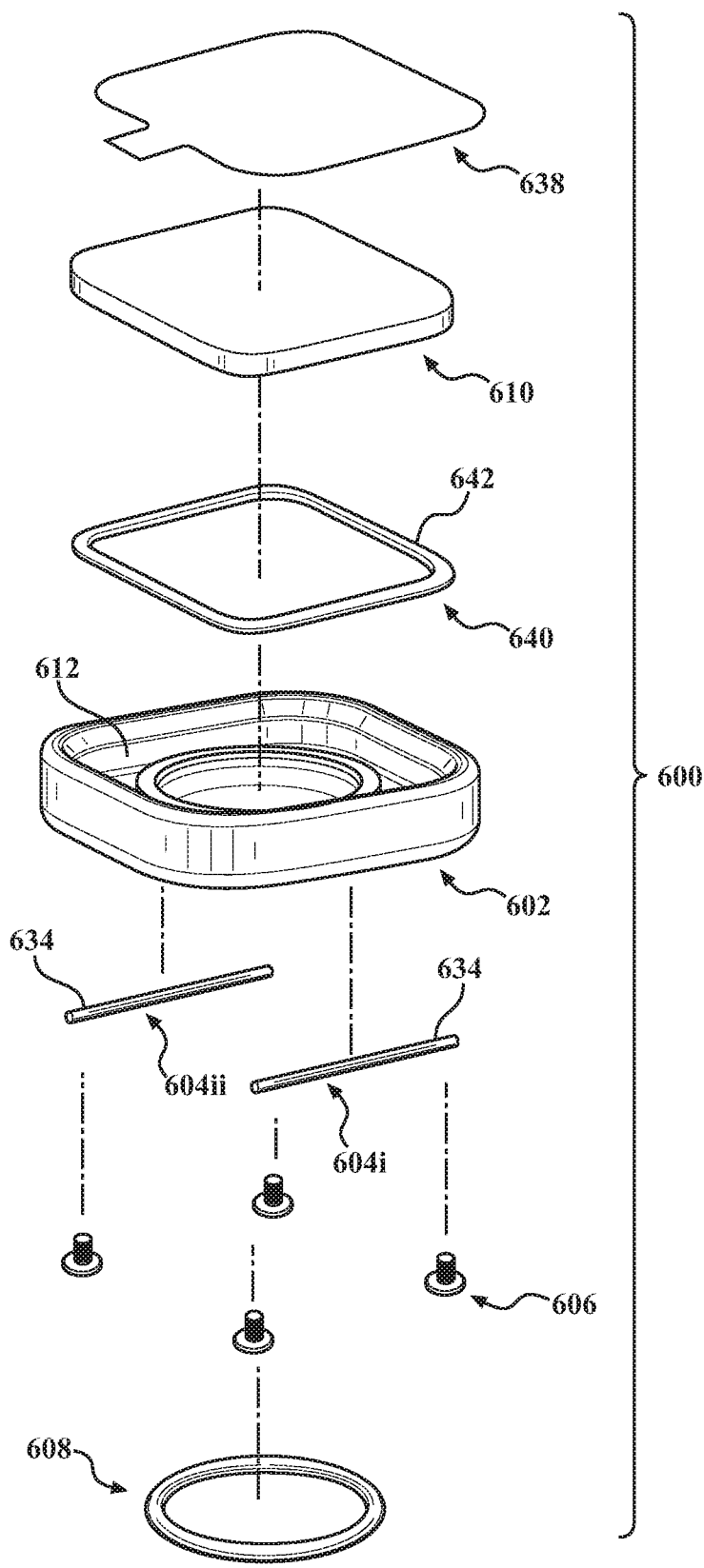
FIG. 29 is an exploded view of the accessory seen in FIG. 27 shown with parts separated.

Referring now to FIGS. 27-29, another embodiment of the accessory will be discussed, which is referred to by the reference character 600. Specifically, FIG. 27 provides a front, perspective view of the accessory 600 shown separated from the mounting structure 140 of the image capture device 100; FIG. 28A provides a rear, perspective view of the accessory 600; FIG. 28B provides a partial, schematic view of the accessory 600; and FIG. 29 provides an exploded view of the accessory 600 shown with parts separated. The accessory 600 defines a transverse cross-sectional area (e.g., a footprint) that substantially approximates that defined by the accessory 400 discussed above (FIGS. 4-26) and functions as a removable cap that protects and conceals the ISLA 144. As described in detail below, the accessory 600 includes: a frame 602; retainers 604*i*, 604*ii* that are connected to the frame 602 by mechanical fasteners 606; a sealing member 608; and an insert 610. While the accessory 600 is shown as being generally square-shaped in configuration throughout the figures (e.g., such that the accessory 600 and the aforedescribed accessory 400 share a similar overall aesthetic), it should be appreciated that the specific configuration of the accessory 600 may be varied in alternate embodiments without departing from the scope of the present disclosure (e.g., depending upon the particular configuration of the ISLA 144 and/or the body 102 of the image capture device 100, the desired aesthetic appearance of the image capture device 100, etc.).

The frame 602 defines an internal chamber 612 that is configured to receive the insert 610 and a (generally annular) extension (barrel) 614. The extension 614 defines a central opening 616 and extends rearwardly (e.g., towards the body 102 of image capture device 100 and away from the insert 610). The extension 614 defines an outer transverse cross-sectional dimension (e.g., a diameter) that closely approximates an inner transverse cross-sectional dimension (e.g., a diameter) of the central opening 156 (FIG. 8B) defined by the front collar 150 of the mounting structure 140. For example, it is envisioned that the outer transverse cross-sectional dimension (e.g., a diameter) defined by the extension 614 may be within 0.2 mm of the inner transverse cross-sectional dimension defined by the central opening 156.

On a rear side (surface) 618 thereof, the frame 602 defines recesses 620 (FIGS. 28A, 28B) with configurations corresponding to those of the radial mounting members 164 of the mounting structure 140. The corresponding (complimentary) configurations of the recesses 620 and the radial mounting members 164 not only facilitates proper connection and seating of the accessory 600, but increases stability of the accessory 600 upon connection to the mounting structure 140 to inhibit (if not entirely prevent) unintended relative movement between the accessory 600 and the image capture device 100 (e.g., rattling, pivoting, etc.), thereby reducing localized wear on the accessory 600 and/or the mounting structure 140.

In the illustrated embodiment, the accessory 600 includes a pair of diametrically opposed recesses 620*i*, 620*ii* that are respectively configured in correspondence with the pair of radial mounting members 164*i*, 164*ii* included of the particular embodiment of the mounting structure 140 shown. In alternate embodiments, however, the particular number, location, and/or configuration of recesses 620 may be varied without departing from the scope of the present disclosure depending upon the particular configuration of the mounting structure 140.

The recesses 620 are configured to receive the radial mounting members 164 upon connection of the accessory 600 and, thus, act as locating features that facilitate proper orientation of the accessory 600 relative to the mounting structure 140. To facilitate receipt of the radial mounting members 164, each recess 620 defines a depth D the lies substantially within the range of approximately 0.25 mm to approximately 0.75 mm (e.g., 0.5 mm). Each recess 620 defines (generally) linear sidewalls 622*i*, 622*ii* that are connected by arcuate inner and outer walls 624, 626, respectively. The sidewalls 622*i*, 622*ii* each extend at an angle c in relation to the plane P (FIGS. 28A, 28B) in non-parallel relation (e.g., along intersecting axes) so as to define chamfered (angled) bearing surfaces 628*i*, 628*ii* that are configured in correspondence with the bearing surfaces 182*i*, 182*ii* (FIGS. 8A, 8B) respectively defined by the sidewalls 174*i*, 174*ii* of the radial mounting members 164 of the mounting structure 140. More specifically, the recesses 620 are configured such that the angle c defined by the sidewalls 622 is (substantially) identical to the angle γ (FIG. 8A) defined by the sidewalls 174 of the radial mounting members 164. As such, in the illustrated embodiment, the recesses 620 are configured such that the angle c that lies substantially within the range of approximately 30° to 60° (e.g., 45°). It should be appreciated, however, that values for the angle c outside this range would not be beyond the scope of the present disclosure. For example, the configuration of the recesses 620 may be varied in alternate embodiments depending upon the particular configuration of the mounting structure 140 (e.g., the radial mounting members 164) and/or the desired user feel during connection and disconnection of the accessory 600, which is described in further detail below.

The retainers 604 are received by receptacles 630 that are supported on (e.g., formed integrally with) the rear side 618 of the frame 602. The retainers 604 are secured within the receptacles 630 via the mechanical fasteners 606, which extend into bosses 632 that are positioned laterally outwardly of the recesses 620 in corner sections of the accessory 600. In the illustrated embodiment, the accessory 600 includes a pair of identical retainers 604*i*, 604*ii* that are configured as flexible, resiliently deflectable wireforms 634, each of which includes a (generally) linear initial configuration (e.g., in the absence of any applied force). It should be appreciated, however, that the specific configuration of the retainers 604 may be varied in alternate embodiments of the disclosure, and that the retainers 604 may be configured in any manner suitable for the intended purpose of securing the accessory 600 to the mounting structure 140 in the manner described herein below. Additionally, while the retainers 604 illustrated throughout the figures are envisioned as including (e.g., as being formed partially or entirely from) spring steel, it should be appreciated that the particular material(s) of construction utilized in fabrication of the retainers 604 may be altered or varied in alternate embodiments without departing from the scope of the present disclosure.

The sealing member 608 is supported within a circumferential channel 636 (FIG. 28A) defined by the extension 614 such that the extension 614 and the sealing member 608 extend into the central opening 156 (FIG. 8B) defined by the front collar 150 of the mounting structure 140 upon connection of the accessory 600 to the image capture device 100. The sealing member 608 is substantially similar (if not identical) to the sealing member 418 discussed above with respect to the accessory 400 and is configured to sealingly engage the front collar 150 to thereby form a watertight seal between the accessory 600 and the mounting structure 140 upon connection.

The insert 610 is supported within the internal chamber 612 defined by the frame 602 and may include (e.g., may be formed partially or entirely from) a variety of materials in various embodiments of the disclosure depending, for example, upon the particular desired optical effect of the accessory 600. For example, it is envisioned that the insert 610 may include (e.g., may be formed partially or entirely from) an optically clear material so as to permit the capture of content through the accessory 600 without interference. Alternatively, it is envisioned that the material(s) utilized in construction of the insert 610 may be chosen so as to attribute particular optical characteristics and functionality to the accessory 600 that allow the accessory 600 to function as an optical filter and alter image capture.

In the illustrated embodiment, the accessory 600 further includes a removable jacket (covering) 638 that overlies the insert 610 to protect the insert 610 from damage, dust, debris, etc. To inhibit (if not entirely prevent) the entry of water, debris, etc., into the accessory 600, it is envisioned that the insert 610 may be sealed to the frame 602 by a sealing member 640 (e.g., a gasket 642).

Figure 30:
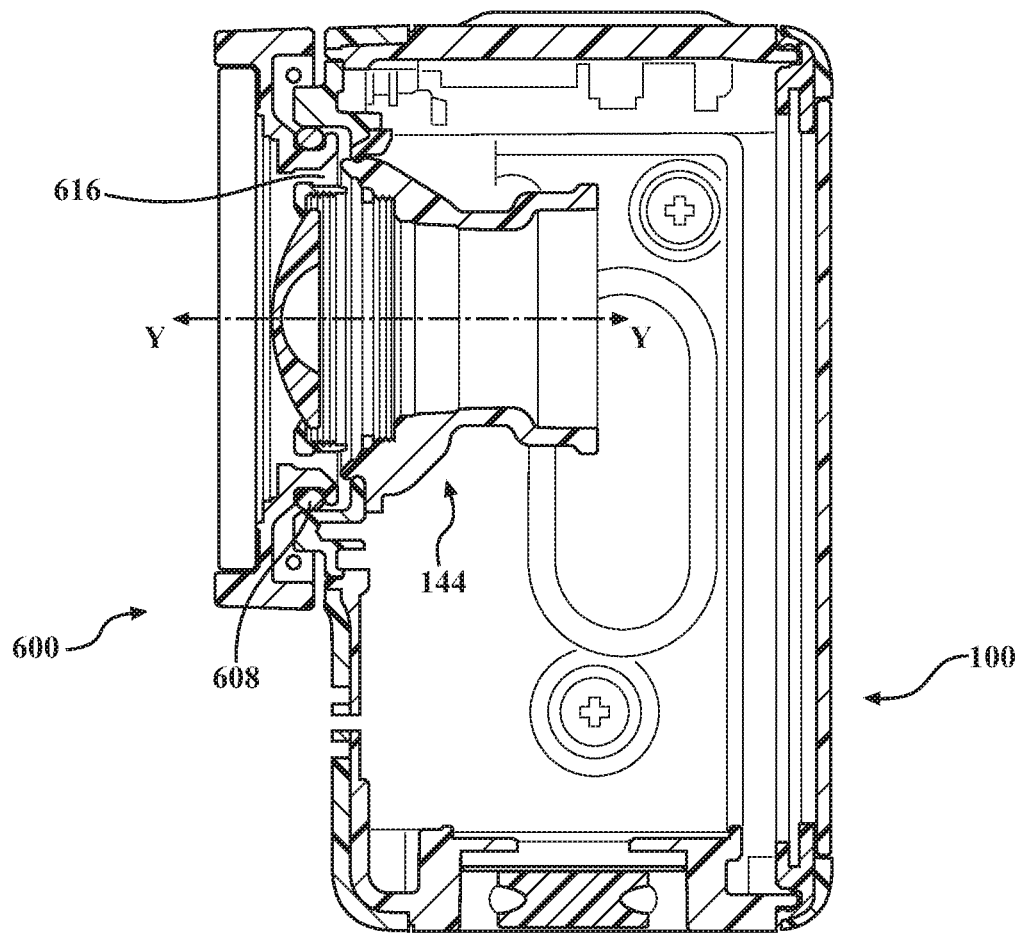
FIG. 30 is a side, cross-sectional view of the image capture device and the accessory seen in FIG. 28A prior to connection of the accessory.
Figure 31:
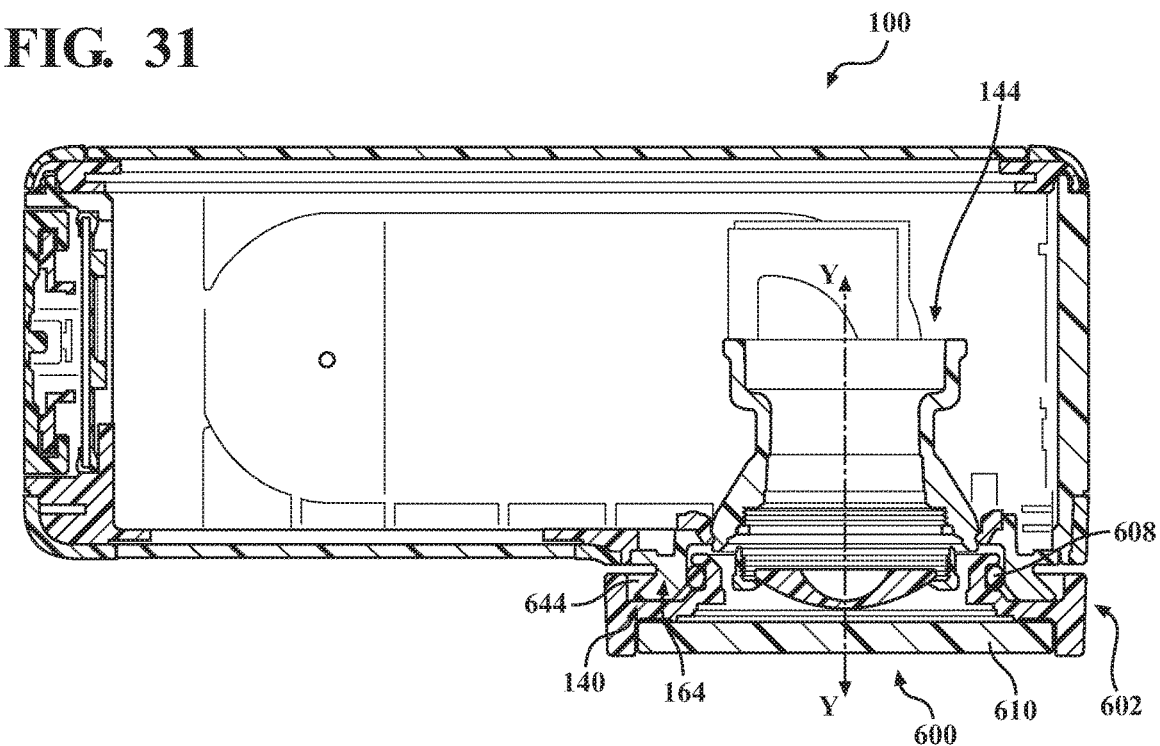
FIG. 31 is a top, cross-sectional view of the image capture device and the accessory seen in FIG. 28A prior to connection of the accessory.
Figure 32:
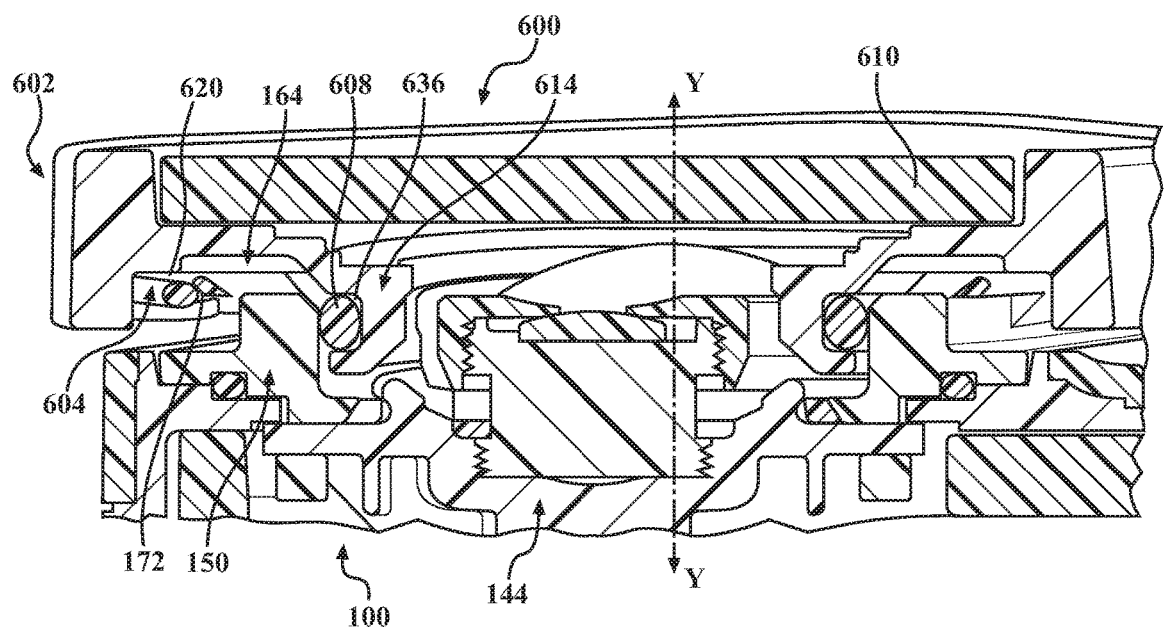
FIG. 32 is a partial, top, cross-sectional view of the image capture device illustrating connection of the accessory seen in FIG. 28A.
Figure 33:
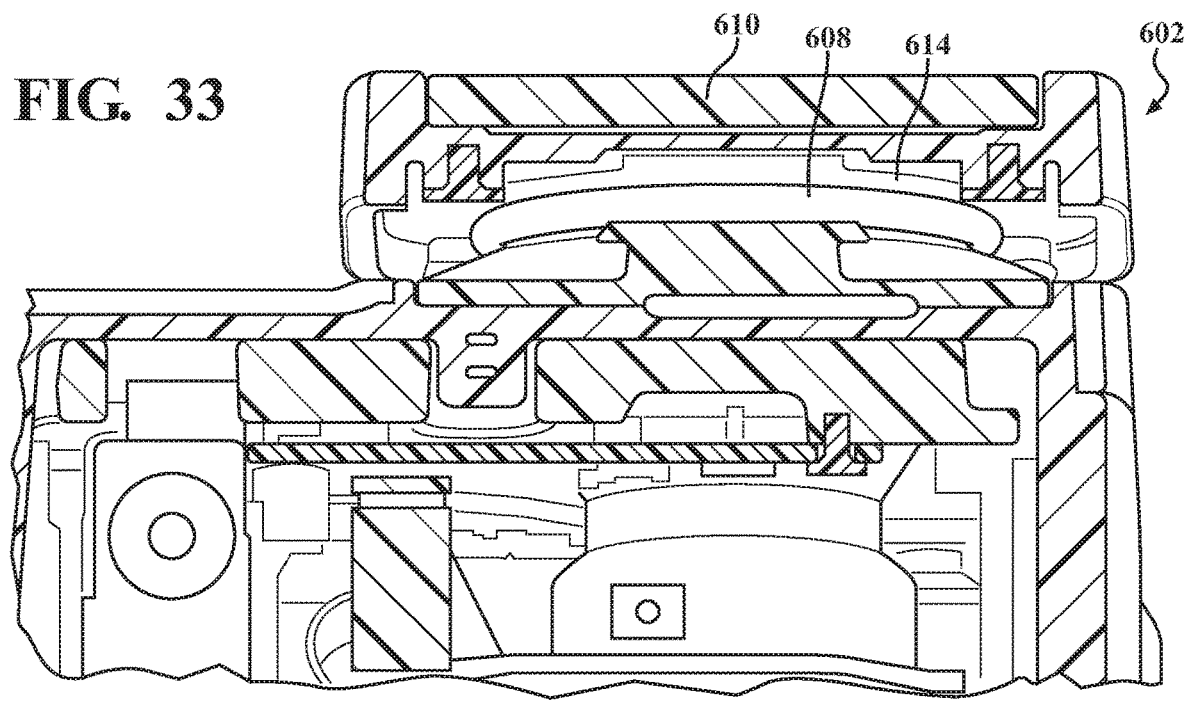
FIG. 33 is a partial, bottom, perspective, cross-sectional view of the image capture device illustrating connection of the accessory seen in FIG. 28A.
Figure 34:
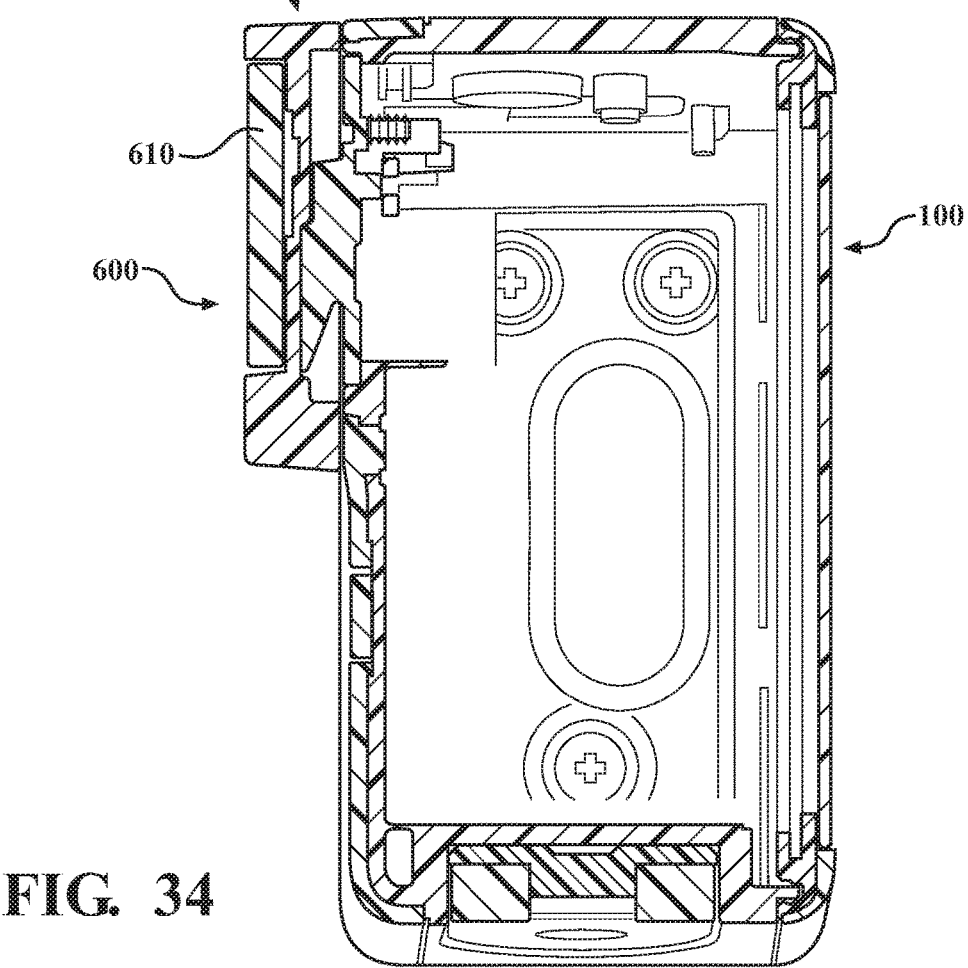
FIG. 34 is a side, cross-sectional view of the image capture device and the accessory seen in FIG. 28A subsequent to connection of the accessory.
Figure 35:
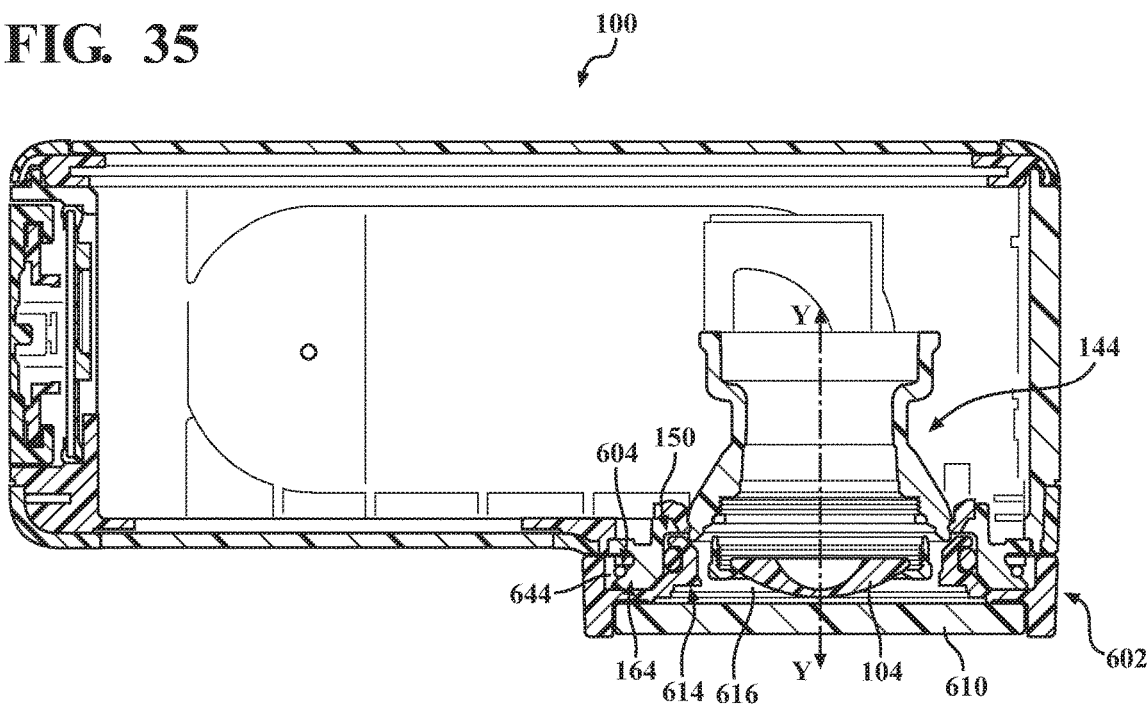
FIG. 35 is a top, cross-sectional view of the image capture device and the accessory seen in FIG. 28A subsequent to connection of the accessory.
Figure 36:
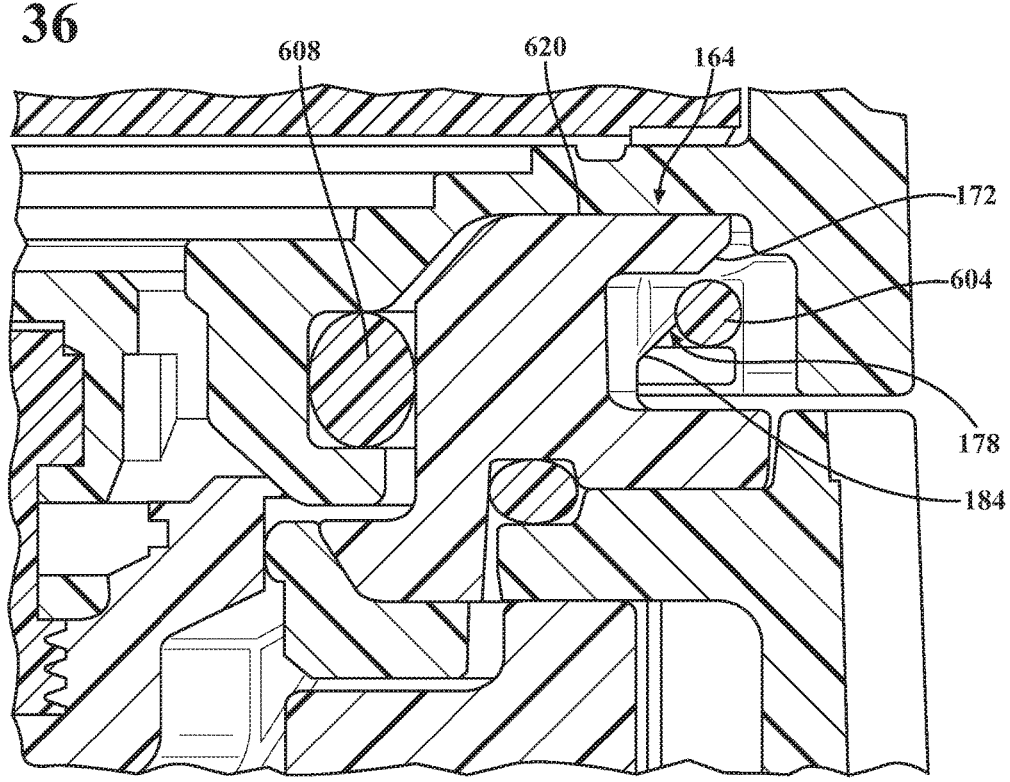
FIG. 36 is a partial, cross-sectional view of the image capture device subsequent to connection of the accessory seen in FIG. 28A.

Referring now to FIGS. 30-36 as well, connection and securement of the accessory 600 to the image capture device 100 will be discussed. More specifically, FIG. 30 provides a side, cross-sectional view of the image capture device 100 and the accessory 600 prior to connection of the accessory 600 (e.g., prior to securement of the accessory to the mounting structure 140); FIG. 31 provides a top, cross-sectional view of the image capture device 100 and the accessory 600 prior to connection of the accessory 600; FIG. 32 provides a partial, side, perspective, cross-sectional view of the image capture device 100 and the accessory 600 during connection (e.g., as the accessory 600 is secured to the mounting structure 140); FIG. 33 provides a partial, bottom, perspective, cross-sectional view of the image capture device 100 and the accessory 600 during connection; FIG. 34 provides a side, cross-sectional view of the image capture device 100 and the accessory 600 subsequent to connection of the accessory 600 (e.g., following securement of the accessory 600 to the mounting structure 140); FIG. 35 provides a top, cross-sectional view of the image capture device 100 subsequent to connection of the accessory 600; and FIG. 36 provides a partial, perspective, cross-sectional view of the image capture device 100 subsequent to connection of the accessory 600.

Initially, the accessory 600 is oriented in a first (connection) position (FIGS. 27, 30, 31), in which, the recesses 620 are angularly offset from (out of alignment with) the radial mounting members 164 on the mounting structure 140. For example, in the first position, it is envisioned that the accessory 600 may be oriented such that an outer profile (contour) of the accessory 600 corresponds to that of the body 102 of the image capture device 100, whereby the outer surfaces of the accessory 400 are oriented in (generally) parallel relation to corresponding outer surfaces of the body 102 of the image capture device 100 and the recesses 620 are angularly offset from the radial mounting members 164 by (approximately) 90°. The accessory 600 (e.g., the recesses 620 and the retainers 604), however, is configured to obviate any need for precise alignment between the accessory 600 and the mounting structure 140 during connection (e.g., to improve the user experience). The configuration of the accessory 600 accommodates a wide range of angular offset between the recesses 620 and the radial mounting members 164, which allows the accessory 600 to be positioned in a variety of orientations without frustrating connection. For example, in the illustrated embodiment, it is envisioned that the accessory 600 may be fully connected (secured) to and disconnected from the mounting structure 140 via movement through an angular range of motion that lies substantially within the range of approximately 45° to approximately 90°.

As the accessory 600 is advanced towards the body 102 of the image capture device 100, the radial mounting members 164 are received within a guide channel 644 (e.g., a space) (FIGS. 28, 31) defined between the extension 614 and an inner wall 646 of the frame 602. The accessory 600 can then be rotated in a first direction (either clockwise or counterclockwise) such that the bearing surfaces 180 (FIGS. 8A, 8B) defined by the outer walls 172 of the radial mounting members 164 are brought into engagement (contact) with the retainers 604, as seen in FIG. 32. As the accessory 600 is rotated, the retainers 604 are deflected (bowed) radially outward (e.g., away from the optical axis Y) and axially inward (e.g., towards the body 102 of the image capture device 100). Rotation of the accessory 600 thus reconfigures the retainers 604 from their initial (generally) linear configuration into a subsequent (second, deflected) configuration, in which the retainers 604 are (generally) non-linear, so as to create a biasing force in the retainers 604. As rotation of the accessory 600 continues, so does deflection of the retainers 604, which forces the retainers 604 further inwardly and into engagement (contact) with the outer walls 184 of the retention blocks 178 (FIG. 36).

Due to the angled configurations of the outer walls 172 of the radial mounting members 164 and the retention blocks 178, as the accessory 600 rotates, the retainers 604 are forced inwardly into positions beneath the overhangs 176 (FIG. 8A), which results in inward displacement of the accessory 600, effectively pulling the accessory 600 towards the body 102 of the image capture device 100. Rotation of the accessory 600 continues until the accessory 600 is moved into a second (installed) position (FIGS. 34-36). In the second position, the radial mounting members 164 are aligned with (and are received by) the recesses 620 and the ISLA 144 (e.g., the lens 104) is received by the central opening 616 defined by the extension 614, whereby the extension 614 extends into the mounting structure 140 such that the sealing member 608 engages the front collar 150 to thereby form a watertight seal between the accessory 600 and the mounting structure 140.

As the radial mounting members 164 enter the recesses 620, the biasing force in the retainers 604 moves the retainers 604 towards their initial configuration. In certain embodiments, it is envisioned that the accessory 600 (e.g., the retainers 604, the recesses 620, etc.) and the mounting structure 140 (e.g., the radial mounting members 164) may be configured such that the user is provided with an audible indication that the accessory 600 has been successfully connected to the image capture device 100 as the radial mounting members 164 settle into the recesses 620. As discussed above in connection with the accessory 400, it is also envisioned that the (generally) square-shaped cross-sectional configuration of the accessory 600 may also alert the user to successful connection of the accessory 600. More specifically, as the accessory 600 is moved from the first position (FIGS. 27, 30, 31) to the second position (FIGS. 34-36) through its range of motion, upon proper and complete connection of the accessory 600, the objective appearance of the accessory 600 in the second position is (generally) identical to that of the accessory 600 in the first position, whereby any angular offset between the profiles (contours) of the accessory 600 and the body 102 of the image capture device 100 will signal to the user that the accessory 600 has either been improperly or incompletely connected.

To disconnect the accessory 600, the accessory 600 is rotated (either clockwise or counterclockwise), whereby the bearing surfaces 182 182ii (FIGS. 8A, 8B) defined by the sidewalls 174 of the radial mounting members 164 are caused to bear against the sidewalls 622 defined by the recesses 620. Supplemented by the biasing force in the retainers 604, the bearing effect between the radial mounting members 164 and the sidewalls 622 displaces (pushes) the accessory outwardly (e.g., away from the body 102 of the image capture device 100 and along the optical axis Y of the ISLA 144), thereby reducing (if not entirely obviating) any need to apply an axial (pulling) force to the accessory 600 during disconnection.

As rotation of the accessory 600 continues during disconnection, the radial mounting members 164 are removed from the recesses 620 and disengage the retainers 604 as the radial mounting members 164 move through the guide channel 644 defined between the extension 614 and the inner wall 646 of the frame 602. The accessory 600 can then be completely removed from the mounting structure 140 and disconnected from the image capture device 100.

The amount of force required to rotate the accessory 600 during disconnection and thereby remove the radial mounting members 164 from the recesses 620 and, thus, user feel, may be varied by altering the specific configurations of the recesses 620 and the radial mounting members 164. More specifically, increasing the angles $\varepsilon$, $\gamma$ respectively defined by the sidewalls 622 of the recesses 620 and the sidewalls 174 of the radial mounting members 164 will increase the requisite force, whereas reducing the angles $\varepsilon$, $\gamma$ will reduce the requisite force.

Figure 37:
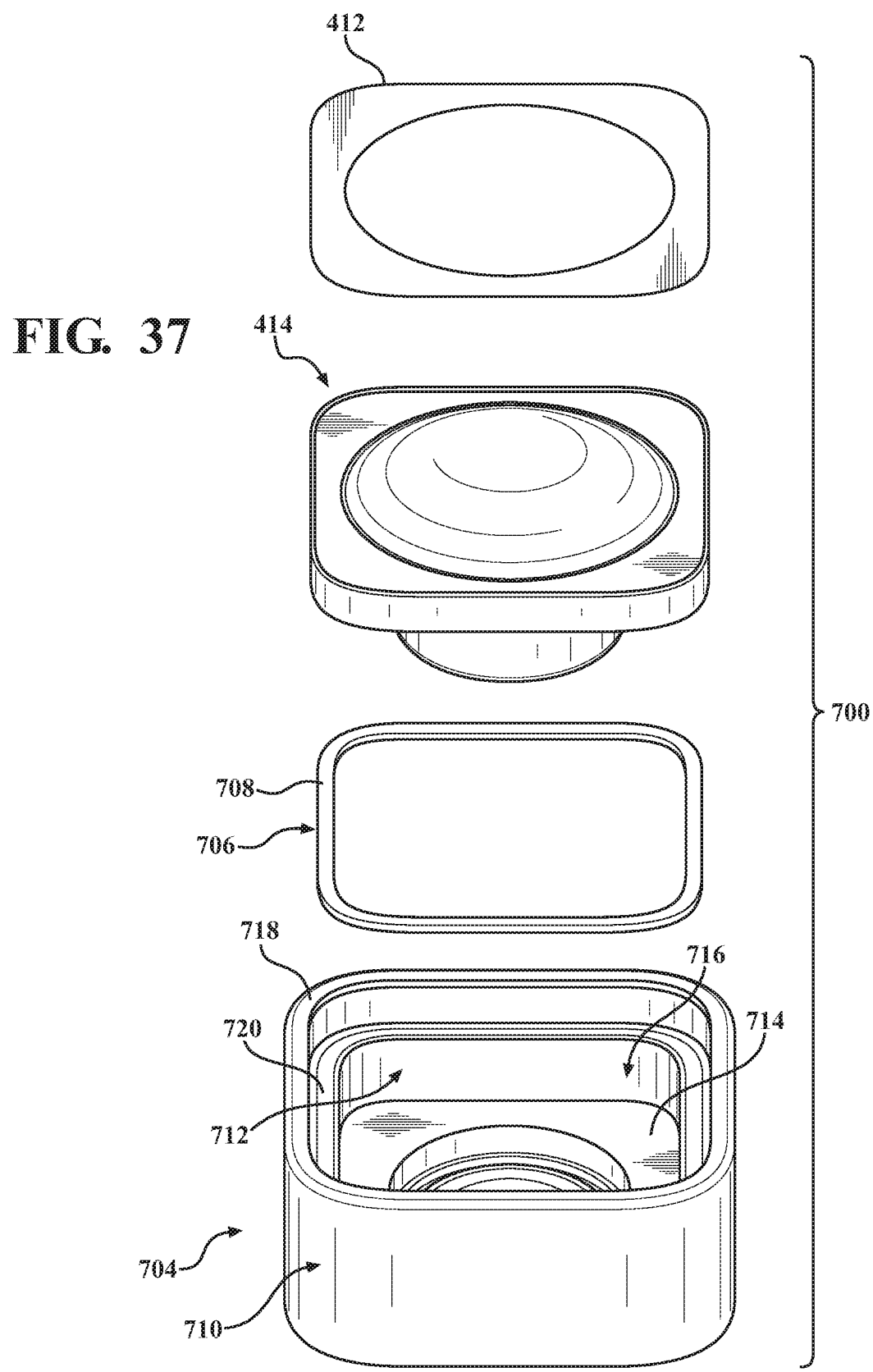
FIG. 37 is an exploded view of a removable accessory for use with an image capture device according to another aspect of the present disclosure shown with parts separated.
Figure 38:
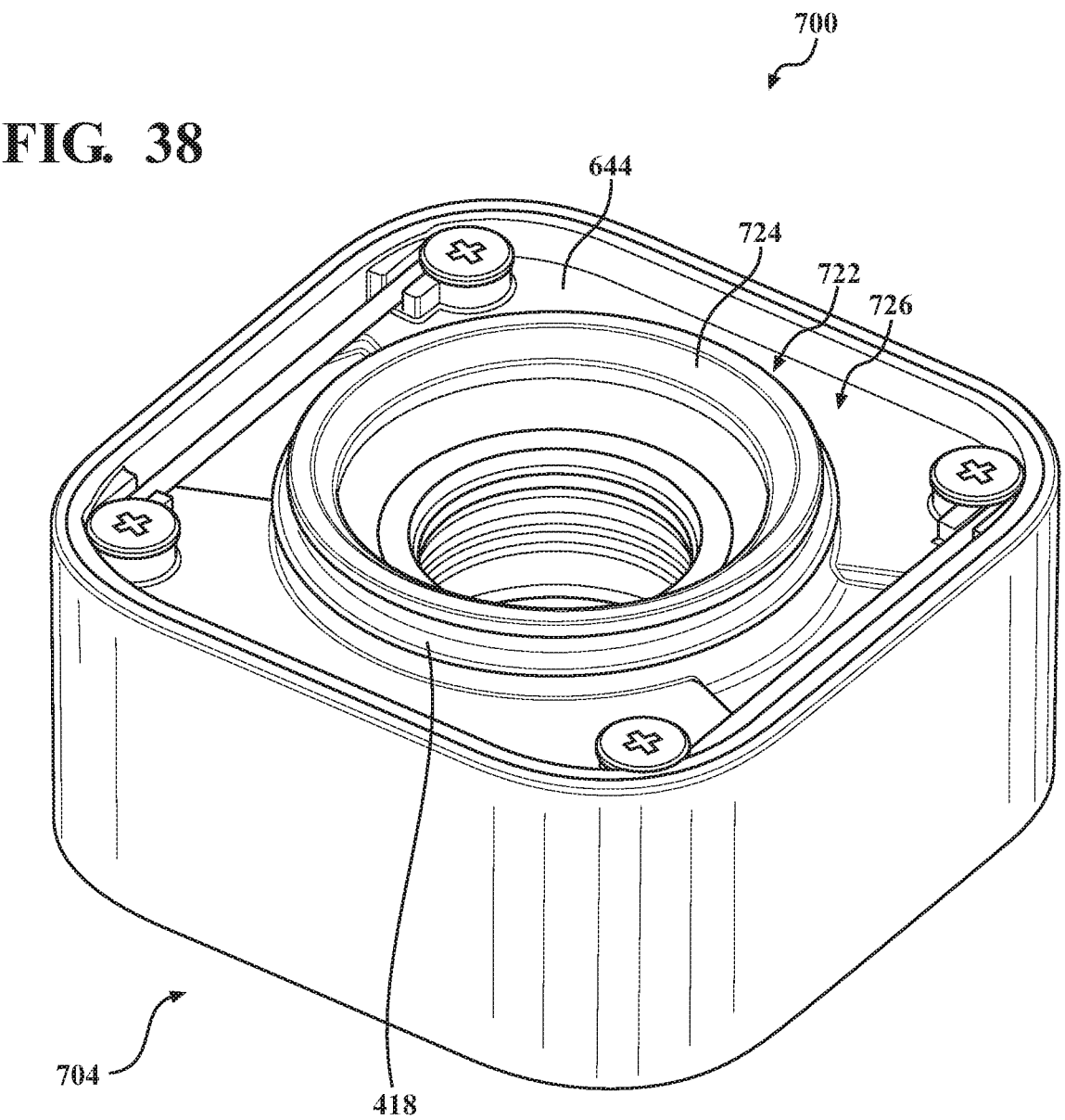
FIG. 38 is a bottom, perspective view of the accessory seen in FIG. 37.
Figure 39:
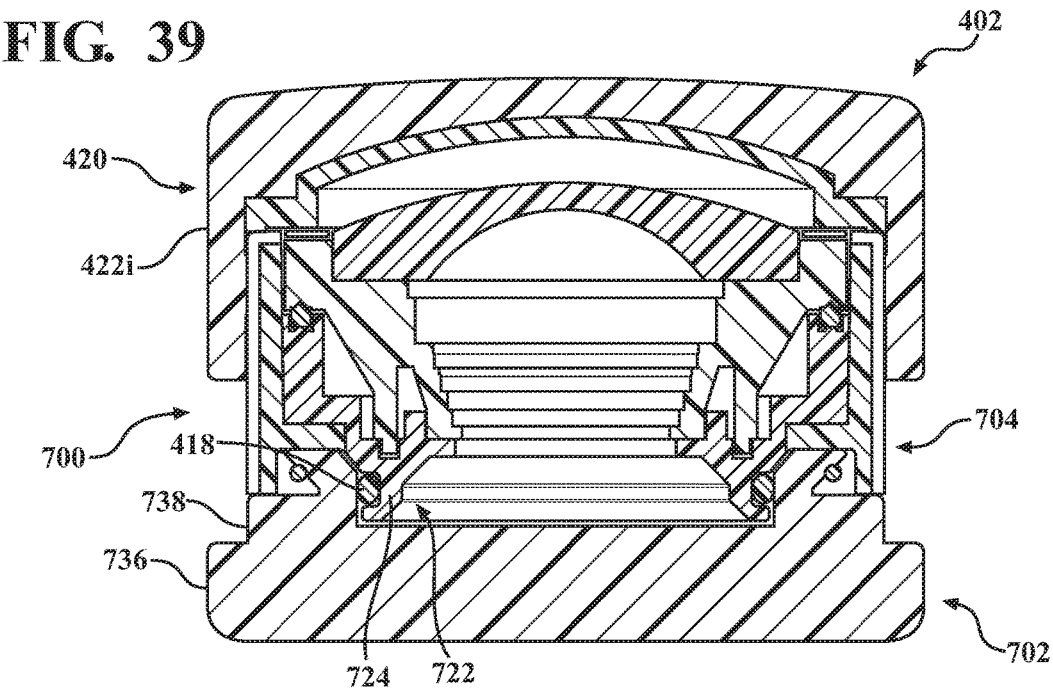
FIG. 39 is a cross-sectional view taken through the accessory seen in FIG. 37 and shown covered by a front cap and a rear cap.
Figure 40:
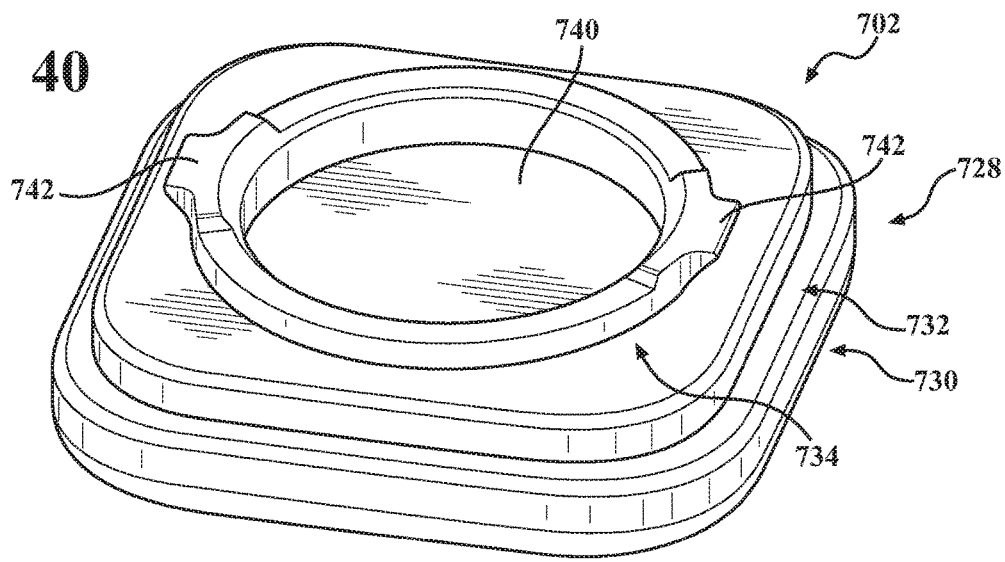
FIG. 40 is a top, perspective view of the rear cap seen in FIG. 39.
Figure 41:
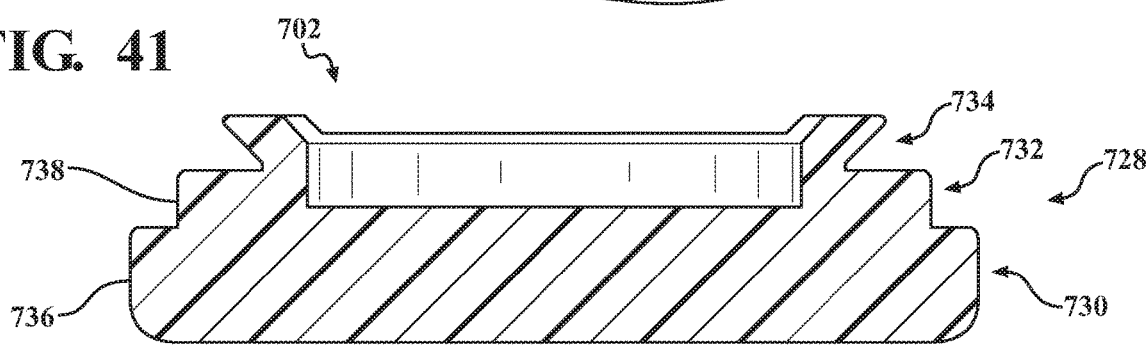
FIG. 41 is a cross-sectional view of the rear cap seen in FIG. 39.

Referring now to FIGS. 37-41, another embodiment of the accessory will be discussed, which is referred to by the reference character 700. Specifically, FIG. 37 provides a top, (partially) exploded view of the accessory 700 shown with parts separated; FIG. 38 provides a bottom, perspective view of the accessory 700; FIG. 39 provides a cross-sectional view of the accessory 700 shown covered by the aforedescribed front cap 402 and a rear cap (cover) 702; FIG. 40 provides a top, perspective view of the rear cap 702; and FIG. 41 provides a cross-sectional view of the rear cap 702. The accessory 700 combines features of the accessory 400 (FIGS. 4-26) and the accessory 700 (FIGS. 27-36) and, accordingly, will only be discussed to the extent that the accessory 700 and the components thereof differ from the accessories 400, 600 and the components thereof.

In addition to the aforedescribed finishing plate 412 and lens assembly 414, the accessory 700 includes a main housing 704 and a sealing member 706 (e.g., a gasket 708). The main housing 704 acts as, and provides a chassis (framework) for, the various components of the accessory 700 and includes an outer frame 710 and an insert 712. In the particular embodiment of the accessory 700 illustrated, the outer frame 710 is envisioned as including (e.g., as being formed partially or entirely from) one or more thermoplastic elastomers and the insert 712 is envisioned as including (e.g., as being formed partially or entirely from) glass-filled polycarbonate. It should be appreciated, however, that alternate materials of construction may be utilized without departing from the scope of the present disclosure. As discussed in connection with the accessory 400, it is envisioned that outer frame 710 may include a resilient overmold (e.g., formed partially or entirely from rubber, plastic, silicone, etc.) to improve shock absorption and/or vibration performance in certain embodiments of the disclosure.

The insert 712 is received by the outer frame 710 and defines an inner chamber 714 that is configured to receive the lens assembly 414. More specifically, the insert 712 includes a sidewall 716 terminating below (inwardly of) a rim 718 of the outer frame 710 so as to define a shoulder 720. The sidewall 716 and the shoulder 720 are configured to support the sealing member 706 such that the sealing member 706 is positioned between the lens assembly 414 and the insert 712 to inhibit (if not entirely prevent) the entry of water, debris, etc., into the accessory 700 and such that the finishing plate 412 is (generally) flush with the rim 718 of the outer frame 710 upon assembly of the accessory 700. To further secure together the lens assembly 414, the sealing member 706, and the insert 712 (and/or improve sealing there between), it is envisioned that an adhesive may be applied between the insert 712 and the sealing member 706 and/or between the sealing member 706 and the lens assembly 414.

The insert 712 includes an extension 722 (e.g., a collar 724) that extends rearwardly (e.g., toward the body 102 of the image capture device 100) and is configured to support the sealing member 418. The extension 722 is configured to extend through the outer frame 710 and into the mounting structure 140 (FIG. 4) such that the sealing member 418 is positionable between the main housing 704 and the front collar 150 on mounting structure 140 to thereby form a watertight seal between the accessory 700 and the mounting structure 140 in the manner discussed above with respect to the accessory 400. The configurations of the extension 722, the sealing member 418, and the mounting structure 140 are such that the outer frame 710 and, thus, the lens assembly 414, is arranged in a pre-determined orientation upon connection of the accessory 700 to the image capture device 100 so as to achieve precise alignment between the ISLA 144 and the lens assembly 414 (e.g., such that the lens assembly 414 is centered along the optical axis Y of the ISLA 144).

As seen in FIG. 38, rather than the mounting plate 410 (FIG. 10) discussed above in connection the accessory 400, the main housing 704 includes a rear side (surface) 726 that is substantially similar (if not identical to) the rear side (surface) 618 discussed above in connection with the accessory 600. The accessory 700 is, thus, connectable to and disconnectable from the mounting structure 140 in a manner that is substantially similar (if not identical) to that discussed above with respect to FIGS. 27-36.

With particular reference to FIGS. 39-41, the rear cap 702 will be discussed. The rear cap 702 is a variation on the aforedescribed rear cap 404 (FIG. 10) and, thus, will only be discussed with respect to any differences therefrom.

The rear cap 702 includes a body portion 728 having a base 730, a platform 732, and a (generally annular) collar 734 that extends forwardly from the platform 732, whereby the body portion 728 includes a stepped cross-sectional configuration.

The base 730 is configured such that an outer surface 736 thereof is (generally) aligned with the outer surface 422i defined by the body portion 420 of the front cap 402 upon connection of the caps 402, 702 to the accessory 700.

The platform 732 extends (forwardly) from the base 730 and is configured such that an outer surface 738 thereof is (generally) aligned with the main housing 704 upon connection of the caps 402, 702 to the accessory 700.

The collar 734 defines an inner cavity 740 that is configured to receive (or otherwise accommodate) the main housing 704 of the accessory 700 (e.g., the extension 722 of the insert 712) and (generally) approximates the configuration of the front collar 150 (FIG. 4) of the mounting structure 140. More specifically, the collar 734 includes a pair of ears 742 that (generally) approximate the configuration of the radial mounting members 164 of the mounting structure 140 and extend radially outward from the collar 734 such that the 742 are insertable into the guide channel 644 (FIG. 38) such that the main housing 704 of the accessory 700 engages (contact) the platform 732 and the collar 734 upon connection of the caps 402, 702 to the accessory 700.

To facilitate connection (engagement) of the rear cap 702 and the main housing 704 of the accessory 700, it is envisioned that the ears 742 and/or the collar 724 may be configured for receipt within the guide channel 644 in an interference (press) fit. Additionally, or alternatively, it is envisioned that the inner cavity 740 defined by the collar 724 may be configured to receive the main housing 704 of the accessory 700 in an interference (press) fit. To further enhance the connection between the rear cap 702 and the main housing 704 of the accessory 700, in certain embodiments, it is envisioned that the ears 742 and/or the collar 724 may include one or more engagement members (e.g., detents, projections, etc.) that are configured to engage (contact) the main housing 704 of the accessory 700.

Figure 42:
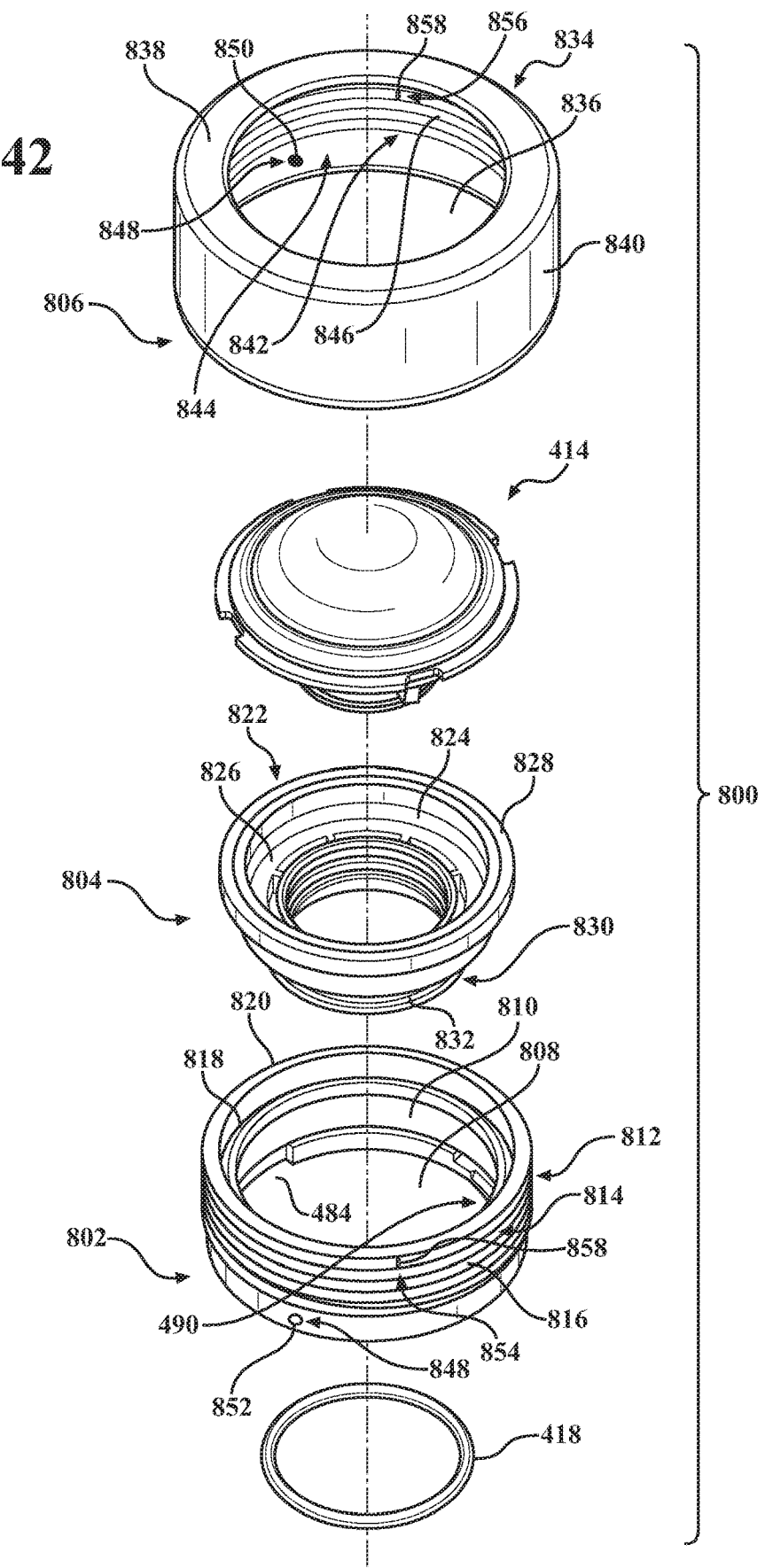
FIG. 42 is an exploded view of a removable accessory for use with an image capture device according to another aspect of the present disclosure shown with parts separated.
Figure 43:
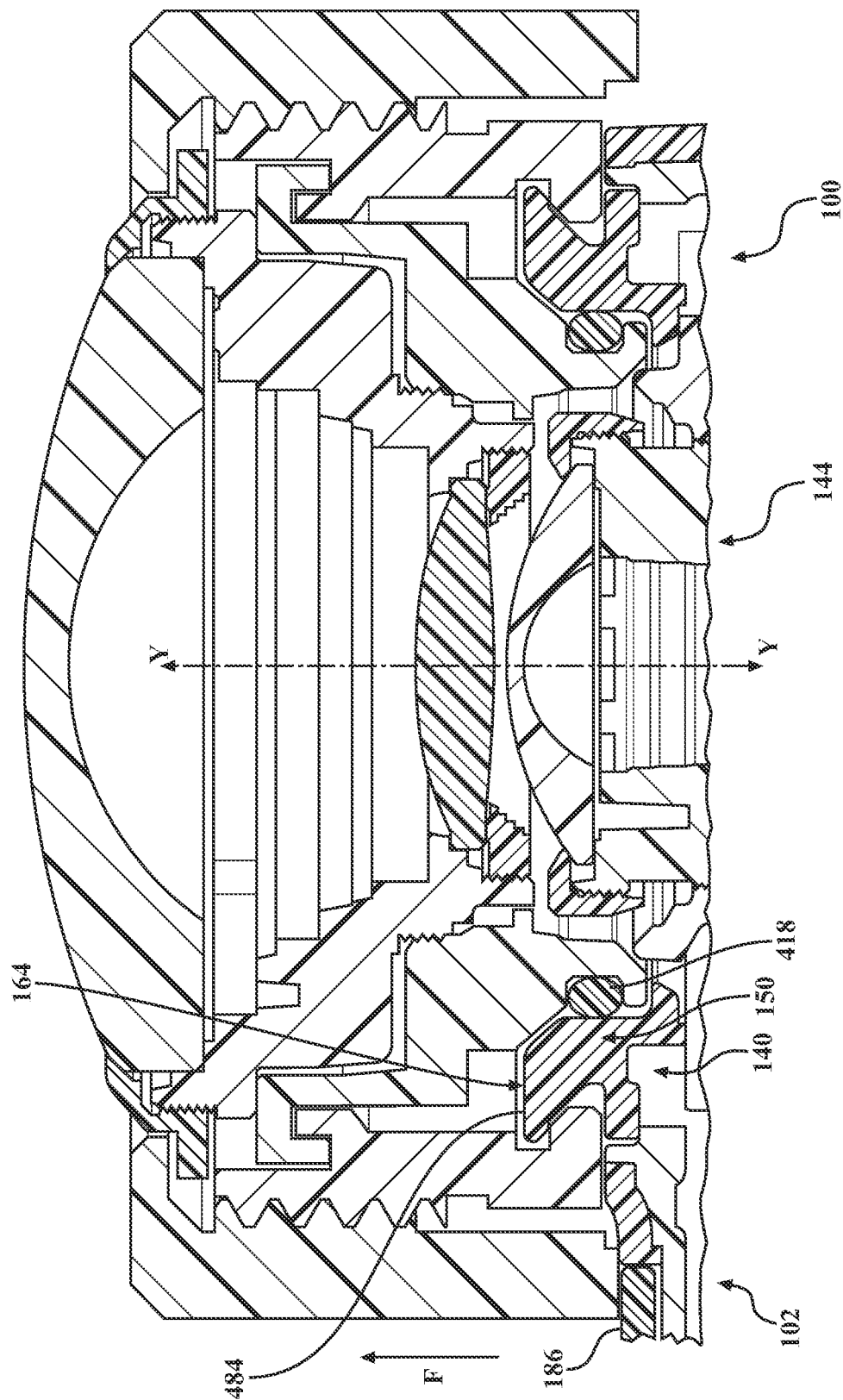
FIG. 43 is a cross-sectional view illustrating connection of the accessory seen in FIG. 42 to an image capture device.

Referring now to FIGS. 42 and 43, another embodiment of the accessory will be discussed, which is referred to by the reference character 800. Specifically, FIG. 42 provides an exploded view of the accessory 800 shown with parts separated and FIG. 43 provides a cross-sectional view illustrating connection of the accessory 800 to the body 102 of the image capture device 100 via the mounting structure 140. The accessory 800 shares certain elements and features with the aforedescribed accessories 400, 600, 700 and, accordingly, will only be discussed to any differences therefrom.

In addition to the aforedescribed lens assembly 414 and sealing member 418, the accessory 800 includes an inner collar 802; a housing 804; and an outer collar 806. It is envisioned that the collars 802, 806 and the housing 804 may include (e.g., may be formed from) any suitable material or combination of materials including, for example, one or more plastics, one or more polymeric materials, one or more metallic materials, carbon fiber, etc.

The inner collar 802 defines a central opening 808 that is configured to receive the housing 804 and the ISLA 144 and includes respective inner and outer surfaces 810, 812, wherein the outer surface 812 includes a (first) threaded section 814 defining a (helical, continuous) bearing surface 816 that extends in non-parallel relation to the optical axis Y of the ISLA 144. The inner collar 802 includes a shoulder 818 and the approximation structure 490 included on the aforementioned mounting plate 410 discussed in connection with the accessory 400, each of which extends inwardly from the inner surface 812. As discussed above in connection with the accessory 400, the approximation structure 490 is configured such that the guide members 492 extend between the slots 484 (see also FIGS. 15-17), which are configured to receive the radial mounting members 164 of the mounting structure 140 during connection of the accessory 800.

The shoulder 818 is located below (inwardly of) a rim 820 of the inner collar 802. The shoulder 818 is configured to support the housing 804 such that an outer (forward) surface 822 of the housing 804 is (generally) flush with the rim 820 of the inner collar 802 upon assembly of the accessory 800.

The housing 804 extends into the inner collar 802 and defines an inner chamber 824 that is configured to receive the lens assembly 414. More specifically, the housing 804 includes a shelf 826 that is located below (inwardly of) an outer rim 828 of the housing 804 so as to supports the lens assembly 414. The housing 804 includes an extension 830 (e.g., a collar 832) that extends rearwardly (e.g., toward the body 102 of the image capture device 100) and is configured to support the sealing member 418. The extension 830 is configured to extend through the inner collar 802 and into the mounting structure 140 such that the sealing member 418 is positionable between the housing 804 and the front collar 150 on mounting structure 140 (FIG. 43) to thereby form a watertight seal between the accessory 800 and the mounting structure 140 in the manner discussed above. The configurations of the extension 830, the sealing member 418, and the mounting structure 140 are such that the housing 804 and, thus, the lens assembly 414, are arranged in a pre-determined orientation upon connection of the accessory 800 to the image capture device 100 so as to achieve precise alignment between the ISLA 144 and the lens assembly 414 (e.g., such that the lens assembly 414 is centered along the optical axis Y of the ISLA 144).

The outer collar 806 defines an outer (forward) surface 834 that includes an opening 836 that allows light to enter the lens assembly 414. To inhibit (if not entirely prevent) undesirable contact with the lens assembly 414 (e.g., in the event that the accessory 800 is dropped), the outer collar 806 includes a flange 838 that extends inwardly so as to protect the lens assembly 414.

The outer collar 806 includes a shroud 840 with a (second) threaded section 842 on an inner surface 846 thereof defining a (helical, continuous) bearing surface 846 that extends in non-parallel relation to the optical axis Y of the ISLA 144. The threaded section 842 is configured in correspondence with the threaded section 814 on the outer surface 810 of the inner collar 802, whereby the threaded sections 814, 842 facilitate relative rotation between the collars 802, 806 during connection and disconnection of the accessory 800 to the mounting structure 140.

With continued reference to FIGS. 42 and 43, connection and disconnection of the accessory 800 to the mounting structure 140 will be discussed. Initially, the accessory 800 is oriented such that the slots 484 (FIGS. 15, 16, 42, 43) located between the guide members 492 are aligned with the radial mounting members 164 (FIG. 4) on the mounting structure 140. The accessory 800 is then advanced towards the body 102 of the image capture device 100 such that the radial mounting members 164 pass through the slots 484, whereby the radial mounting members 164 are positioned adjacent to the ends 496i (FIG. 17) of the first segments 494i of each guide member 492 and the extension 830 extends into the mounting structure 140 such that the sealing member 418 engages the front collar 150 on mounting structure 140 to thereby form a watertight seal between the accessory 800 and the mounting structure 140.

Following alignment of the radial mounting members 164 and the slots 484, the accessory 800 is rotated in a first direction (e.g., clockwise), as a unit, such that the collars 802, 806 move in unison during a first phase of connection. As the inner collar 802 rotates, the radial mounting members 164 engage and traverse the guide members 492, thereby creating a bearing effect that causes inward displacement of the accessory 800 towards the body 102 of the image capture device 100 in the manner discussed above with respect to the accessory 400. As the accessory 800 is displaced inwardly, the ISLA 144 (e.g., the lens 104) is received within the central opening 808 defined by the inner collar 802.

In certain embodiments, such as that illustrated in FIGS. 42 and 43, it is envisioned that the accessory 800 may include a forward lock 848 that is configured to overcome the frictional engagement between the sealing member 418 and the front collar 150 on the mounting structure 140 such that rotation of the outer collar 806 causes corresponding rotation of the inner collar 802 during the first phase of connection. For example, it is envisioned that the accessory 800 may include corresponding detent(s) 850 and recess(es) 852, a slip-lock mechanism, or any other such structures suitable for the intended purpose of facilitating concomitant rotation of the collars 802, 806 during the first phase of rotation.

Rotation of the accessory 800 continues until the radial mounting members 164 are drawn onto the platforms 506 (FIG. 17) defined by the third segments 494iii and ultimately engage (contact) the stops 546 (FIG. 19) provided by the inner walls 542 of the guide members 492 to prevent continued rotation of the inner collar 802. Upon the application of a threshold rotational force to the accessory 800, the locking feature provided by the forward lock 848 is overcome (e.g., such that the detent(s) 850 are removed from the recess(es) 852, thereby disabling the forward lock 848 and allowing the outer collar 806 to rotate relative to the inner collar 802 during a second phase of connection.

As the outer collar 806 rotates relative to the inner collar 802, the threaded section 842 on the outer collar 806 traverses the threaded section 814 on the inner collar 802 to tighten the accessory 800 to the mounting structure 140. More specifically, as the outer collar 806 rotates relative to the inner collar 802, the outer collar 806 moves inwardly (towards the mounting structure 140) until the shroud 840 contacts an outer surface (e.g. a snout 186) of the body 102 of the image capture device 100. As rotation of the outer collar 806 continues, an axial force F is applied to the accessory 800 (e.g., along an axis that is (generally) parallel in relation to optical axis Y) via contact between the snout 186 and the shroud 840, whereby the inner collar 802 and, thus, the lens assembly 414, is forced outwardly (e.g., away from the body 102) to facilitate proper spacing and alignment between the ISLA 144 and the lens assembly 414.

In certain embodiments, it is envisioned that the inner collar 802 may include one or more axial splits that divide the inner collar 802 into a plurality of splines or fingers. In such embodiments, it is envisioned that rotation of the outer collar 806 relative to the inner collar 802 during connection of the accessory 800 may facilitate inward movement of the splines to thereby create a clamping effect that further enhances securement of the accessory 800 to the mounting structure 140.

To disconnect the accessory 800 from the mounting structure 140, the process described above is reversed. More specifically, the accessory 800 is rotated through a first phase of disconnection, during which, the outer collar 806 is rotated relative to the inner collar 802 in a second direction (e.g., counterclockwise) that is opposite to the first direction. As the outer collar 806 rotates, the friction force between the sealing member 418 and the front collar 150 on the mounting structure 140 provides a reverse lock that maintains the rotational position of inner collar 802. The reverse locking feature of the accessory 800 is facilitated by the configuration of the collars 802, 806 in that the threaded sections 814, 842 are configured such that the force required to rotate the outer collar 806 relative to the inner collar 802 is less and the friction force between the sealing member 418 and the front collar 150 of the mounting structure 140. As the outer collar 806 rotates in the second direction, the threaded section 842 traverses the threaded section 814 to loosen the accessory 800 from the mounting structure 140, thereby alleviating the axial force F applied in the second phase of connection. Rotation of the outer collar 806 continues so as to separate (disengage) the shroud 840 from the snout 186, thereby loosening the connection between the accessory 800 and the mounting structure 140.

Continued rotation of the outer collar 806 causes corresponding restriction members 854, 856 respectively included on the collars 802, 806 (e.g., the threaded sections 814, 842) are brought into engagement (contact). Although the restriction members 854, 856 are illustrated as detent(s) 858 in the particular embodiment seen in FIGS. 42 and 43, it should be appreciated that the particular configurations of the restriction members 854, 856 may be varied in alternate embodiments without departing from the scope of the present disclosure. For example, it is envisioned that the restriction members 854, 856 may instead include corresponding protrusions, ribs, etc.

Upon engagement of (contact between) the restriction members 854, 856, continued rotation of the outer collar 806 in the second direction causes corresponding rotation of the inner collar 802 during a second phase of connection, whereby the accessory 800 is again rotated as a unit such that the collars 802, 806 move in unison. Engagement of (contact between) the restriction members 854, 856 also prevents over-rotation of the outer collar 806 (in relation to the inner collar 802), thus preventing separation of the collars 802, 806 and inadvertent disassembly of the accessory 800.

Rotation of the inner collar 802 in the second direction cause the radial mounting members 164 to traverse the guide members 492, which allows for outward displacement of the accessory 800 (e.g., away from the body 102 of the image capture device 100) in the manner discussed above so as to obviate any need to apply an axial (pulling) force to the accessory 800 during disconnection.

Rotation of the collars 802, 806 continues until the radial mounting members 164 engage (contact) the inner walls 548 (FIG. 18) defined by the slots 484. Engagement of (contact between) the radial mounting members 164 and the inner walls 548 prevents continued rotation of the accessory 800 relative to the mounting structure 140 in the second direction and, in certain embodiments, may provide the user with a (tactile and/or audible) indication that the radial mounting members 164 and the slots 484 are aligned and, thus, that the accessory 800 can be separated from the mounting structure 140.

Figure 44:
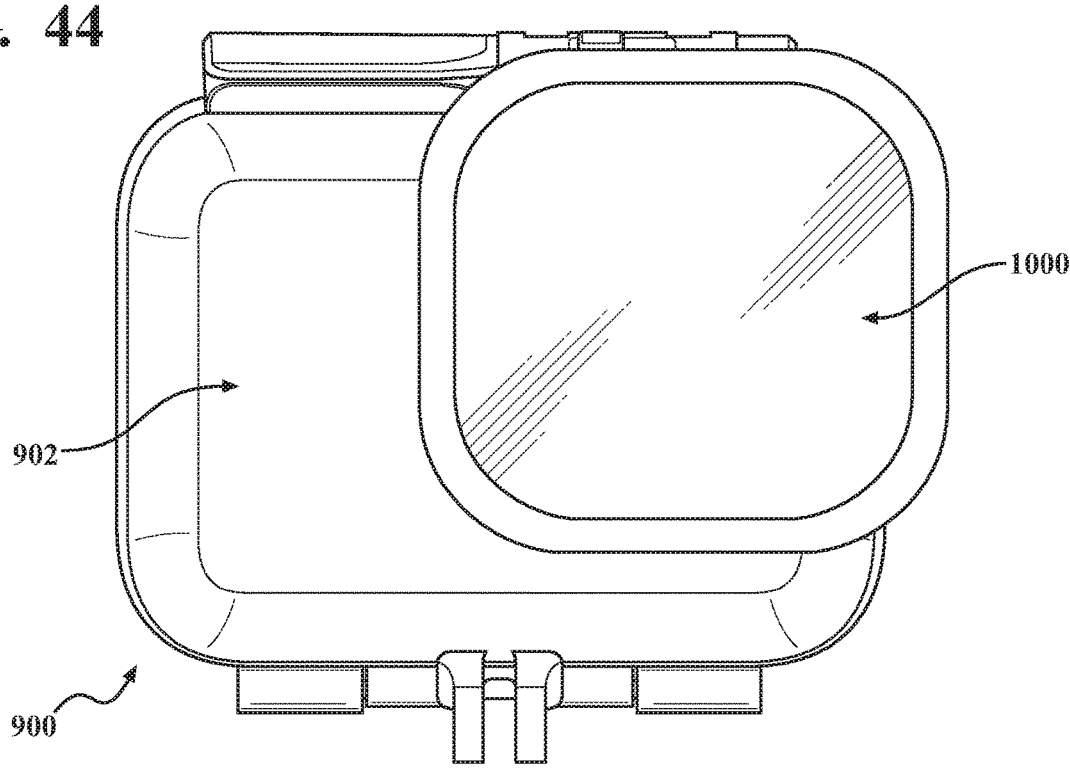
FIG. 44 is a front, plan view of an underwater housing for an image capture device shown with an underwater filter removably connected to the underwater housing.
Figure 45:
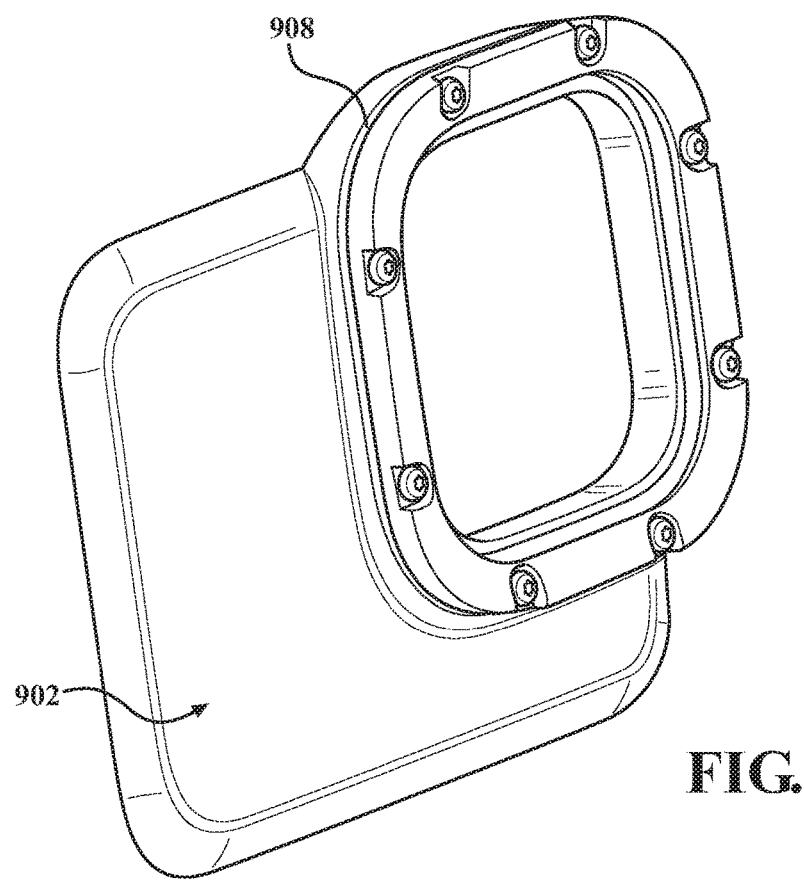
FIG. 45 is a partial, front, perspective view of the underwater housing seen in FIG. 44.
Figure 46:
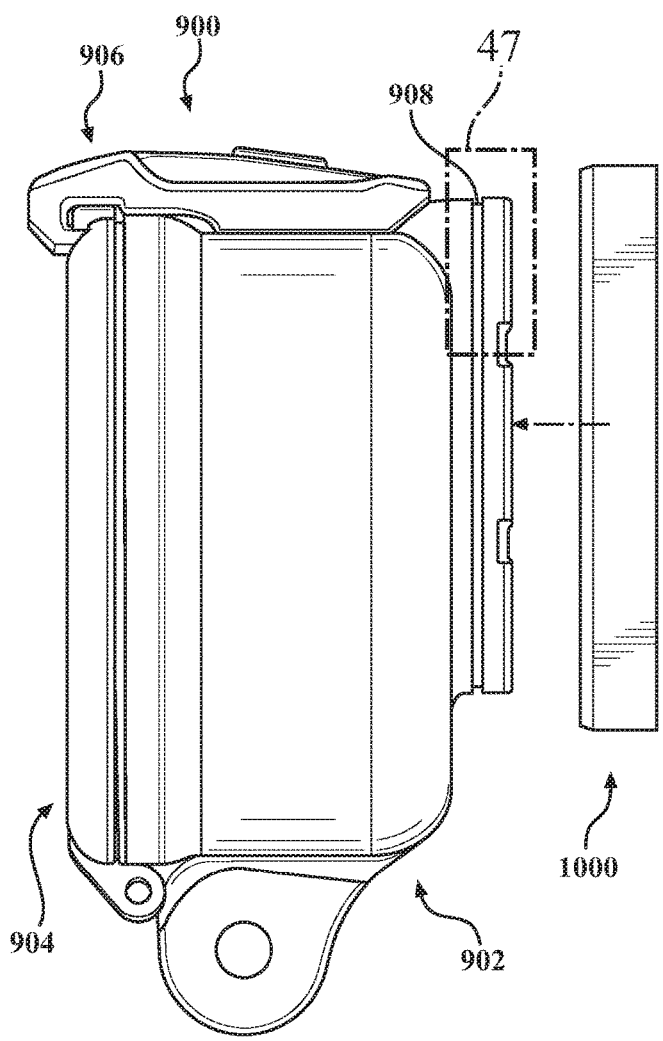
FIG. 46 is a side, plan view illustrating connection of the underwater filter seen in FIG. 44 to the underwater housing.
Figure 47:
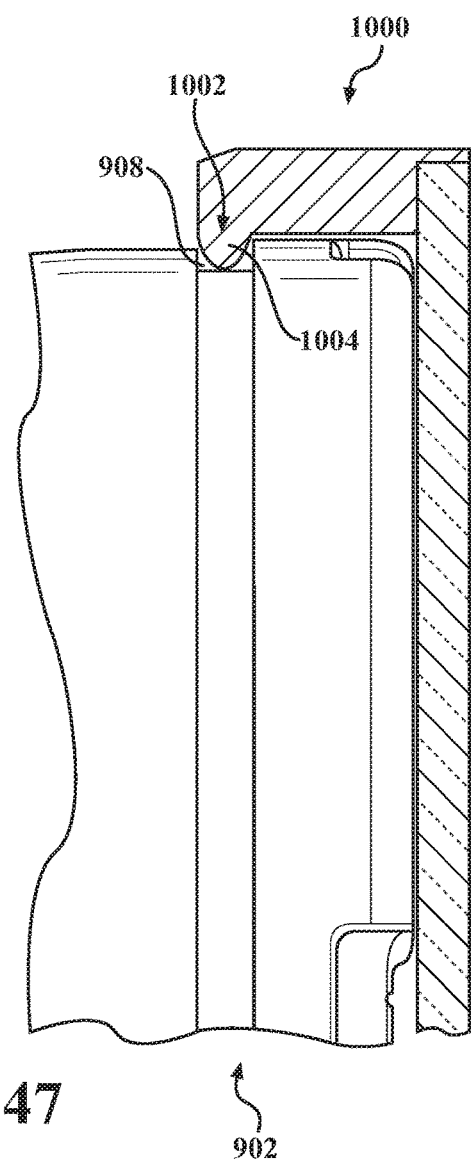
FIG. 47 is an enlargement of the area of detail identified in FIG. 46 illustrating connection of the underwater filter to the underwater housing.

Referring now to FIGS. 44-46, an underwater housing 900 for the image capture device 100 will be discussed. Specifically, FIG. 44 provides a front, plan view of the underwater housing 900 shown with an underwater filter 1000 removably connected thereto;

FIG. 45 provides a partial, front, perspective view of the underwater housing 900; FIG. 46 provides a side, plan view illustrating connection of the underwater filter 1000 to the underwater housing 804; and FIG. 47 provides an enlargement of the corresponding area of detail identified in FIG. 46.

The underwater housing 900 includes a front housing portion 902 and a rear housing portion 904 that are pivotably connected such that the underwater housing 900 is movable between open and closed positions. The underwater housing 900 includes a locking mechanism 906 that is configured to maintain the closed position of the underwater housing 900.

The front housing portion 902 is configured to support the underwater filter 1000, which accounts for optical variation (e.g., distortion) resulting during image capture in an underwater environment. For example, in the illustrated embodiment, the front housing portion 902 defines a (perimeter) recess 908 that is configured to receive an engagement member 1002 (e.g., a finger 1004, a protrusion, etc.) on the underwater filter 1000 such that the underwater filter 1000 is removably connectable to the front housing portion 902.

Figure 48:
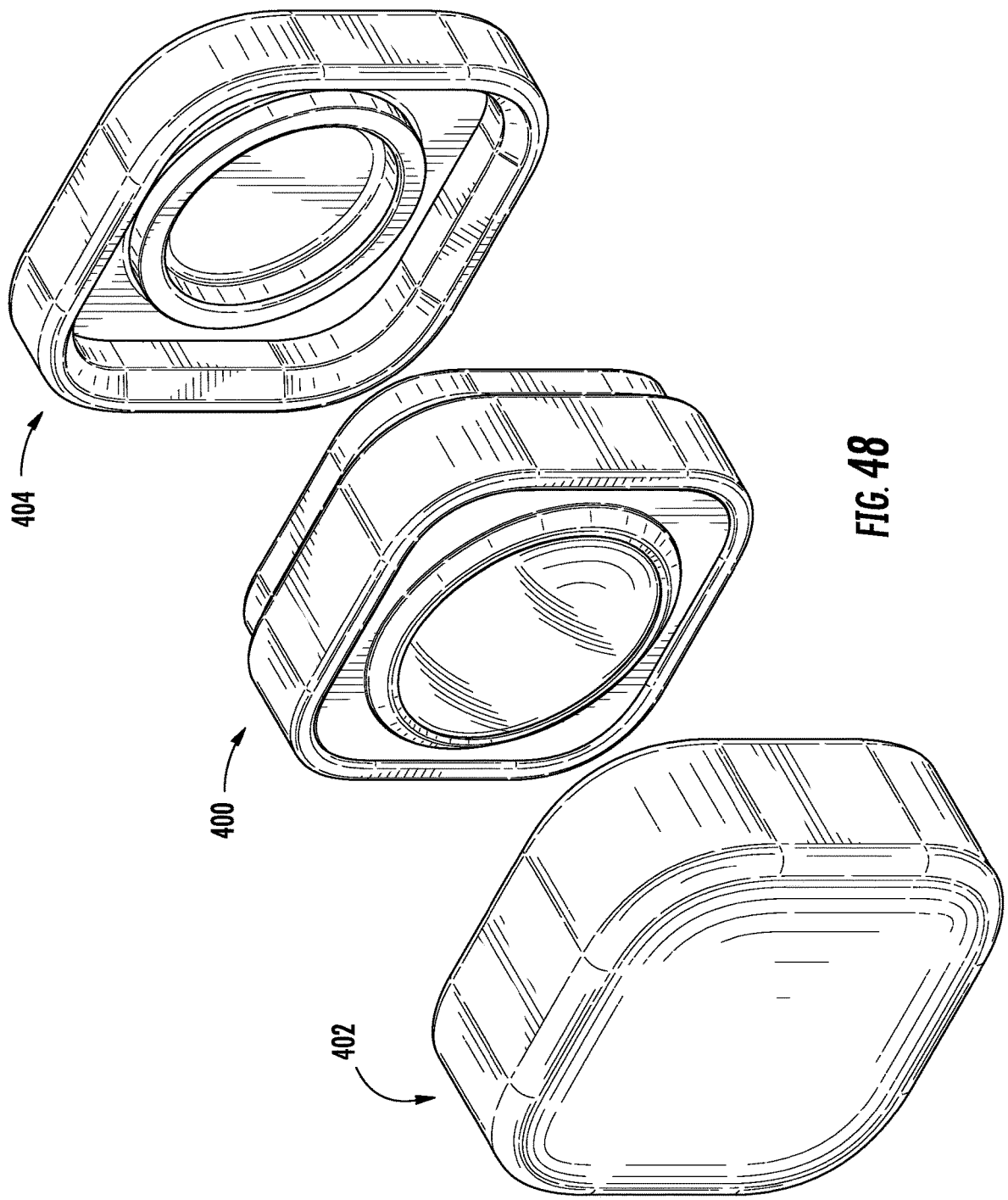
FIG. 48 provides a front, perspective view of the accessory, the front cap, and the rear cap seen in FIGS. 11A, 11B with the front cap and the rear cap shown separated from the accessory.
Figure 49:
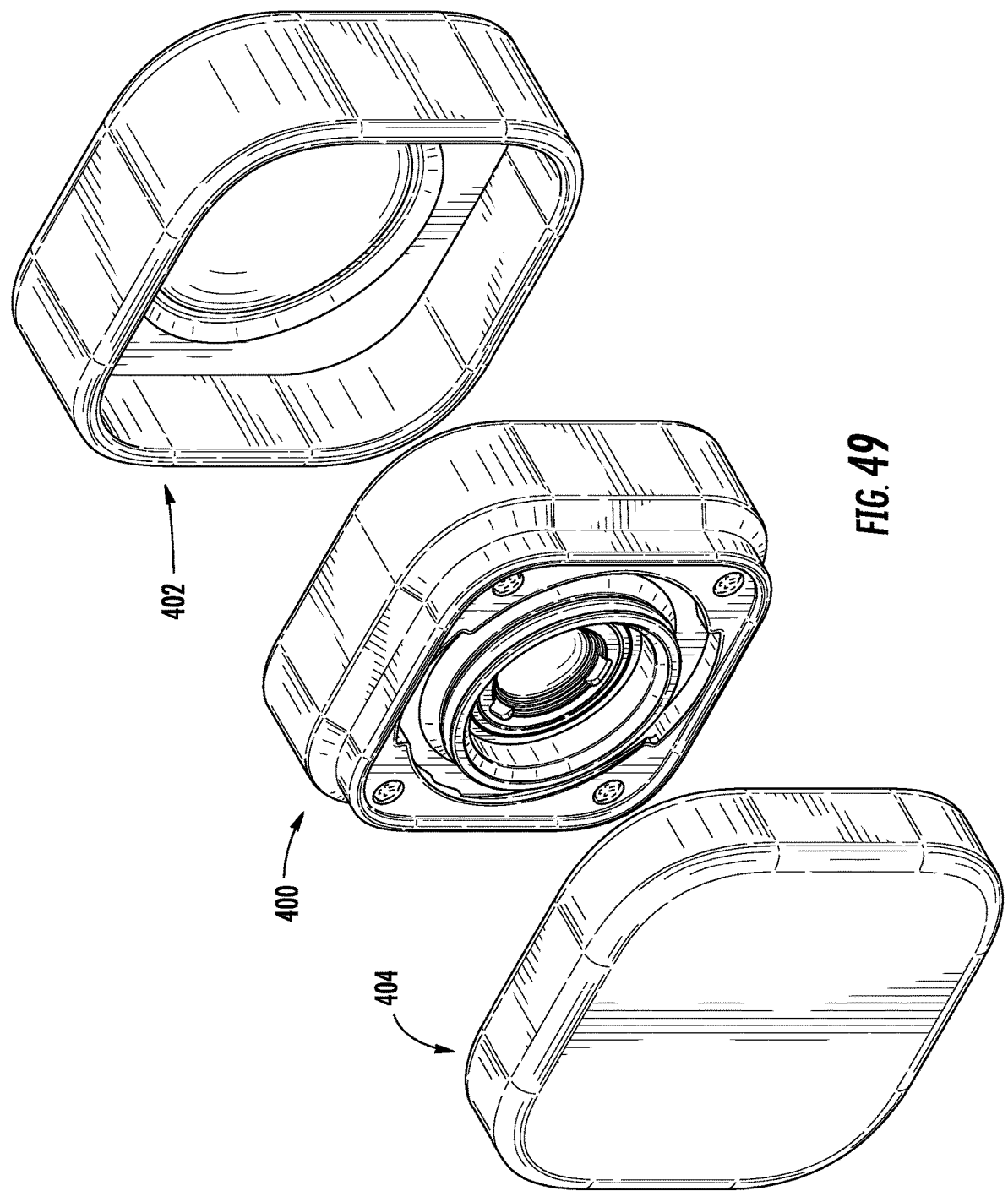
FIG. 49 provides a rear, perspective view of the accessory, the front cap, and the rear cap seen in FIG. 48 with the front cap and the rear cap shown separated from the accessory.
Figure 50:
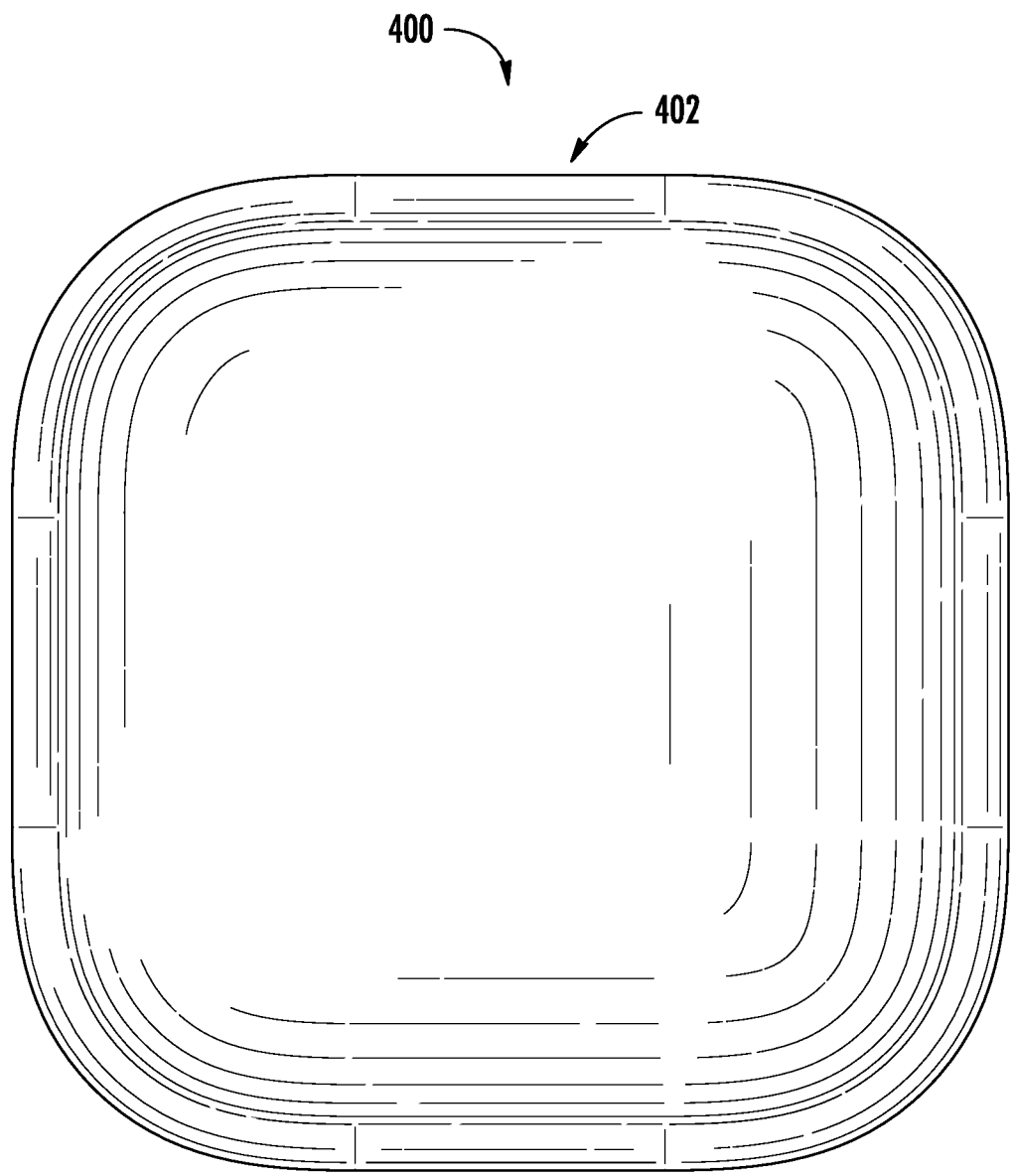
FIG. 50 provides a front, plan view of the accessory seen in FIG. 48 shown covered by the front cap.
Figure 51:
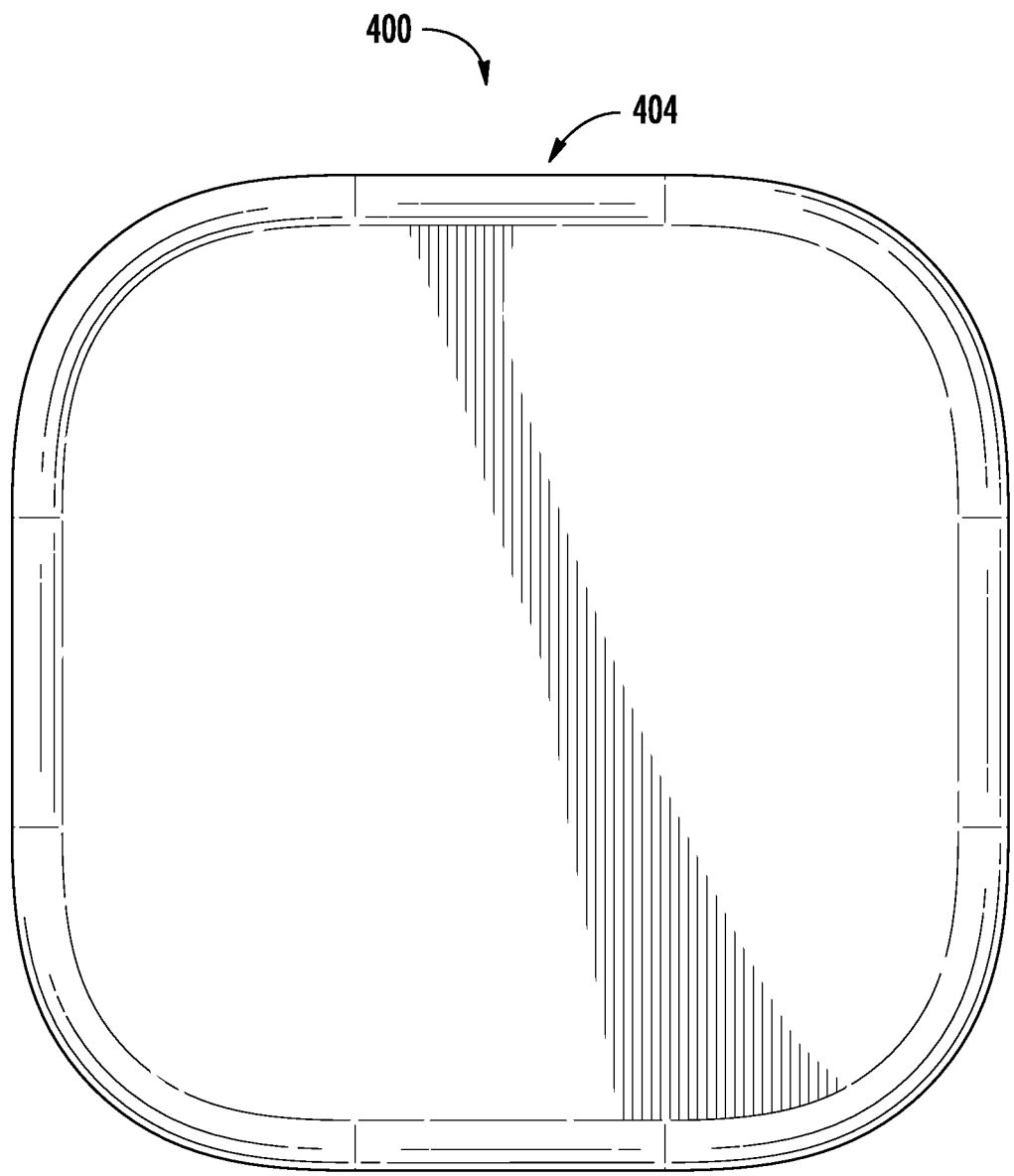
FIG. 51 provides a rear, plan view of the accessory seen in FIG. 48 shown covered by the rear cap.
Figure 52:
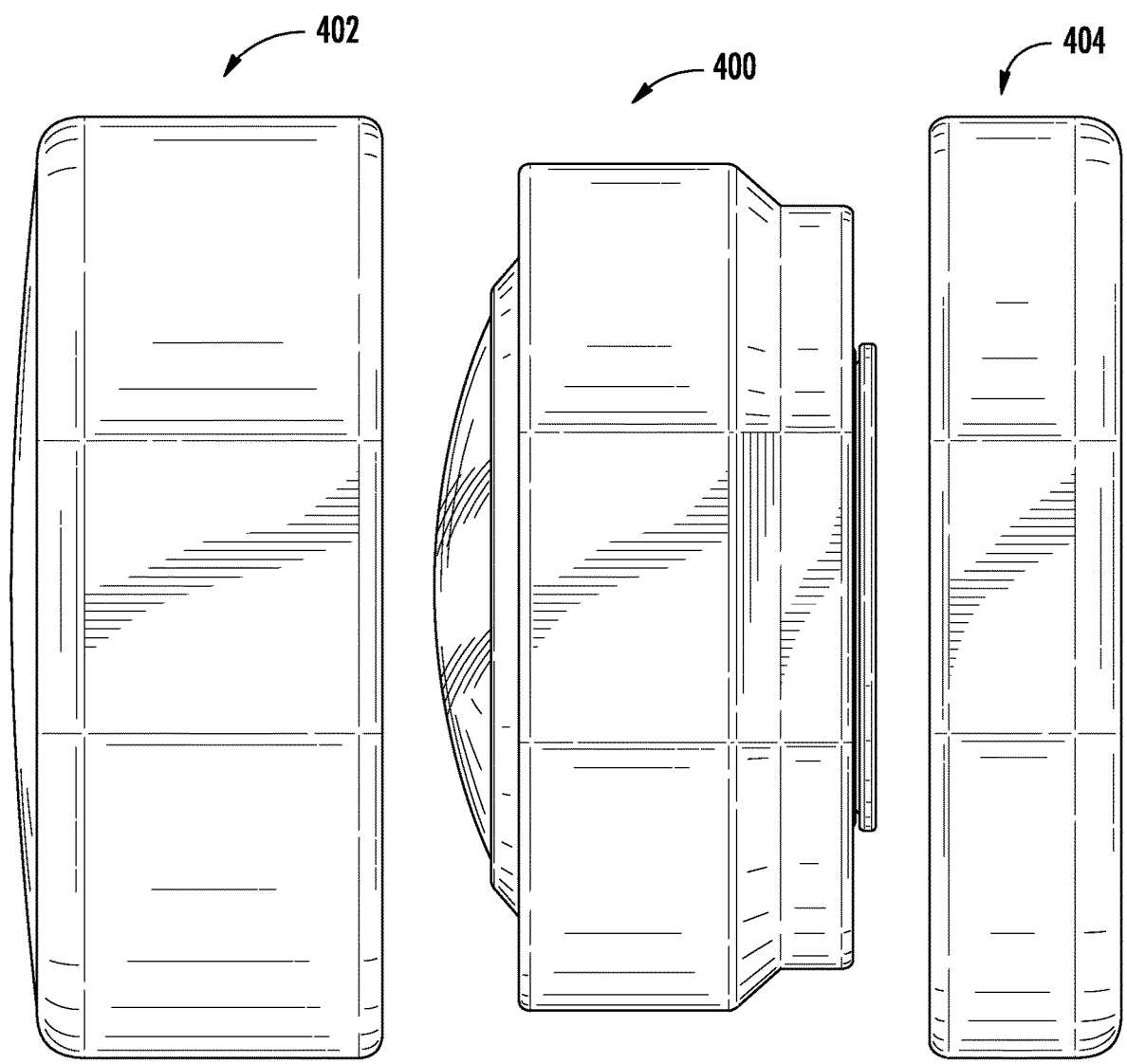
FIGS. 52-55 provide side, plan views of the accessory, the front cap, and the rear cap seen in FIG. 48 with the front cap and the rear cap shown separated from the accessory.
Figure 53:
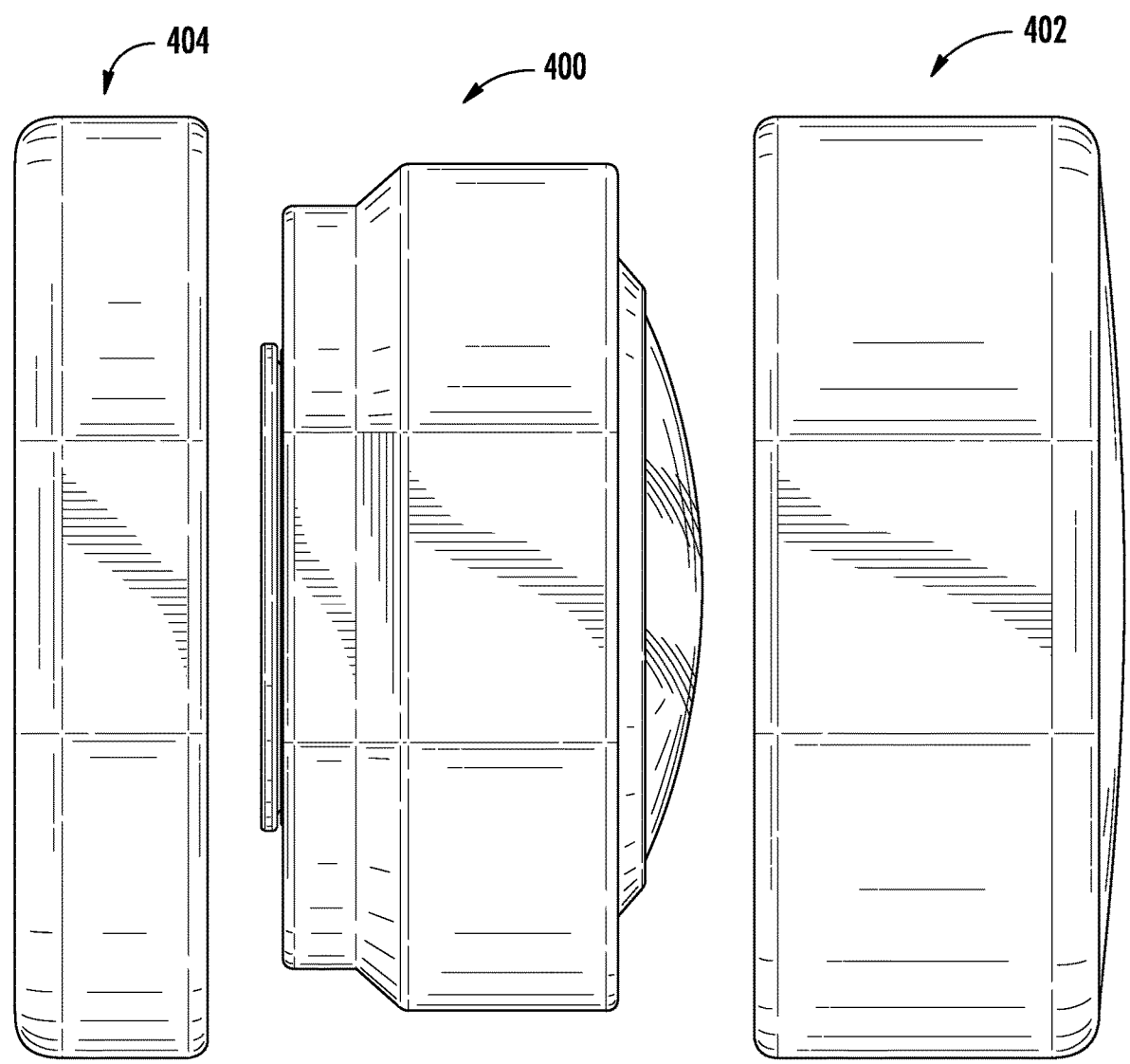
Figure 54:
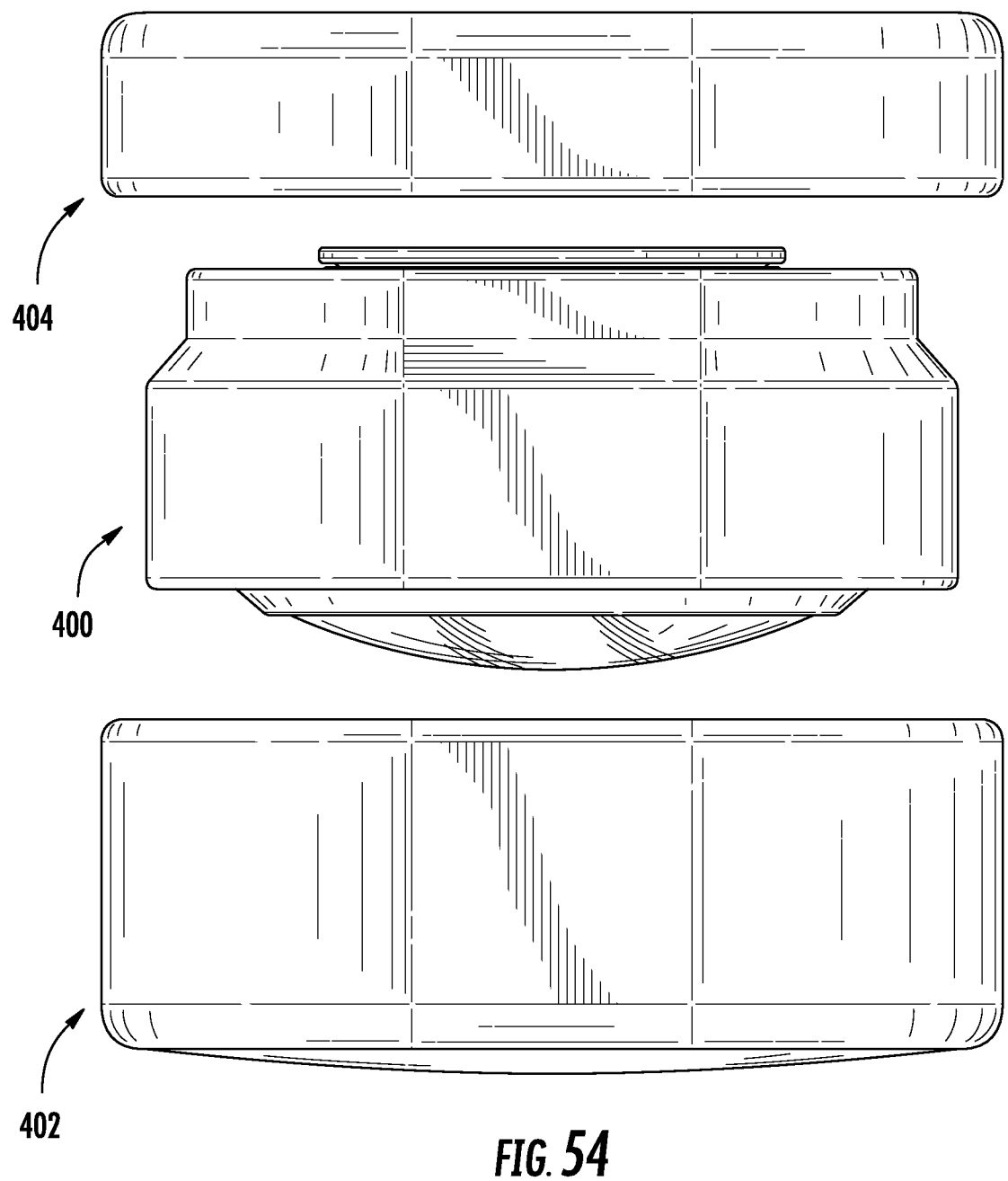
Figure 55:
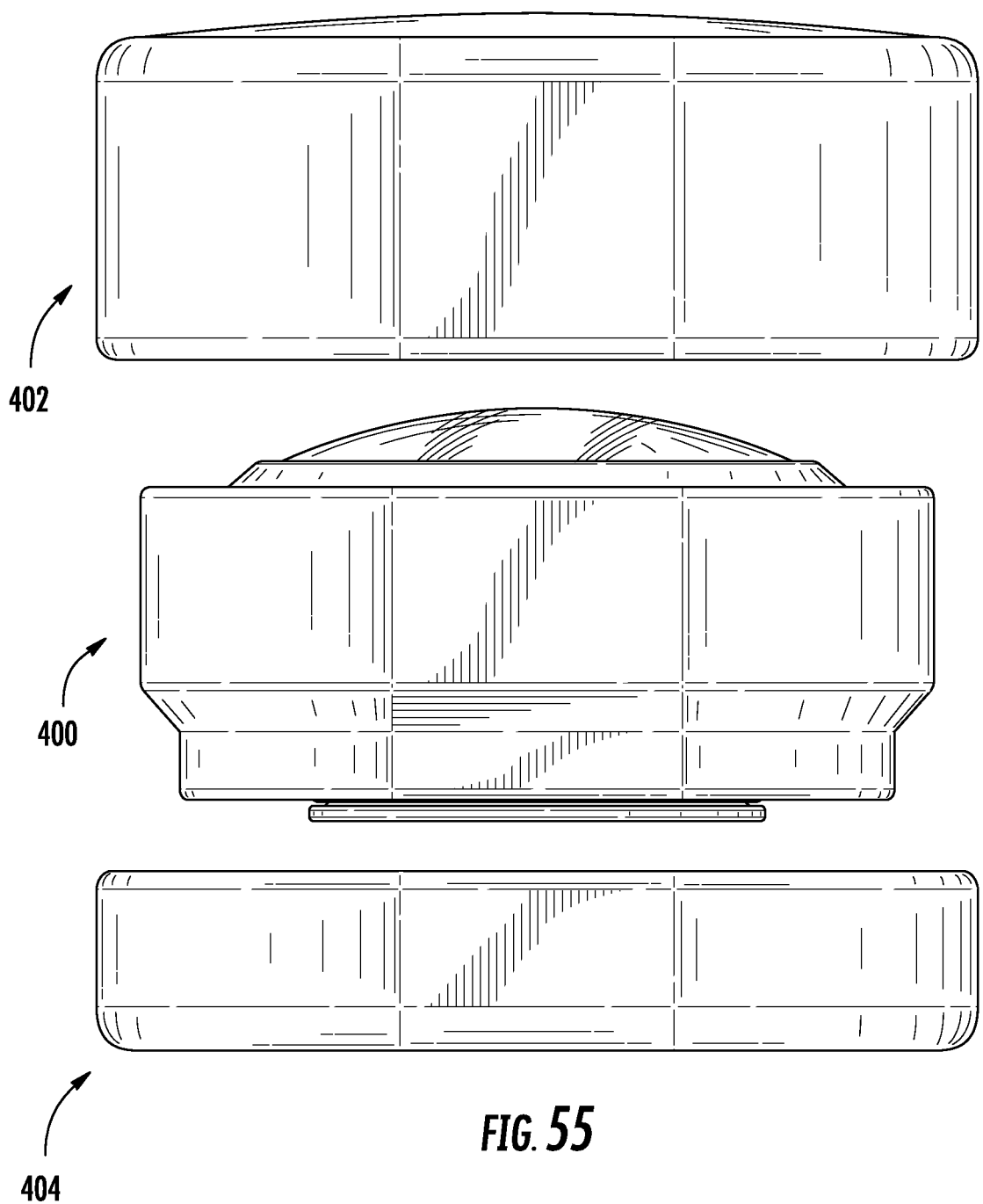
Figure 56:
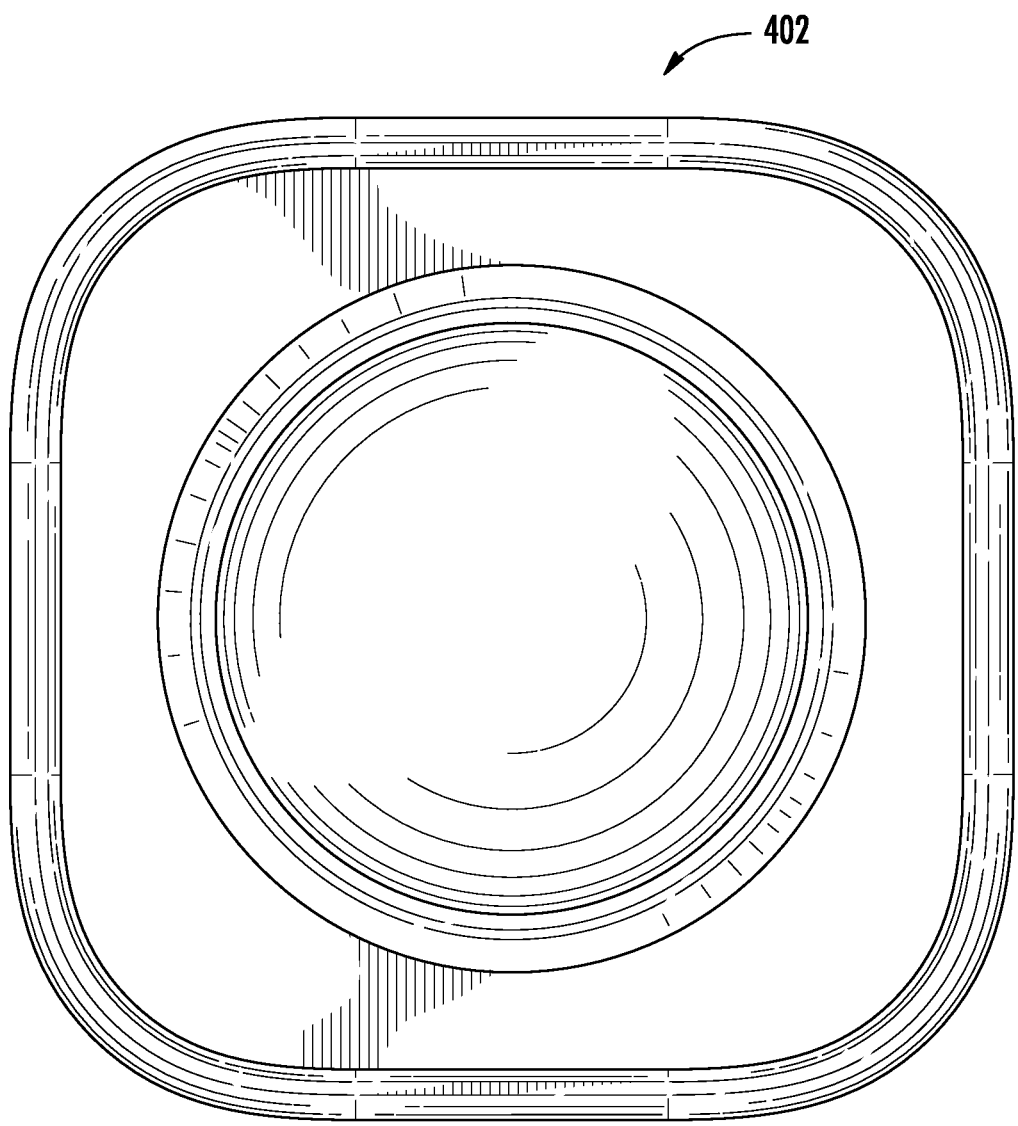
FIG. 56 is a rear, plan view of the front cap seen in FIG. 48.
Figure 57:
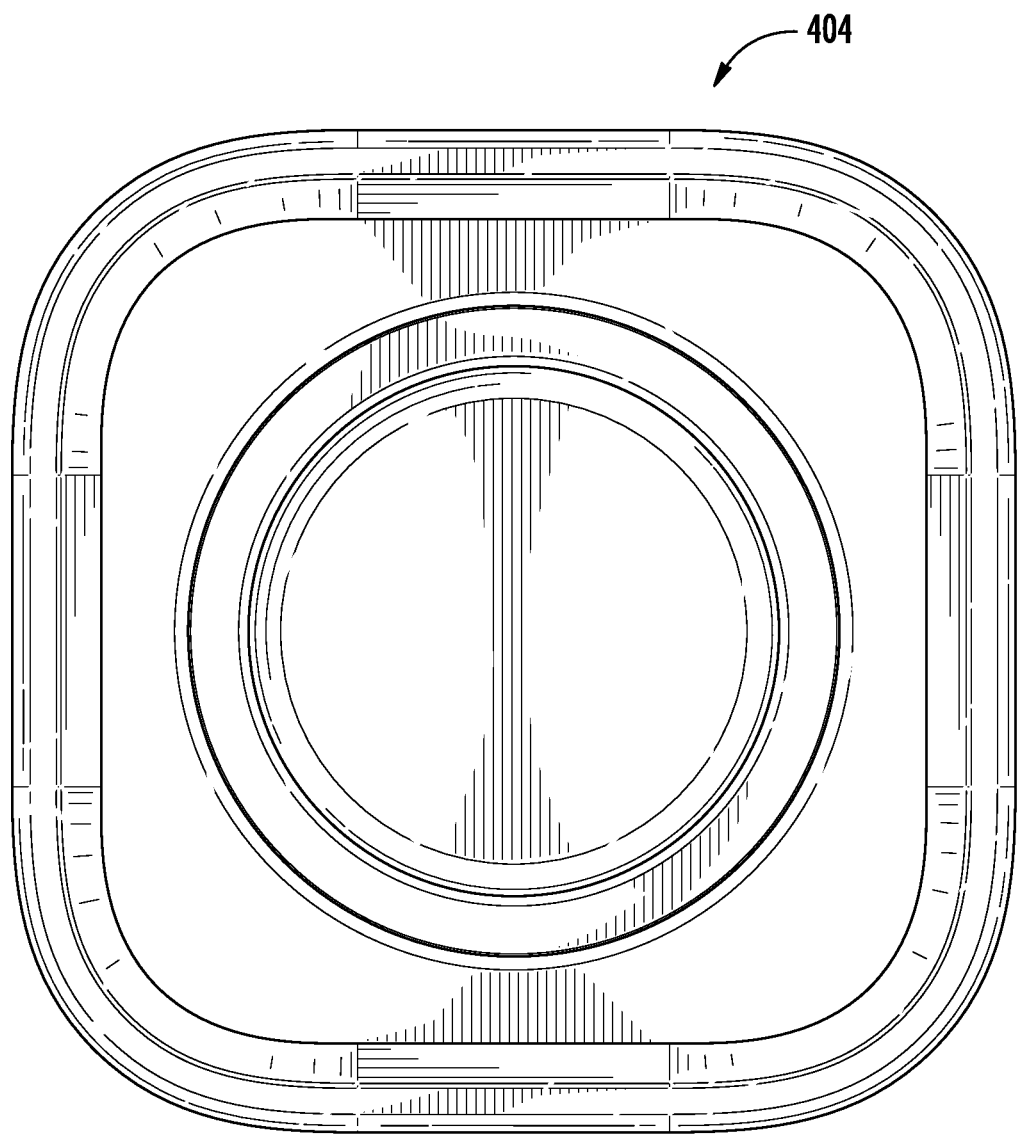
FIG. 57 is a front, plan view of the rear cap seen in FIG. 48.
Figure 58:
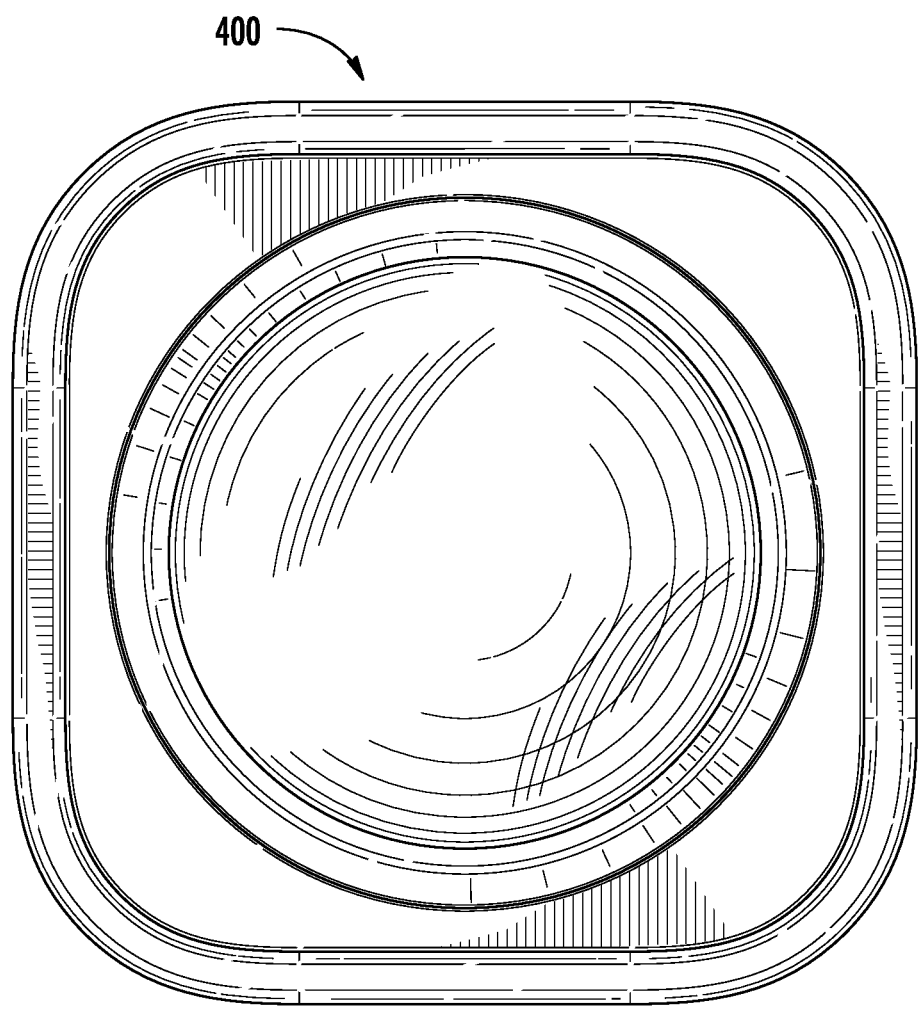
FIG. 58 is a front, plan view of the accessory seen in FIG. 48.
Figure 59:
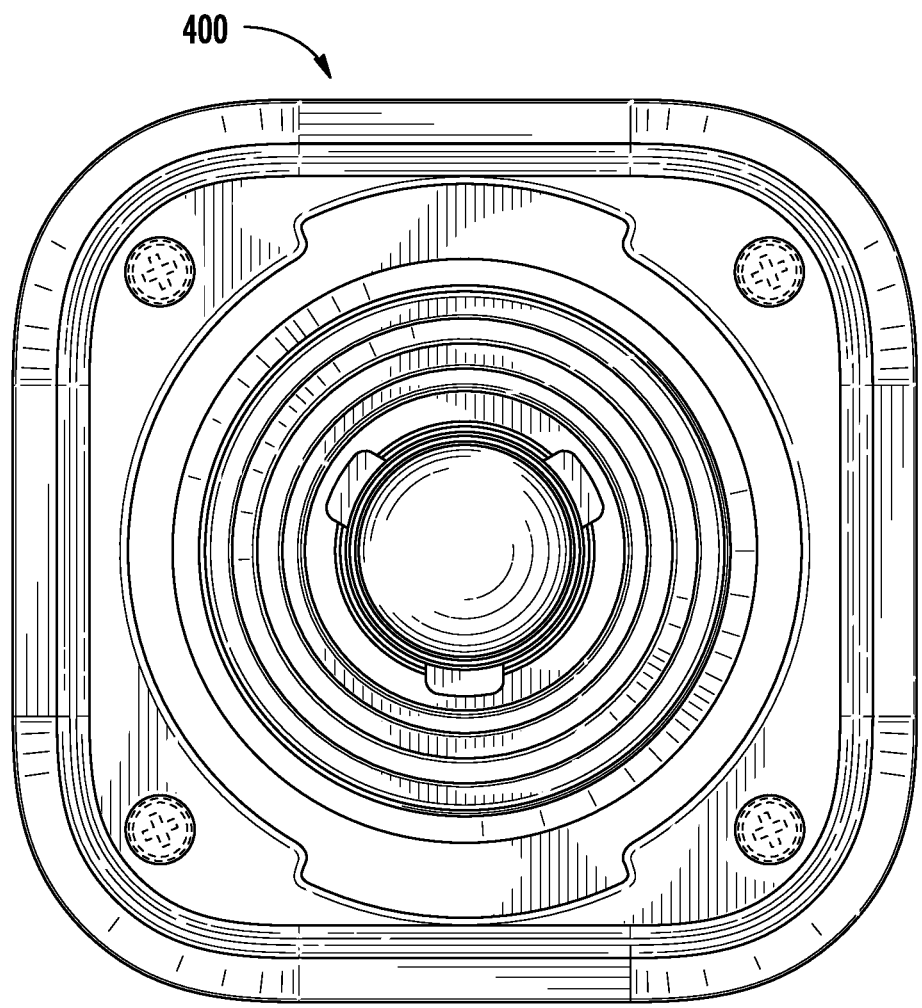
FIG. 59 is a rear, plan view of the accessory seen in FIG. 48.
Figure 60:
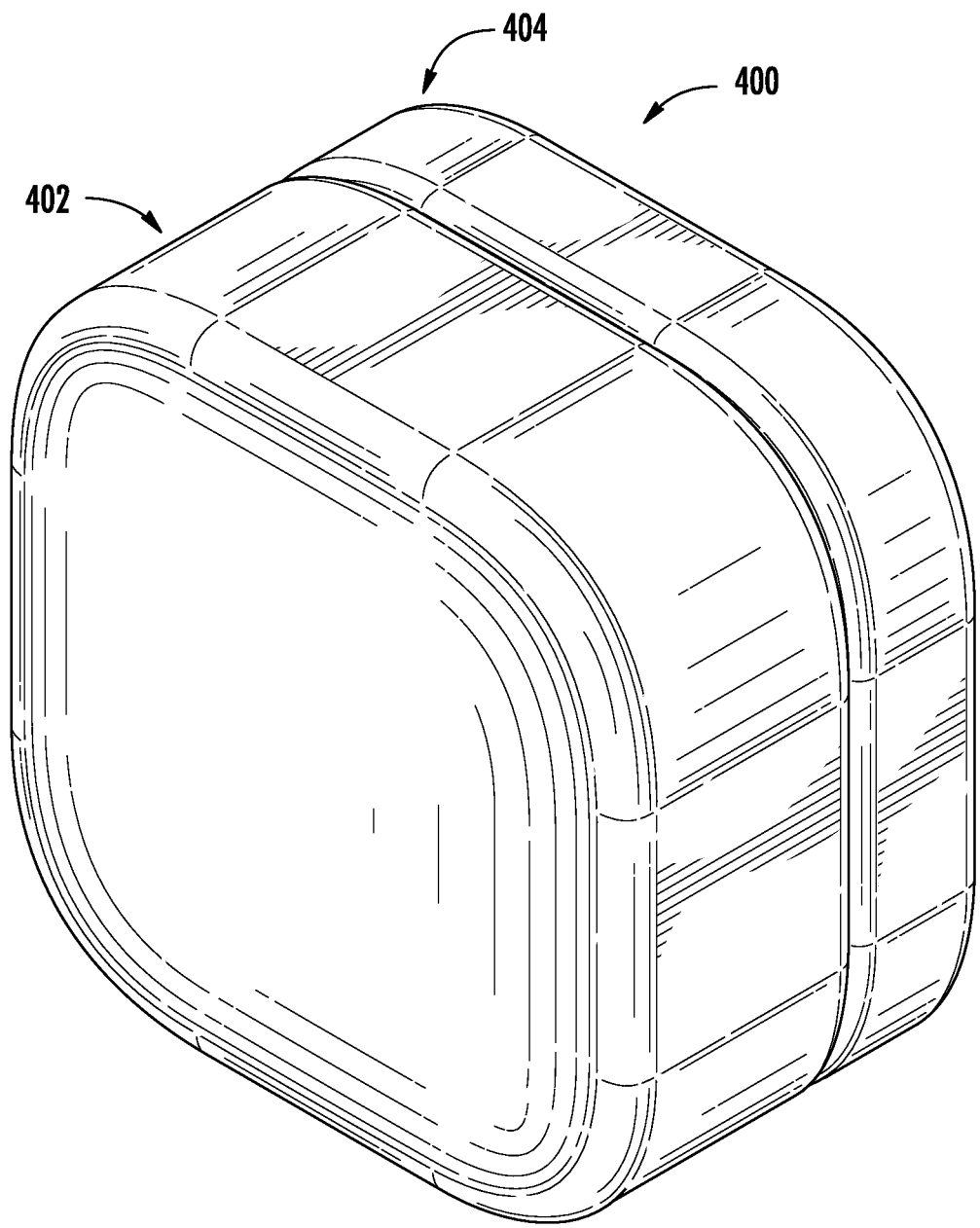
FIG. 60 is a front, perspective view of the accessory seen in FIG. 48 shown covered by the front cap and the rear cap.
Figure 61:
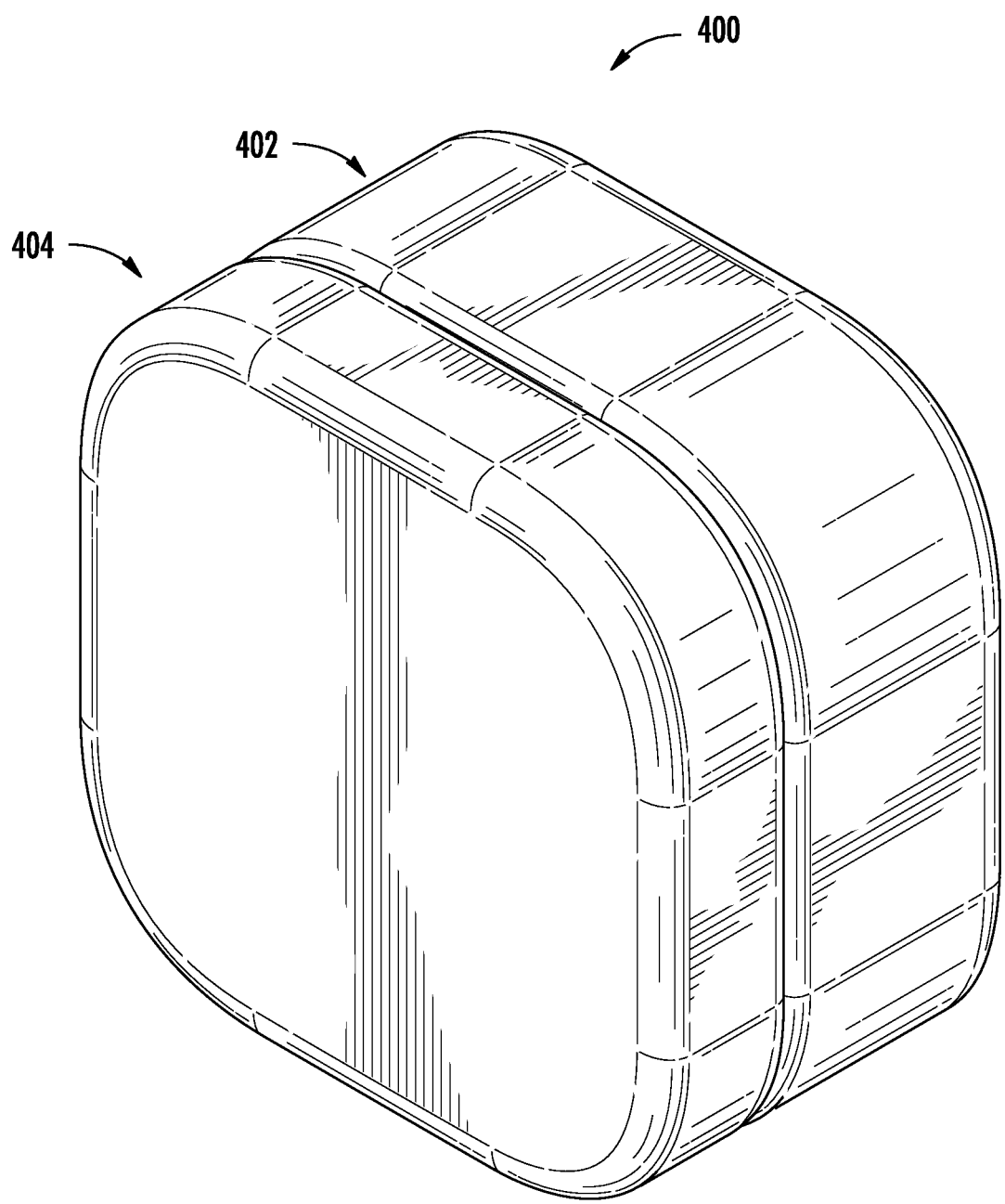
FIG. 61 is a rear, perspective view of the accessory seen in FIG. 48 shown covered by the front cap and the rear cap.
Figure 62:
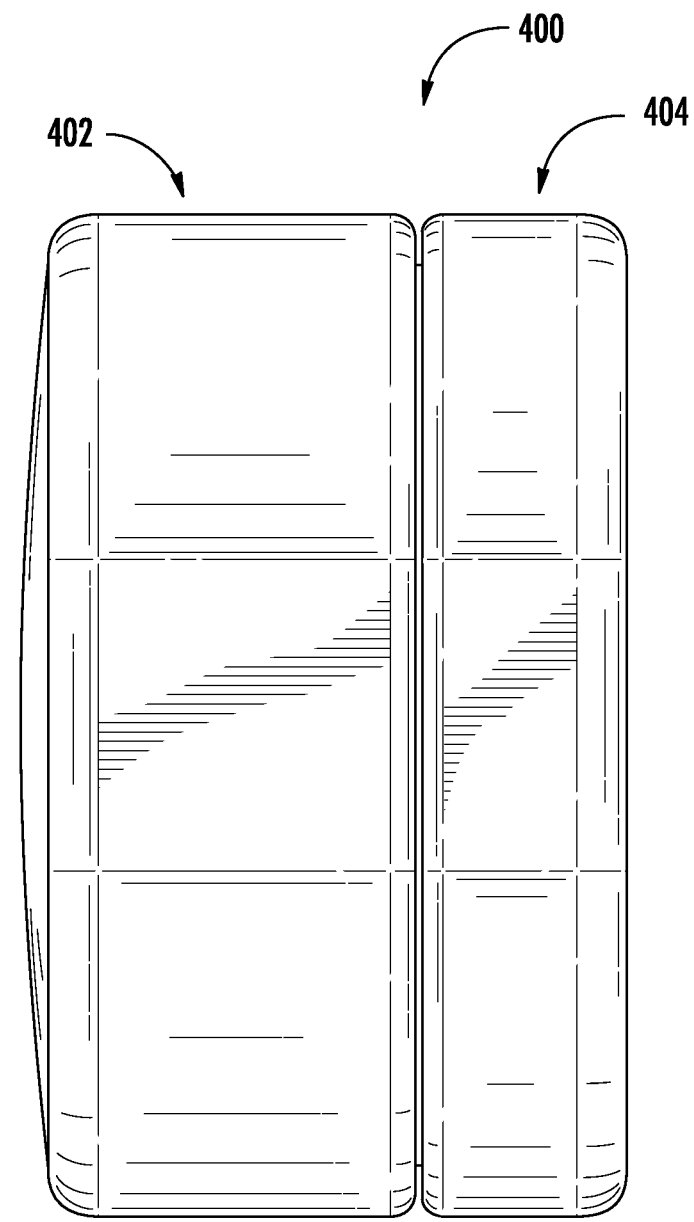
FIG. 62 is a side, plan view of the accessory seen in FIG. 48 shown covered by the front cap and the rear cap.
Figure 63:
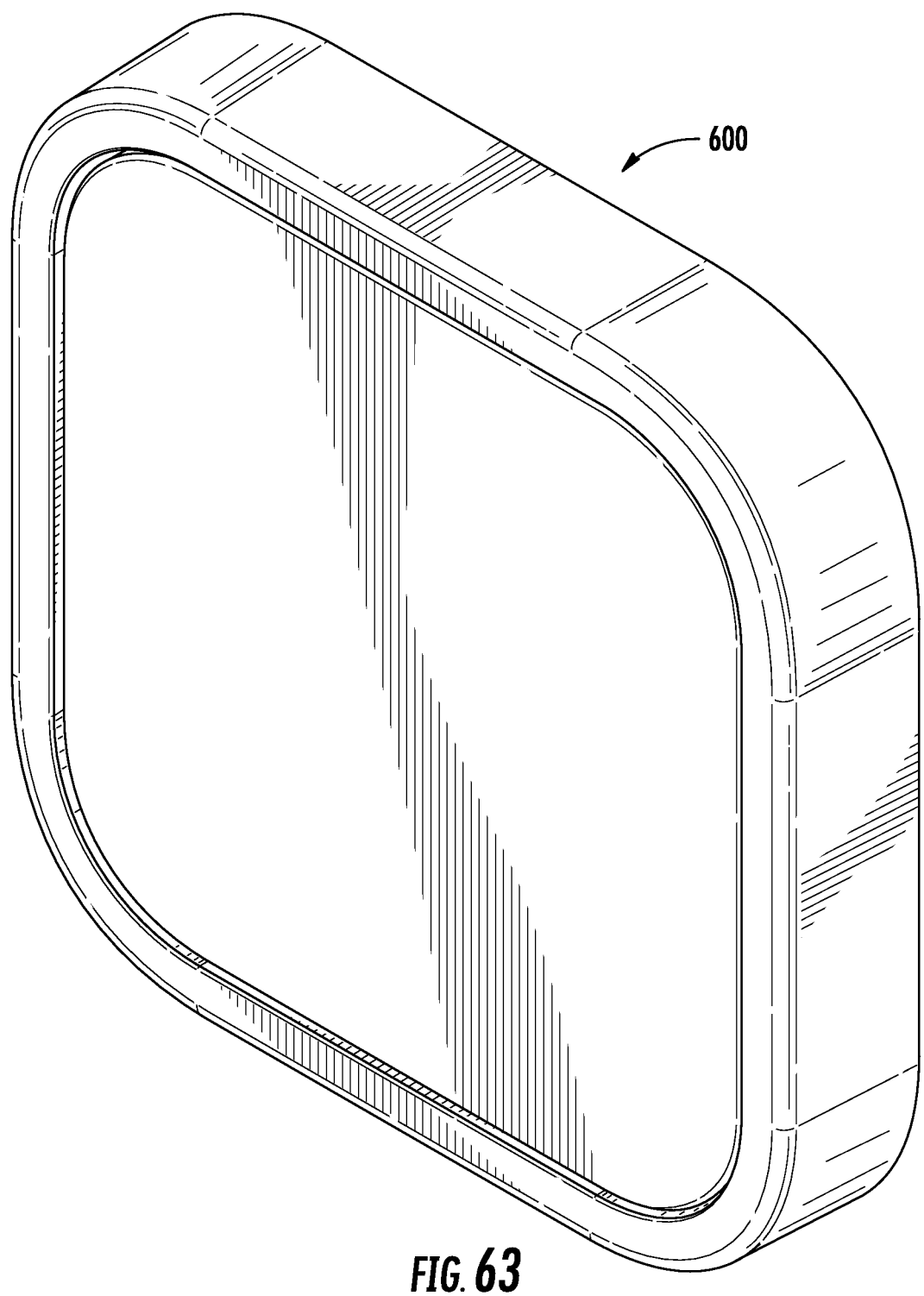
FIG. 63 provides a front, perspective view of the accessory seen in FIG. 27.
Figure 64:
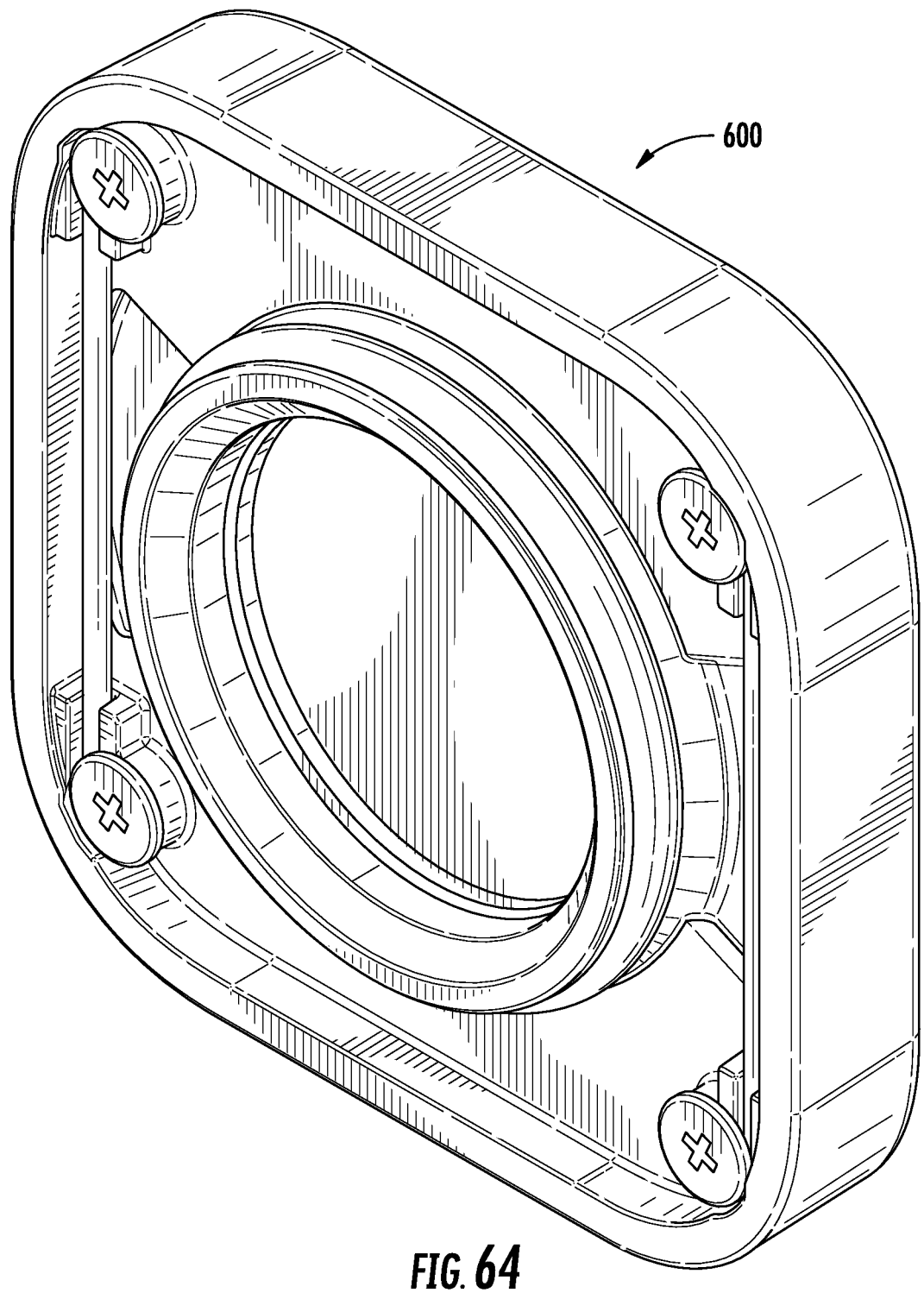
FIG. 64 provides a rear, perspective view of the accessory seen in FIG. 63.
Figure 65:
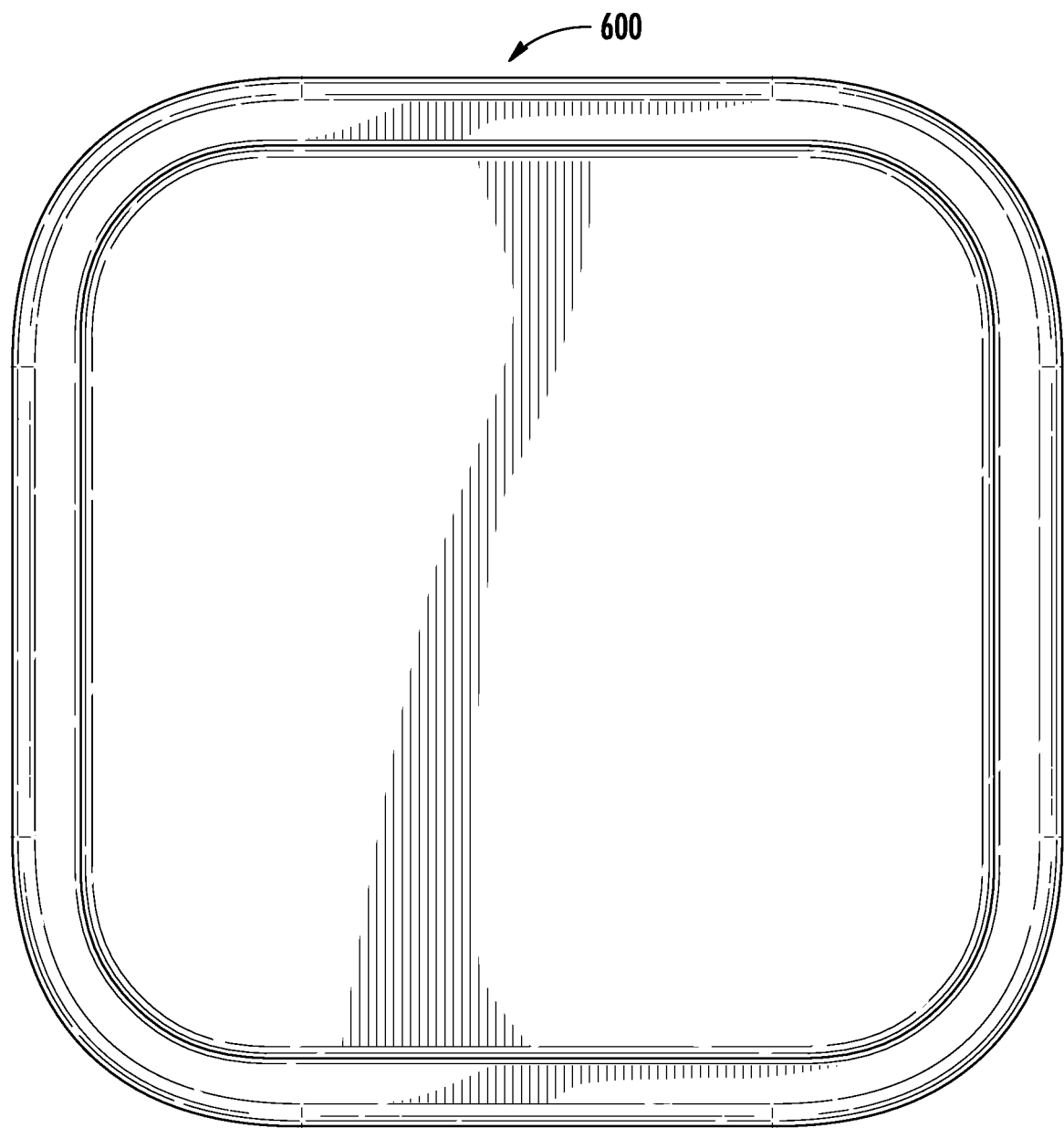
FIG. 65 provides a front, plan view of the accessory seen in FIG. 63.
Figure 66:
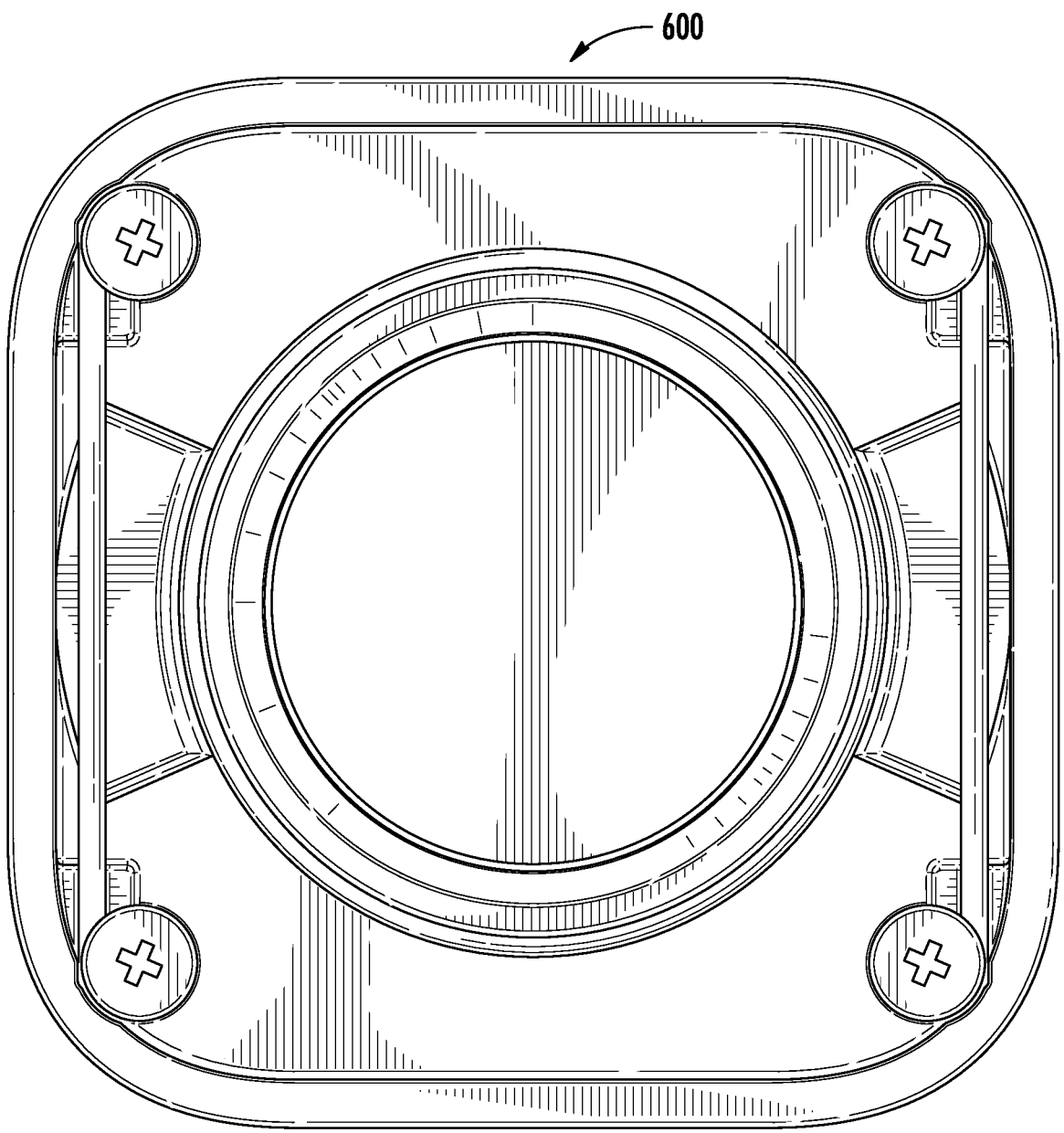
FIG. 66 provides a rear, plan view of the accessory seen in FIG. 63.
Figure 67:
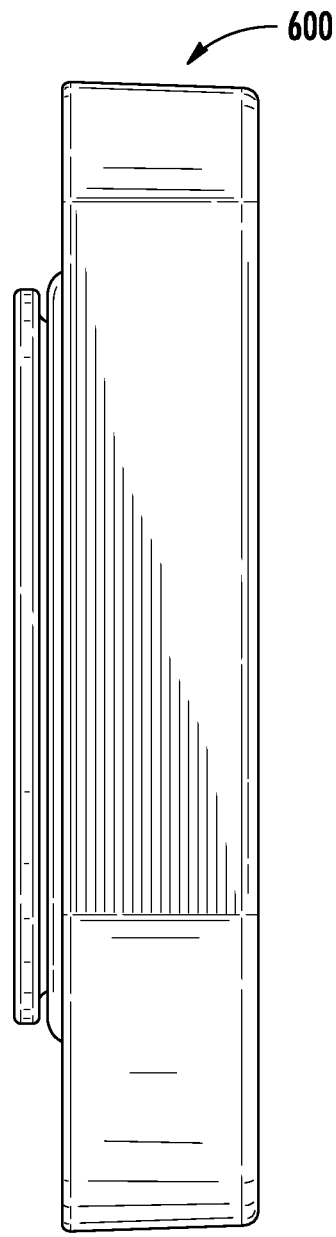
FIGS. 67-70 provide side, plan views of the accessory seen in FIG. 63.
Figure 68:
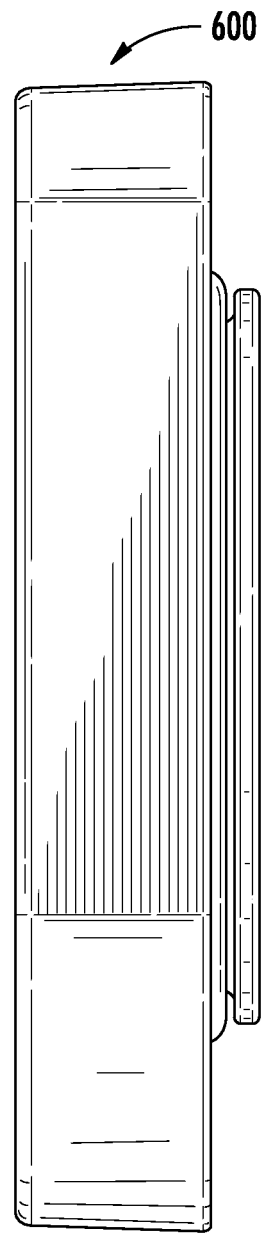
Figure 69:
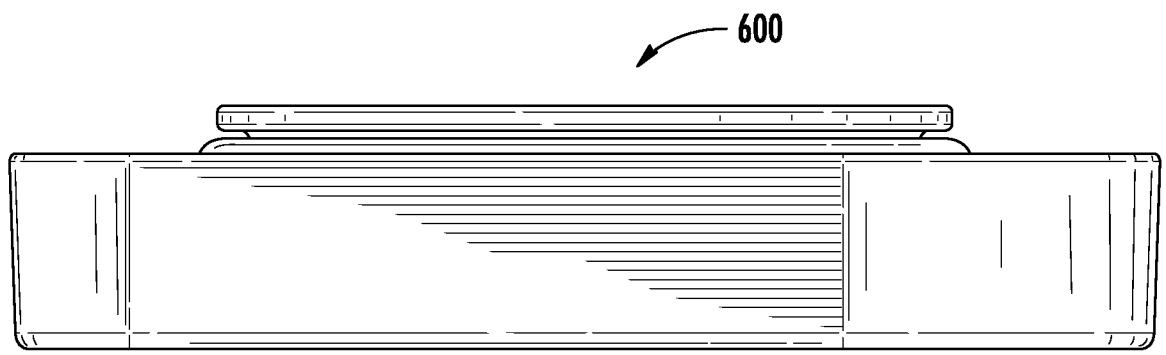
Figure 70:
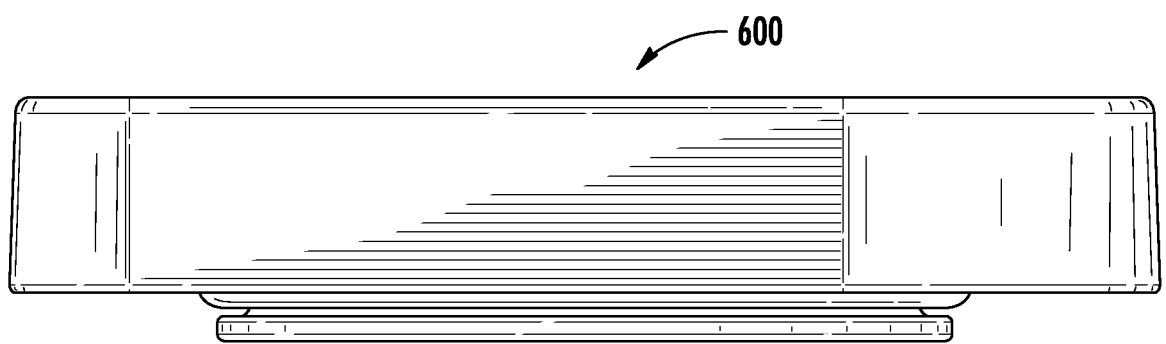
Figure 71:
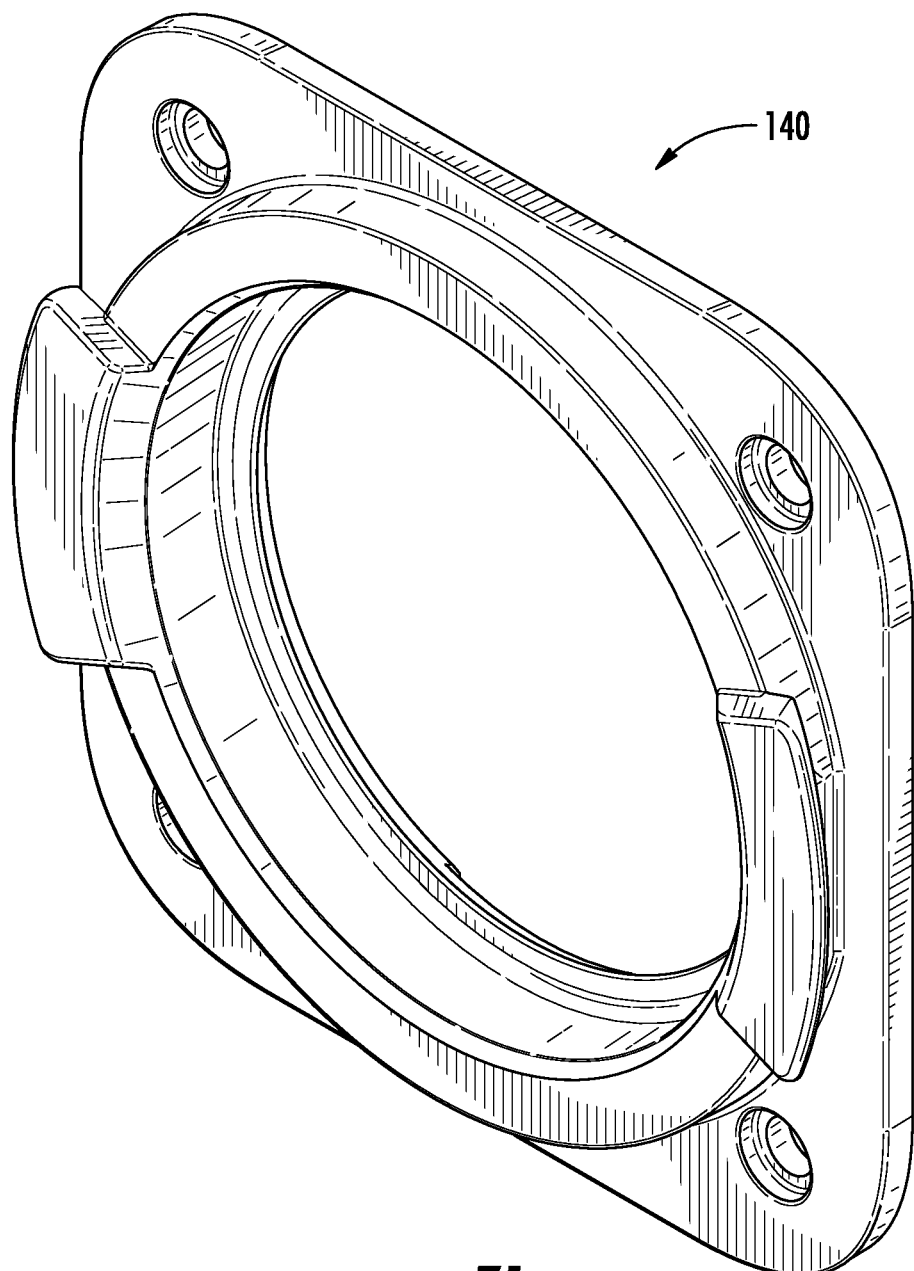
FIG. 71 provides a front, perspective view of the mounting structure seen in FIGS. 4, 8A, and 8B.
Figure 72:
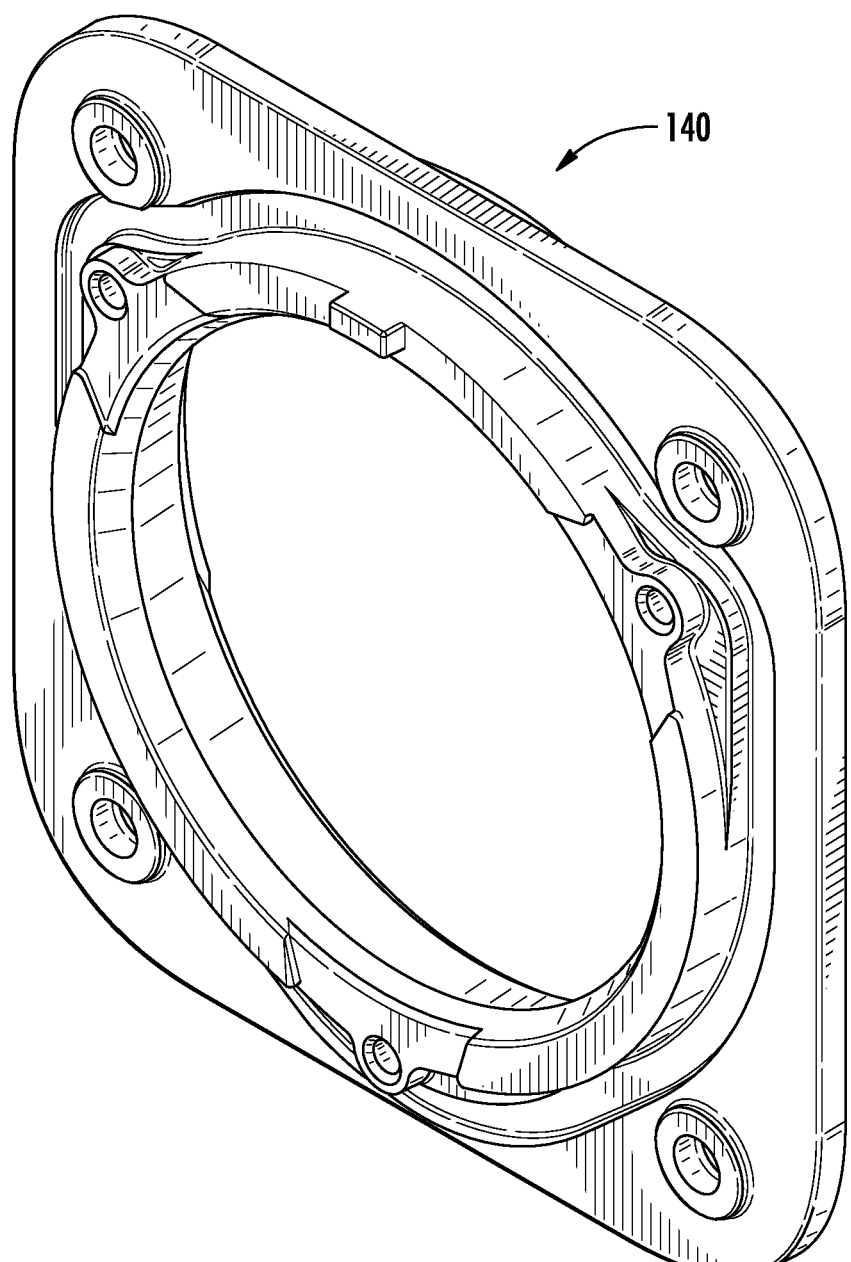
FIG. 72 provides a rear, perspective view of the mounting structure seen in FIG. 71.
Figure 73:
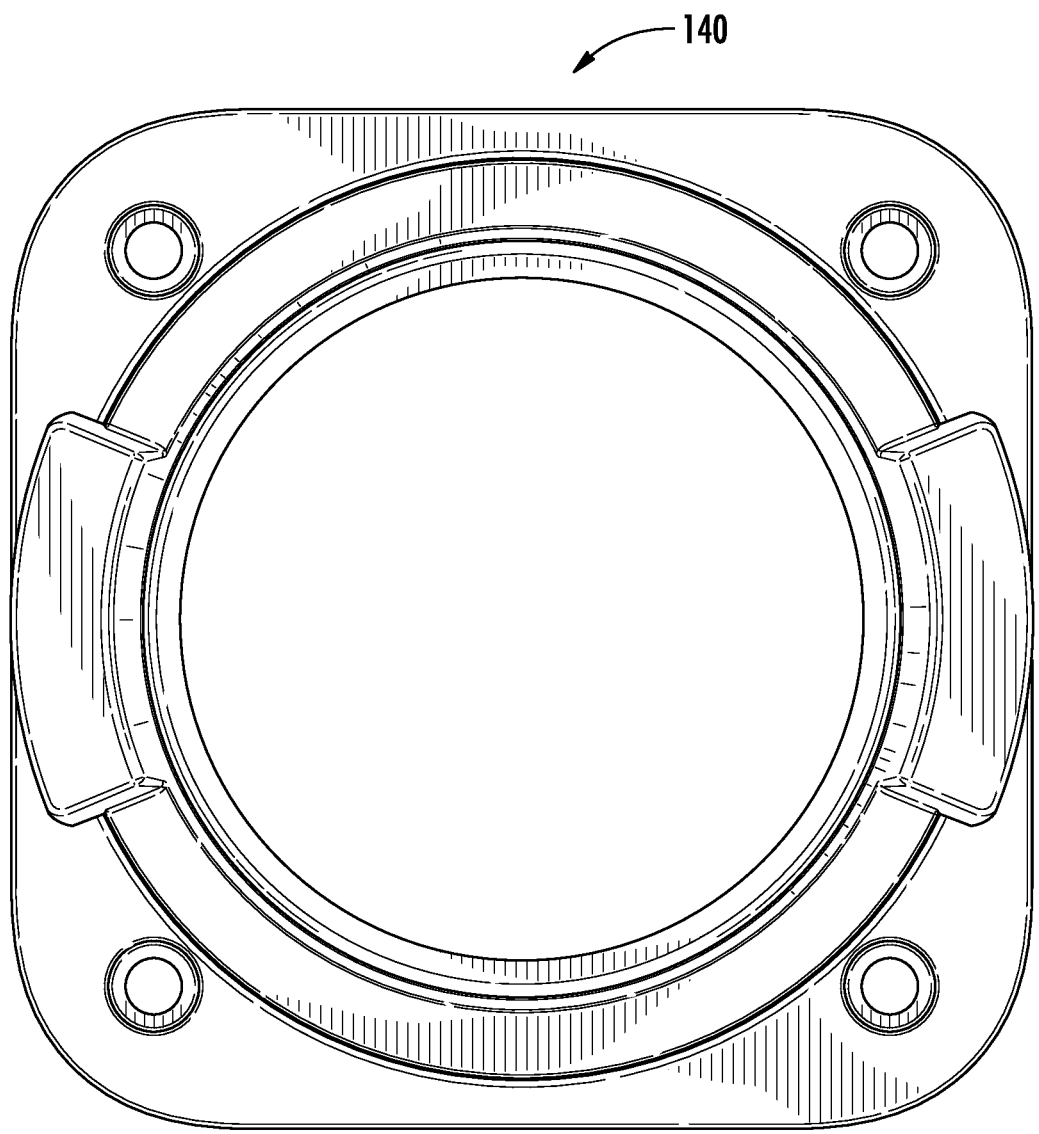
FIG. 73 provides a front, plan view of the mounting structure seen in FIG. 71.
Figure 74:
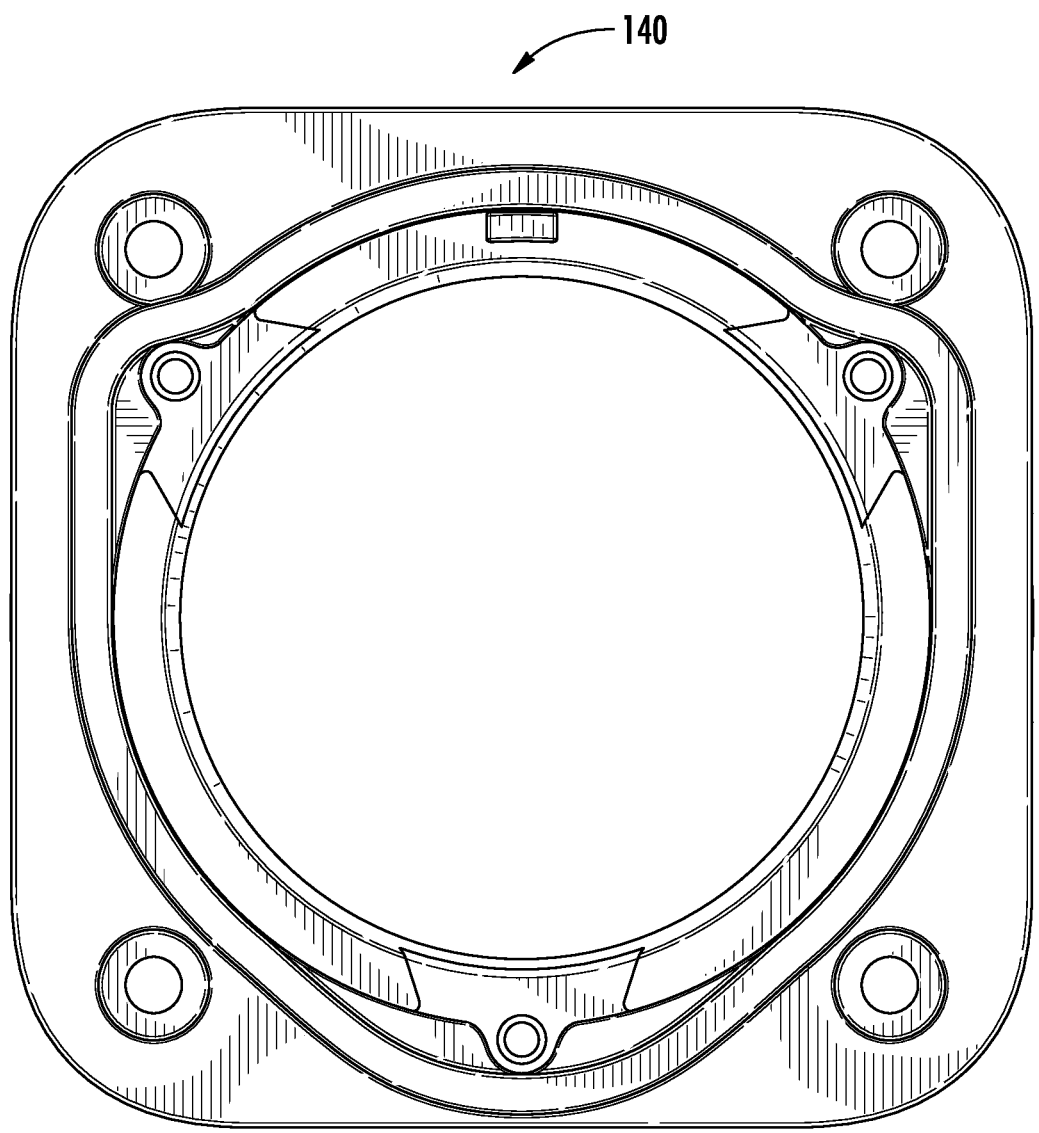
FIG. 74 provides a rear, plan view of the mounting structure seen in FIG. 71.
Figure 75:
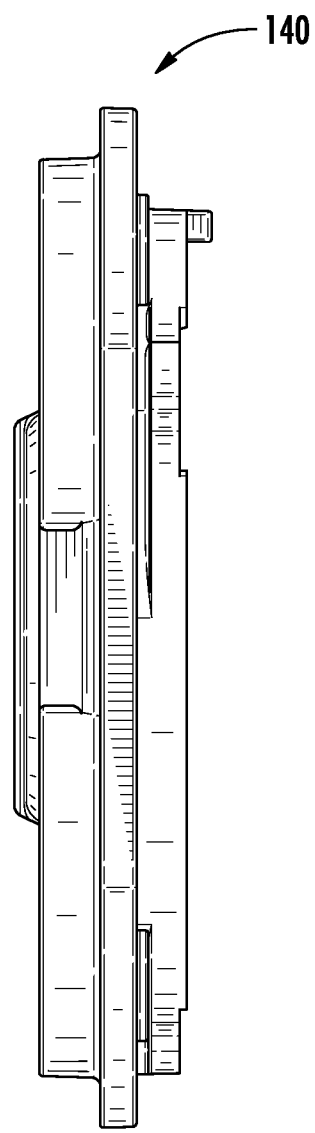
FIGS. 75-78 provide side, plan views of the mounting structure seen in FIG. 71.
Figure 76:
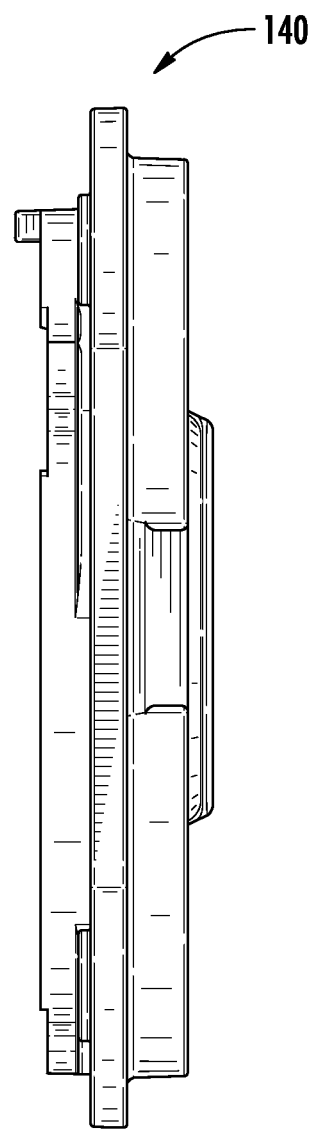
Figure 77:
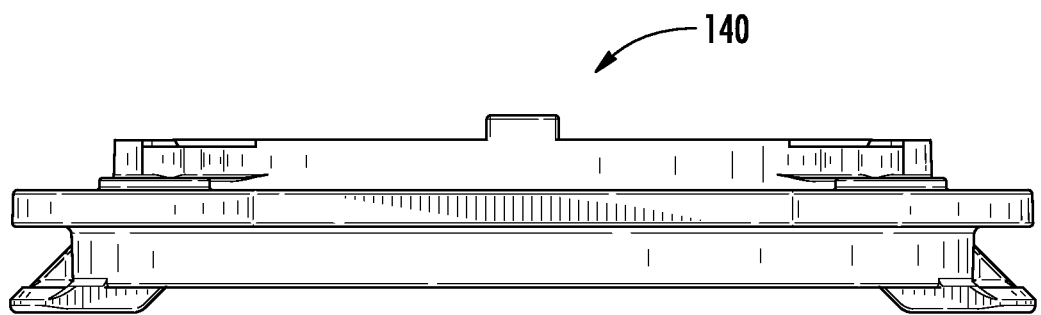
Figure 78:
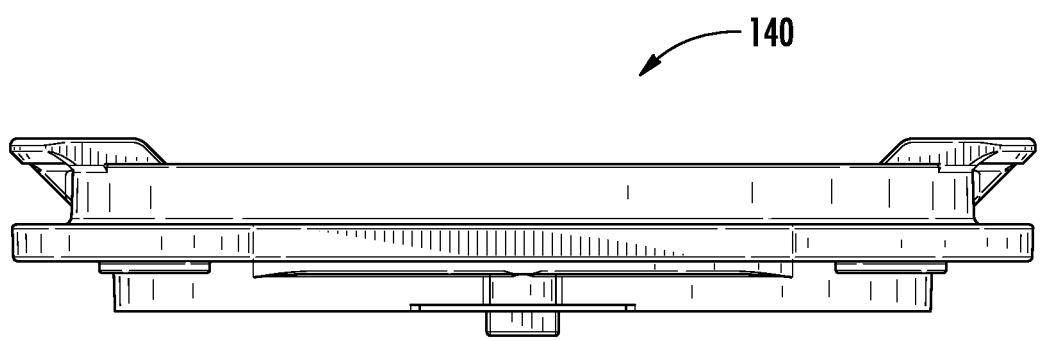

With reference now to FIGS. 48-71, additional details of the accessory 400 (see also FIGS. 4-26), the respective front and rear caps 402, 404 (see also FIGS. 10-12), the accessory 600 (see also FIGS. 27-36), and the mounting structure 140 (see also FIG. 4) are provided. Specifically, FIG. 48 provides a front, perspective view of the accessory 400 shown separated from the respective front and rear caps 402, 404; FIG. 49 provides a rear, perspective view of the accessory 400 shown separated from the respective front and rear caps 402, 404; FIG. 50 provides a front, plan view of the accessory 400 shown covered by the front cap 402; FIG. 51 provides a rear, plan view of the accessory 400 shown covered by the rear cap 404; FIGS. 52-55 provide side, plan views of the accessory 400 shown separated from the respective front and rear caps 402, 404; FIG. 56 provides a rear, plan view of the front cap 402; FIG. 57 provides a front, plan view of the rear cap 404; FIG. 58 provides a front, plan view of the accessory 400;

FIG. 59 provides a rear, plan view of the accessory 400; FIG. 60 provides a front, perspective view of the accessory 400 shown covered by the respective front and rear caps 402, 404; FIG. 61 provides a rear, perspective view of the accessory 400 shown covered by the respective front and rear caps 402, 404; FIG. 62 provides a side, plan view of the accessory 400 shown covered by the respective front and rear caps 402, 404; FIG. 63 provides a front, perspective view of the accessory 600; FIG. 64 provides a rear, perspective view of the accessory 600; FIG. 65 provides a front, plan view of the accessory 600; FIG. 66 provides a rear, plan view of the accessory 600; FIGS. 67-70 provide side, plan views of the accessory 600; FIG. 71 provides a front, perspective view of the mounting structure 140; FIG. 72 provides a rear, perspective view of the mounting structure 140; FIG. 73 provides a front, plan view of the mounting structure 140; FIG. 74 provides a rear, plan view of the mounting structure 140; and FIGS. 75-78 provide side, plan views of the mounting structure 140.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Persons skilled in the art will understand that the various embodiments of the disclosure described herein, and shown in the accompanying figures, constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure to achieve any desired result and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of" Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "left," "right," "upward," "downward," "inward," "outward," "horizontal," "vertical," etc., should be understood to describe a relative relationship between the structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Although terms such as "first," "second," etc., may be used herein to describe various operations, elements, components, regions, and/or sections, these operations, elements, components, regions, and/or sections should not be limited by the use of these terms in that these terms are used to distinguish one operation, element, component, region, or section from another. Thus, unless expressly stated otherwise, a first operation, element, component, region, or section could be termed a second operation, element, component, region, or section without departing from the scope of the present disclosure.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

What is claimed is:

1. An image capture device comprising:
   a body;
   a mounting structure connected to the body and a including first bearing surface;
   an integrated sensor-lens assembly (ISLA) defining an optical axis and extending through the body and the mounting structure; and
   an accessory including a second bearing surface and releasably connectable to the mounting structure via rotation through a range of motion of less than approximately 90 degrees, the first bearing surface and the second bearing surface including corresponding angled configurations, the first bearing surface and the second bearing surface configured for engagement such that rotation of the accessory relative to the mounting structure creates a bearing effect that displaces the accessory along the optical axis to thereby reduce any axial force required during connection and disconnection of the accessory.

2. The image capture device of claim 1, wherein the first bearing surface and the second bearing surface each extend in non-parallel relation to the optical axis.

3. The image capture device of claim 2, wherein the mounting structure includes a pair of radial mounting members each including sidewalls connected by an inner wall and an outer wall, wherein the sidewalls have a generally linear configuration and define the first bearing surface, and wherein the inner wall and the outer wall each have an arcuate configuration.

4. The image capture device of claim 3, wherein the accessory includes a lens assembly configured to vary optics of the image capture device such that the image capture device is operable in a first optical mode prior to connection of the accessory and a second, different optical mode subsequent to connection of the accessory.

5. The image capture device of claim 4, wherein the first bearing surface extends radially inward towards the optical axis.

6. The image capture device of claim 5, wherein the accessory includes a mounting plate with a pair of guide members each defining the second bearing surface, wherein each guide member is arcuate in configuration and defines a thickness extending in generally parallel relation to the optical axis.

7. The image capture device of claim 6, wherein each guide member includes a first end and an opposite second end, wherein the thickness of each guide member increases from the first end towards the second end to facilitate engagement of the first bearing surface with the second bearing surface such that rotation of the accessory relative to the mounting structure displaces the accessory inwardly towards the body of the image capture device.

8. The image capture device of claim 3, wherein the accessory includes a pair of recesses configured to receive the pair of radial mounting members, wherein each recess includes sidewalls defining the second bearing surface, wherein the sidewalls of each recess are generally linear in configuration and are connected by an inner wall and an outer wall that are each arcuate in configuration.

9. The image capture device of claim 8, wherein the first bearing surface extends at a first angle in relation to a plane oriented in generally perpendicular relation to the optical axis and the second bearing surface extends at a second angle in relation to the plane such that, during disconnection of the accessory, rotation of the accessory causes the first bearing surface to bear against the second bearing surface to thereby displace the accessory outwardly away from the body of the image capture device.

10. The image capture device of claim 9, wherein the first angle and the second angle are substantially identical.

11. The image capture device of claim 9, wherein the accessory further includes a pair of retainers configured for engagement with the pair of radial mounting members, wherein each retainer is configured for resilient deflection between a first position and a second position during connection and disconnection of the accessory to the mounting structure.

12. The image capture device of claim 11, wherein the pair of radial mounting members and the pair of retainers are configured such that the pair of retainers are displaced radially outward in relation to the optical axis upon connection of the accessory to the mounting structure as the pair of retainers are deflected from the first position to the second position.

13. An accessory configured for connection to an image capture device including an integrated sensor-lens assembly (ISLA), the accessory comprising:
    a housing;
    a lens assembly supported within the housing and configured to vary optics of the image capture device such that the image capture device is operable in a first optical mode prior to connection of the accessory and a second, different optical mode subsequent to connection of the accessory; and
    a mounting plate connected to the housing, the mounting plate having a pair of guide members configured for engagement with a mounting structure of the image capture device, each guide member defining an arc length of approximately 90 degrees and a thickness that varies along the arc length thereof such that rotation of the accessory in a first direction causes inward axial displacement of the accessory to facilitate connection of the accessory to the mounting structure and rotation of the accessory in a second, opposite direction causes outward axial displacement of the accessory to facilitate disconnection of the accessory from the mounting structure.

14. The accessory of claim 13, wherein each guide member comprises:
    a first segment having a tapered configuration such that the first segment defines a first thickness that varies between first and second ends thereof; and
    a second segment positioned adjacent to the first segment, the second segment having a non-tapered configuration and defining a second thickness that is generally uniform.

15. The accessory of claim 14, wherein each guide member further comprises:
    a third segment positioned adjacent to the second segment, the third segment having a non-tapered configuration and defining a third thickness that is generally uniform and greater than the second thickness.

16. The accessory of claim 14, wherein the mounting plate further includes a resilient spacer configured for compression between the housing of the accessory and a body of the image capture device to facilitate proper orientation of the lens assembly relative to the ISLA.

17. An accessory configured for connection to an image capture device including an integrated sensor-lens assembly (ISLA), the accessory comprising:
    a housing defining recesses configured for engagement with a mounting structure of the image capture device, each recess including sidewalls extending along intersecting axes at an angle to a plane oriented in generally perpendicular relation to an optical axis of the ISLA such that rotation of the accessory causes the sidewalls of the recesses to bear against the mounting structure and thereby displace the accessory axially outward to facilitate disconnection of the accessory from the mounting structure.

18. The accessory of claim 17, wherein the recesses are configured such that the angle to the plane lies substantially within a range of approximately 30° to approximately 60°.

19. The accessory of claim 17, further comprising:
    retainers secured to the housing and configured for engagement with the mounting structure, wherein the retainers are configured for resilient deflection between an initial configuration and a subsequent configuration during connection and disconnection of the accessory to the mounting structure.

20. The accessory of claim 19, wherein the retainers are generally linear in the initial configuration and the retainers are generally non-linear in the subsequent configuration.

* * * * *

UNITED STATES PATENT AND TRADEMARK OFFICE
CERTIFICATE OF CORRECTION

PATENT NO. : 11,630,376 B2
APPLICATION NO. : 17/006281
DATED : April 18, 2023
INVENTOR(S) : Matthew David Thomas et al.

It is certified that error appears in the above-identified patent and that said Letters Patent is hereby corrected as shown below:

In the Claims

Claim 1, Column 38, Line 29:
Replace "and a including" with --and including a--

Signed and Sealed this
Nineteenth Day of September, 2023

Katherine Kelly Vidal
*Director of the United States Patent and Trademark Office*